(12) United States Patent
Adler

(10) Patent No.: US 12,553,708 B2
(45) Date of Patent: Feb. 17, 2026

(54) SECOND-HARMONIC GENERATION FOR CRITICAL DIMENSIONAL METROLOGY

(71) Applicant: FemtoMetrix, Inc., Irvine, CA (US)

(72) Inventor: David L. Adler, San Jose, CA (US)

(73) Assignee: FEMTOMETRIX, INC., Los Angeles, CA (US)

( * ) Notice: Subject to any disclaimer, the term of this patent is extended or adjusted under 35 U.S.C. 154(b) by 114 days.

(21) Appl. No.: 17/743,284

(22) Filed: May 12, 2022

(65) Prior Publication Data

US 2022/0364850 A1 Nov. 17, 2022

Related U.S. Application Data

(60) Provisional application No. 63/188,054, filed on May 13, 2021, provisional application No. 63/187,868, filed on May 12, 2021.

(51) Int. Cl.
*G01B 11/24* (2006.01)
*G01B 11/02* (2006.01)
(Continued)

(52) U.S. Cl.
CPC .............. *G01B 11/24* (2013.01); *G01B 11/02* (2013.01); *G01B 11/022* (2013.01);
(Continued)

(58) Field of Classification Search
CPC ....... G01B 11/22; G01B 11/24; G01B 11/608; G01B 2210/56; G01B 11/02; G01B 11/022; G01B 11/0608; G03F 7/70625
See application file for complete search history.

(56) References Cited

U.S. PATENT DOCUMENTS 5,294,289 A * 3/1994 Heinz ................. G01B 11/065
118/712
5,557,409 A 9/1996 Downer et al.
(Continued)

FOREIGN PATENT DOCUMENTS

CN 201837582 5/2011
CN 103441095 12/2013
(Continued)

OTHER PUBLICATIONS

"Rapid Non-destructive Characterization of Trap Densities and Layer Thicknesses in $HfO_2$ Gate Materials Using Optical Second Harmonic Generation", Semicon Korea, Santa Ana, California, Jan. 2016, in 24 pages.
(Continued)

*Primary Examiner* — Dominic J Bologna
(74) *Attorney, Agent, or Firm* — KNOBBE, MARTENS, OLSON & BEAR, LLP

(57) ABSTRACT

Systems and methods are disclosed for using second-harmonic generation of light to monitor the manufacturing process for changes that can affect the performance or yield of produced devices and/or determining critical dimensions of the produced device. A sample characterization system directs light onto a sample to produce second harmonic generation (SHG) signals and a detector generates detected SHG signals in response to receiving second harmonic generation (SHG) signals from the sample. A hardware processor receives detected SHG signals and determines a geometric feature of the sample or a variation in the geometric feature of the sample based on the detected SHG signals.

11 Claims, 35 Drawing Sheets

(51) Int. Cl.
| | |
|---|---|
| *G01B 11/06* | (2006.01) |
| *G01N 21/63* | (2006.01) |
| *G01N 21/95* | (2006.01) |
| *G01N 21/956* | (2006.01) |
| *G03F 7/00* | (2006.01) |
| *H01L 21/66* | (2006.01) |

(52) U.S. Cl.
CPC ....... *G01B 11/0608* (2013.01); *G01N 21/636* (2013.01); *G01N 21/9501* (2013.01); *G01N 21/956* (2013.01); *G03F 7/70625* (2013.01); *H01L 22/12* (2013.01); *G01B 2210/56* (2013.01)

(56) References Cited

U.S. PATENT DOCUMENTS

| | | | |
|---|---|---|---|
| 6,781,686 | B2 | 8/2004 | Hunt |
| 6,788,405 | B2 | 9/2004 | Hunt |
| 6,791,099 | B2 | 9/2004 | Some et al. |
| 6,795,175 | B2 | 9/2004 | Hunt |
| 6,819,844 | B2 | 11/2004 | Hunt |
| 6,856,159 | B1 | 2/2005 | Tolk et al. |
| 6,882,414 | B2 | 4/2005 | Hunt |
| 7,158,284 | B2 | 1/2007 | Alles et al. |
| 7,304,305 | B2 | 12/2007 | Hunt |
| 7,595,204 | B2 | 9/2009 | Price |
| 9,109,498 | B2 | 8/2015 | Bradley et al. |
| 10,274,310 | B2 | 4/2019 | Hunt et al. |
| 10,551,325 | B2 | 2/2020 | Koldiaev et al. |
| 10,591,525 | B2 | 3/2020 | Koldiaev et al. |
| 10,613,131 | B2 | 4/2020 | Koldiaev et al. |
| 10,663,504 | B2 | 5/2020 | Koldiaev et al. |
| 10,989,664 | B2 | 4/2021 | Adell et al. |
| 11,150,287 | B2 | 10/2021 | Koldiaev et al. |
| 11,199,507 | B2 | 12/2021 | Koldiaev et al. |
| 11,293,965 | B2 | 4/2022 | Koldiaev et al. |
| 11,415,617 | B2 | 8/2022 | Koldiaev et al. |
| 11,473,903 | B2 | 10/2022 | Hunt et al. |
| 11,808,706 | B2 | 11/2023 | Adell et al. |
| 11,821,911 | B2 | 11/2023 | Koldiaev et al. |
| 11,946,863 | B2 | 4/2024 | Lei |
| 11,988,611 | B2 | 5/2024 | Koldiaev et al. |
| 12,158,492 | B2 | 12/2024 | Lei |
| 12,241,924 | B2 | 3/2025 | Koldiaev et al. |
| 2006/0044641 | A1 | 3/2006 | Alles et al. |
| 2015/0112203 | A1* | 4/2015 | Bille ........................ A61F 2/16 600/473 |
| 2015/0192527 | A1* | 7/2015 | Barak .................... G01N 21/55 356/237.6 |
| 2015/0330908 | A1 | 11/2015 | Koldiaev et al. |
| 2015/0330909 | A1 | 11/2015 | Koldiaev et al. |
| 2015/0331029 | A1 | 11/2015 | Koldiaev et al. |
| 2015/0331036 | A1 | 11/2015 | Koldiaev et al. |
| 2016/0097983 | A1 | 4/2016 | Bogaart et al. |
| 2016/0131594 | A1* | 5/2016 | Koldiaev ........... G01N 21/9501 702/172 |
| 2017/0146458 | A1 | 5/2017 | Huber et al. |
| 2017/0205377 | A1 | 7/2017 | Garnett et al. |
| 2018/0292441 | A1 | 10/2018 | Koldiaev et al. |
| 2019/0096773 | A1* | 3/2019 | Kim .................. H01L 21/68735 |
| 2020/0057104 | A1 | 2/2020 | Ma et al. |
| 2020/0088784 | A1* | 3/2020 | Lei ........................... H01L 22/34 |
| 2020/0110029 | A1* | 4/2020 | Lei ....................... G01N 21/211 |
| 2020/0286258 | A1* | 9/2020 | Hoerr .................. G01B 11/005 |
| 2021/0293618 | A1 | 9/2021 | Barak et al. |
| 2024/0071710 | A1 | 2/2024 | Wong |
| 2024/0077302 | A1 | 3/2024 | Adler |
| 2024/0085324 | A1 | 3/2024 | Shtykov et al. |
| 2024/0085345 | A1 | 3/2024 | Wong |
| 2024/0085470 | A1 | 3/2024 | Wong et al. |
| 2024/0094278 | A1 | 3/2024 | Shtykov et al. |
| 2025/0093277 | A1 | 3/2025 | Koldiaev et al. |

FOREIGN PATENT DOCUMENTS

| | | |
|---|---|---|
| CN | 106415817 | 2/2017 |
| EP | 0 378 061 | 7/1990 |
| KR | 10-2020-0032801 | 3/2020 |
| WO | WO 2019/175611 | 9/2019 |

OTHER PUBLICATIONS

Alles, M. et al, "Second Harmonic Generation for Noninvasive Metrology of Silicon-on-Insulators Wafers", IEEE Transactions on Semiconductor Manufacturing, vol. 20(2), May 2007, pp. 107-113, in 7 pages.
Campagnola, P., "Second Harmonic Generation Imaging Microscopy: Applications to Diseases Diagnostics", Analytical Chemistry, May 2011, pp. 3224-3231, in 16 pages.
Fomenko, V. et al., "Optical second harmonic generation studies of ultrathin high-k dielectric stacks", Journal of Applied Physics, American Institute of Physics, vol. 97(8), Apr. 11, 2005, in 8 pages.
Gielis, J. J. H. et al., "Optical second-harmonic generation in thin film systems", Journal of Vacuum Science Technology A, vol. 26(6), Nov./Dec. 2008, pp. 1519-1537, in 20 pages.
Murzina, T. et al., "Optical Second Harmonic Generation in Semiconductor Nanostructures", Physics Research International, vol. 2012, Mar. 16, 2012, in 12 pages.
Shaffer, E. et al., "Digital holographic microscopy investigation of second harmonic generated at a glass/air interface", Optics Letters, Aug. 2009, vol. 34, No. 16, pp. 2450-2452.
Xiao, D. et al., "Optical probing of a silicon integrated circuit using electric-field-induced second-harmonic generation", Applied Physics Letters, vol. 88, Mar. 17, 2006, pp. 114107-114107-3, in 4 pages.
Aktsipetrov, O.A. et al., "dc-electric-field-induced second-harmonic generation in Si(111)-SiO$_2$-Cr metal-oxide-semiconductor structures", Physical Review B, Jul. 1996, vol. 54, pp. 1825-1832.
Butet, J. et al., "Optical Second Harmonic Generation in Plasmonic Nanostructures: From Fundamental Principles to Advanced Applications", ACS Nano, Oct. 2015, vol. 9(11), pp. 10545-10562.
Fang, J. et al., "Detection of gate oxide charge trapping by second-harmonic generation", Applied Physics Letters, Nov. 1999, vol. 75, pp. 3506-3508.
Hu, C. C., *Modern Semiconductor Devices for Integrated Circuits*, Mar. 2009, 1st Edition, published by Pearson, 351 pages, ISBN-10: 8131730247, ISBN-13: 978-0136085256 (the NPL document submitted includes only the Title Overview and Table of Contents listing of this book).
European Office Action and Search Report dated Apr. 24, 2025 in corresponding in EP Application No. 22808360.6.
International Search Report and Written Opinion dated Aug. 26, 2022 in corresponding PCT Application No. PCT/US2022/029031.
International Search Report and Written Opinion dated Oct. 6, 2023 in corresponding PCT Application No. PCT/US2023/068381.
Third-Party Submission dated May 30, 2022 in corresponding KR Application No. 10-2020-7034153.
Third-Party Submission dated Jun. 30, 2022 in corresponding KR Application No. 10-2020-7035967.

* cited by examiner

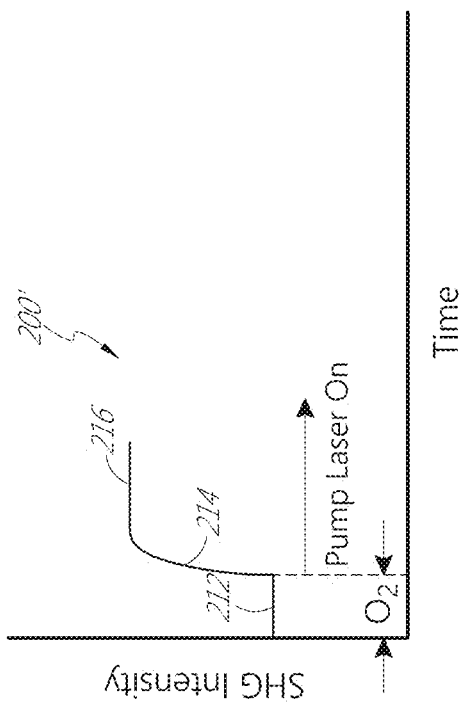
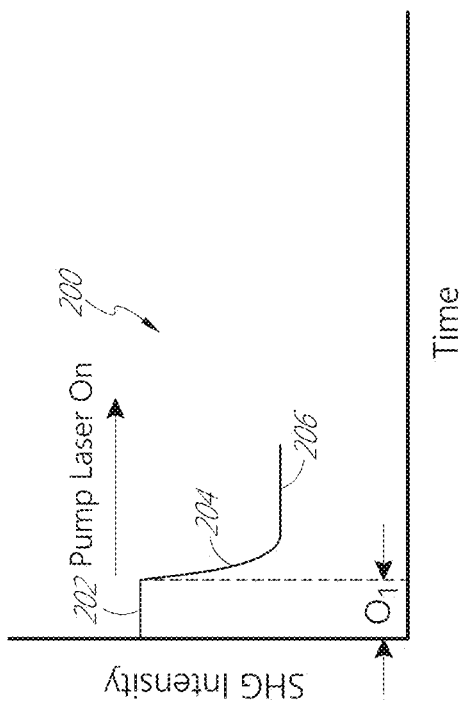
FIG. 2B
FIG. 2A

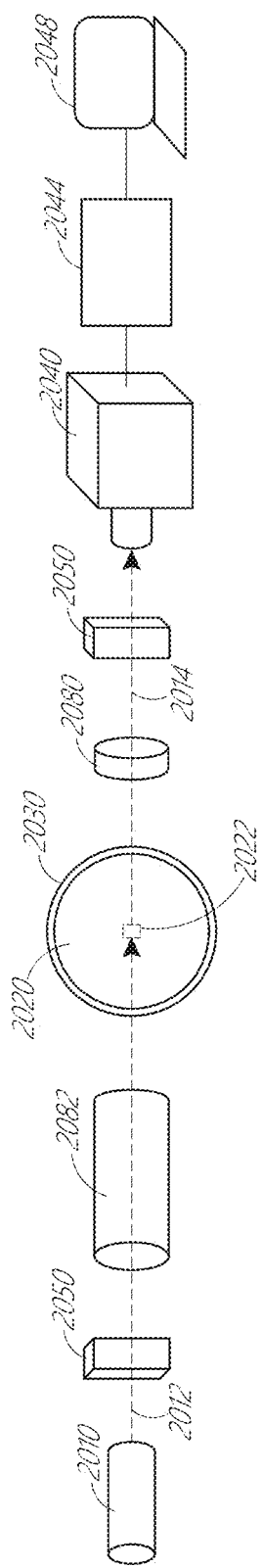
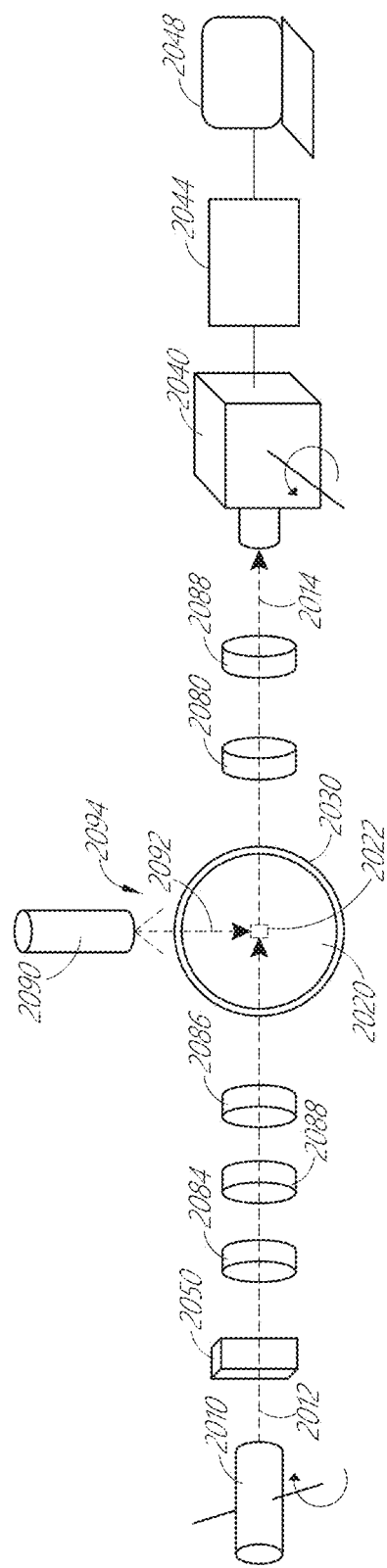
FIG. 6A
FIG. 6B

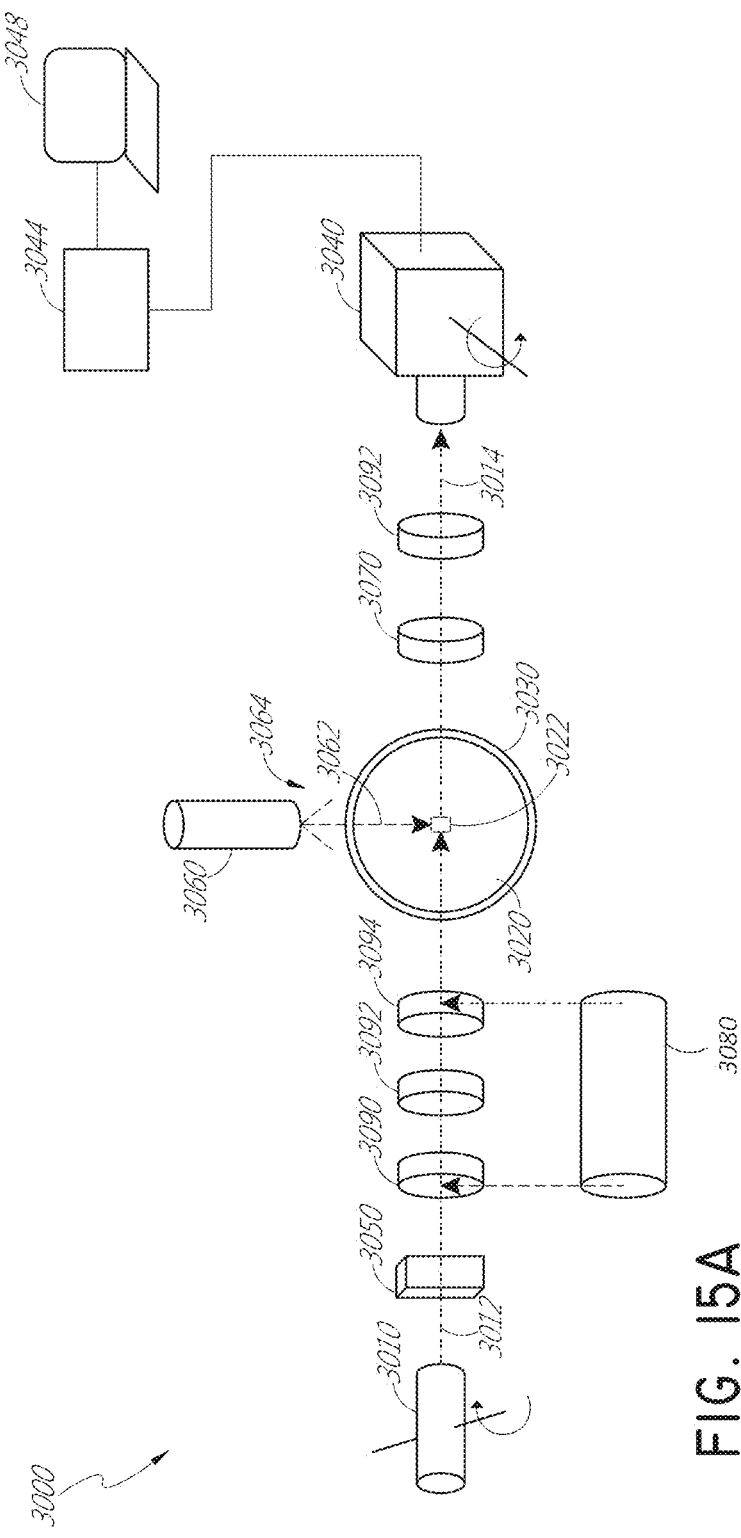
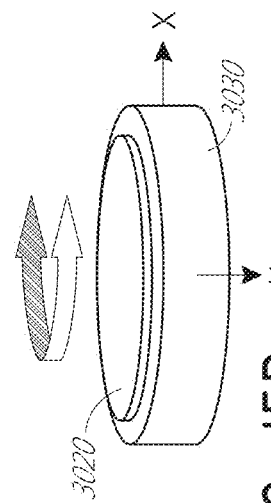
FIG. 15A
FIG. 15B

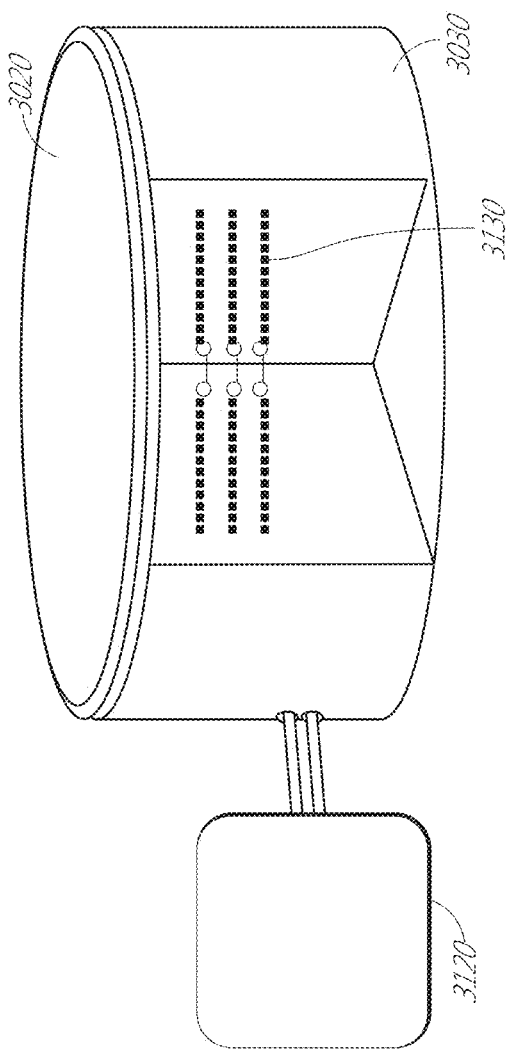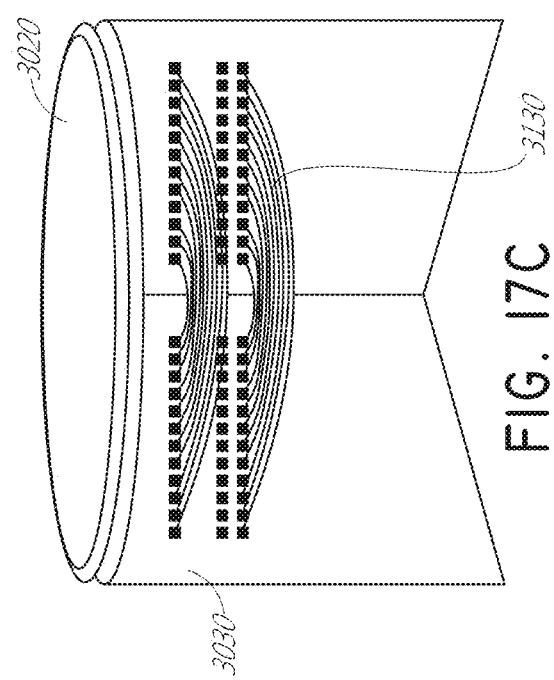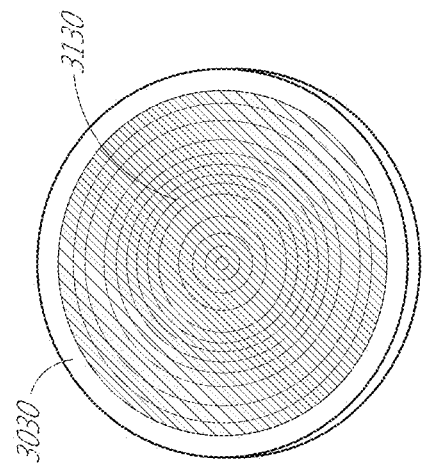
FIG. 17A
FIG. 17B
FIG. 17C

SECOND-HARMONIC GENERATION FOR CRITICAL DIMENSIONAL METROLOGY

PRIORITY CLAIM

This application claims the priority benefit of U.S. Patent Prov. App. 63/187,868, entitled SECOND-HARMONIC GENERATION FOR CRITICAL DIMENSIONAL METROLOGY, filed May 12, 2021; and U.S. Patent Prov. App. 63/188,054, entitled SECOND-HARMONIC GENERATION FOR CRITICAL DIMENSIONAL METROLOGY, filed May 13, 2021. Each of the above-noted applications is incorporated herein by reference in its entirety. U.S. Pat. No. 10,591,525 issued to Koldiaev et al on Mar. 17, 2020 and titled "Wafer Metrology Technologies", which was included in appendices in the above-referenced provisional applications, is also hereby incorporated herein by reference in its entirety. Text and drawings from U.S. Pat. No. 10,591,525 are additionally reproduced herein.

BACKGROUND

Field

This application generally relates to systems and methods for dimensional metrology.

Description of the Related Art

Second-Harmonic generation is a non-linear optical effect comprising conversion of light having one frequency into light at twice that frequency upon scattering from some types of materials, structures, and geometries. Second-Harmonic generation can be particularly strong at interfaces and defects that break the symmetry of a system. The process may be considered as the combining of two photons of energy E to produce a single photon of energy 2E (i.e., the production of light of twice the frequency ($2o$) or half the wavelength) of the incident radiation.

A survey of scientific investigations in which the SHG technique has been employed is provided by, "Optical Second-Harmonic Generation from Semiconductor Surfaces" by T. F. Heinz et al., Published in Advances in Laser Science III, edited by A. C. Tam, J. L. Cole and W. C. Stwalley (American Institute of Physics, New York, 1988) p. 452. As reviewed, the SHG process does not occur within the bulk of materials exhibiting a center of symmetry (i.e., in inversion or centrosymmetric materials). For these materials, the SHG process is appreciable only at surfaces and/or interfaces where the inversion symmetry of the bulk material is broken. As such, the SHG process offers a unique sensitivity to surface and interface properties.

So-understood, the SHG effect is described in U.S. Pat. No. 5,294,289 to Heinz et al. Each of U.S. Pat. No. 5,557,409 to Downer, et al., U.S. Pat. Nos. 6,795,175; 6,781,686; 6,788,405; 6,819,844; 6,882,414 and 7,304,305 to Hunt, U.S. Pat. No. 6,856,159 to Tolk, et al. and U.S. Pat. No. 7,158,284 to Alles, et al. also describe other approaches or "tools" that may be employed. Yet, the teachings of these patents appear not to have overcome some of the main obstacles to the adoption of SHG as an established technique for use in semiconductor manufacturing and metrology.

SUMMARY

Dimensional Metrology Using Second-Harmonic Generation

Some of the systems and methods described herein relate to the use of Second-Harmonic Generation to monitor semiconductor device fabrication. Changes in the second-harmonic generation of light can be used to monitor for changes in the geometry or materials or material properties of semiconductor devices (e.g., as they are produced in a production line) and/or for changes in the fabrication process. Second-Harmonic Generation can also be used to determine critical dimensions of semiconductor structures, devices, parts of devices or any combination thereof.

A second harmonic generation (SHG) system for determining critical dimension (CD), herein referred to as SHG-CD, may illuminate a sample and use the second harmonic generated light emitted by the device to determine a physical structure (e.g., shape and/or dimensions) of the device and/or monitor changes in such features. A SHG-CD system may use light emitted by devices produced in a production line to monitor the quality and stability of the production procedure and possibly improve the production yield and or the performance of the produced devices. The devices that are measured by the SHG-CD system, can be either completed or yet to be completed, and the changes can be unplanned variations (e.g., variation associated with changes in a processing tool, associated with degradations, environmental changes, malfunctions, variations in consumable used by the processing tool, or any combination of these or other possible factors).

In addition or in the alternative to monitoring for changes in physical features (e.g., shape and/or dimensions) of the devices or portions thereof and thus monitoring production, a SHG-CD system may provide a feedback signal, feedback data, or information usable to control a production step of the device. In some cases, a feedback signal, feedback data, or information may be used to control a production step that produces the monitored sample. The SHG-CD system may be included in a sample evaluation step and may provide a feedback signal or feedback data, to a step prior to the evaluation step (for example, for the benefit of another device(s) or wafer(s), etc., subsequently fabricated). This prior step may include, for example, lithography, etching, deposition steps or other possible fabrication steps. In some implementations, SHG-CD may provide a feed-forward signal, feed-forward data, or feed forward information usable to control a production step following the monitoring step or the sample measurement. In some such implementations, the subsequent or downstream steps may be adjusted based at least in part on the feedforward signal, feedforward data, and/or feedforward information, provided by SHG-CD, for example, to adjust or correct for fabrication process changes detected by the SHG-CD system.

An SHG-CD system directs light such as pulsed light (e.g., pulsed laser light) onto a sample, such as a silicon wafer comprising semiconductor devices or partially constructed semiconductor devices. The SHG-CD may be used to monitor a sample at some point in the semiconductor fabrication process, by directing light toward the sample and detecting the resulting SHG light (also referred to as SHG signal). The pulses of incident light may generate light at the second harmonic (or half the wavelength) of the incident light, sometimes referred to as a second-harmonic generation (SHG) signal and/or SHG light. The SHG signal can be measured using one or more detectors. These detectors can be configured to measure one or more of the intensity, angular distribution, or polarization of the SHG signal, or any combination thereof, by generating a detected SHG signal (e.g., an electronic signal). In some cases, the detected SHG signal can be proportional to an intensity of the SHG light incident on the detector (e.g., on an optoelectronic sensor of the detector). In addition, the incident light pulses may be adjusted to improve (e.g., increase) the SHG signal from the sample, such as by selecting polarization, wavelength or intensity. Additionally or alternatively, the orientation of the sample may be adjusted, such as by rotating the sample with respect to the scattering plane of the light.

In some cases, the sample may be prepared for the second-harmonic generation measurement by exposure to additional light (e.g., an auxiliary light beam or illumination) or electric charge. For example, a region of the sample from which the SHG light is emitted may be optically pumped by directing auxiliary illumination such as an auxiliary beam of light onto the region. The auxiliary light beam, which may be referred to herein as a pump beam, may be at the same or a different wavelength as the primary light beam incident on the sample (pulses used to generate the SHG signal). The electric charge may, for example, come from a corona discharge.

The signal can be monitored for changes to the SHG signal (e.g., changes associated with intensity, polarization, spatial distribution etc.) that may indicate changes in the production of the semiconductor devices (e.g., changes in one or more processes prior to measurement). In some cases, an SHG signal may be modified (e.g., by one or more optical components) and the modified SHG signal may indicate changes in the production of a sample or device. In some cases, a detected SHG signal may be modified (e.g., by an electronic processor) and the modified detected SHG signal may indicate changes in the production of a sample or device.

These changes in production of the semiconductor devices may produce a change in the devices geometric features such as a change in device dimension (e.g., width, length, height, thickness), such as the width of a transistor feature, or the alignment and/or spacing between features. These changes in geometric features may also possibly include changes in shape. In some cases, the SHG signal and/or the detected SHG signal may be processed (in optical or electronic domain) to make the changes in the SHG signal and/or the detected SHG signal more apparent. In some implementations, the SHG signal may be used to alert manufacturing personnel of a potential problem with production or to send a signal to one or more inline fabrication tools. In some implementations, the SHG signal or the detected SHG signal may be used to provide feedback to production equipment earlier or upstream in the production process, for example, possibly to improve device yield or performance. In some implementations, the SHG signal or the detected SHG signal may be used to provide a feedforward to a subsequent or downstream step in the production process to adjust or correct for prior changes.

An SHG signal may be used to determine or provide information regarding the geometric or electronic structure of a feature of a fabricated device. The device may be a finished product or at some earlier stage of production. In some implementations, for example, the SHG signal or the detected SHG signal may be compared to a database of (e.g., geometric) features to determine the structure of the device (e.g., geometric) feature. In some cases, the SHG signal or the detected SHG signal may be compared to a database of (e.g., material characteristics) features to determine the material properties (e.g., electronic structure) of the device. In some examples, the SHG signal and/or the detected SHG signal may be modified and the modified SHG signal, modified detected SHG signal and/or data based on either of these may be compared with other data (e.g., previously measured/processed SHG signals or detected SHG signals, modified SHG signals, modified detected SHG signals, and/or other processed data). The SHG signal may also be used to calculate the structure (e.g., geometric structure) based on a priori knowledge of the structure. The database of (e.g., geometric and/or material property) features may include data calculated and/or measured prior to the measurement of the device to facilitate rapid identification of the device structure. These results (e.g., determined features) may also be used to alert manufacturing personnel of process variations, communicate with in-line fabrication tools and/or provide feedback or feed forward for adjustments to the semiconductor device fabrication process as described previously. In various designs, a primary pulsed laser beam strikes a spot on the surface of a completed or partially formed integrated circuit (e.g., silicon integrated circuit). The pulses may generate light at the second-harmonic of the primary beam via interaction with the completed or partially formed integrated circuit (e.g., a completed or partially formed device in the integrated circuit). The SHG signal is measured using one or more detectors. The measurements may include the intensity, angular distribution, polarization or any combination thereof of the SHG light. The sample may also be rotated to take multiple measurements (e.g., corresponding to different angles of incidence and/or SHG light emitted along different directions), and/or the wavelength and/or polarization or other optical properties of the primary beam may also be varied.

The detected SHG signal, processed or not, may be compared to a signal (e.g., a simulated detected SHG signal or simulated modified detected SHG signal) produced by computer simulation using a model to simulate SHG. The model may include geometrical information from the sample such as one or more dimensions or shapes. In some examples, the geometrical information (e.g., reference geometrical information) may include at least two dimensions. For example, the geometric information may include any combination of the height, width or length of a feature and may potentially include spacing. The geometric information may also comprise shape, which may include for example angles, orientations, degree of smoothness, roughness, or other feature or characteristics.

The model may be generated empirically from measurements or calculated, or a combination of both. The model may be used to evaluate the SHG light signal or processed SHG light signal to determine either the structure (e.g., geometric structure) or a change in the structure (e.g., geometric structure) of the devices on the sample.

The results of said comparison may be used to monitor a fabrication process. In some examples, if the comparison indicates a significant change to the device structure (e.g., an unplanned variation in a geometric feature), the process may be temporarily suspended until the problem is fixed. The results of said comparison may additionally or alternatively be used to assist in development of a new device structure or process for fabrication of a device.

In some implementations, in addition or alternative to detectors, a SHG-CD system may comprise at least one spectrometer configured to receive SHG signals received from a sample and measure the intensities of the SHG signals or relative intensities of the SHG signals to determine characteristics (e.g., geometrical features, material structure, critical dimensions) of the sample. Likewise, different detectors or sensors with different spectral responses or filters having different wavelength spectrums may be used to sample different wavelengths and possibly obtain different intensity values for different wavelengths.

Having information on the relative strengths of different wavelengths may assist in determining changes in the SHG output as well as the changes in the device or sample.

In various implementations described herein, a system for characterizing a sample using second harmonic generation comprises at least one optical source configured to direct a light beam onto a sample to produce second harmonic generation (SHG) signals, an optical detection system comprising at least one optical detector configured to receive the SHG signals emitted from said sample and generate detected SHG signals, one or more hardware processors (e.g., hardware processors, processing electronics, microprocessors, and the like) in communication with the optical detection system, the one or more hardware processors configured to receive at least one detected SHG signal and determine a geometric feature of the sample or a variation in a geometric feature of the sample based on the at least one detected SHG signal.

In other implementations described herein, a method for determining a dimension of a sample using second harmonic generation comprises receiving a first SHG signal, varying at least one parameter of a light beam of an at least one optical source or an optical detection system, receiving a second SHG signal after the variation of the at least one parameter, determining a geometry of a feature of the sample based on the first SHG signal, the second SHG signal, and a mapping of an SHG signal to the geometry of the feature of the sample.

In other implementations described herein, a system for characterizing a sample using second harmonic generation comprises at least one optical source configured to direct a light beam onto a sample to produce second harmonic generation (SHG) signals, an optical detection system comprising at least one detector configured to receive SHG signals emitted from said sample and generate detected SHG signals, one or more hardware processors in communication with the optical detection system, the one or more hardware processors configured to receive at least a first detected SHG signal, determine a change in the first detected SHG signal or a feature of said sample, and output an indication of the change.

In other implementations described herein, a system for characterizing a sample using second harmonic generation comprises at least one optical source configured to direct a light beam onto said sample to produce second harmonic generation (SHG) signals, an optical detection system comprising at least one detector configured to receive SHG signals emitted from said sample and generate detected SHG signals, one or more hardware processors in communication with the optical detection system, the one or more hardware processors configured to, receive a first detected SHG signal from said optical detection system, said first detected SHG signal collected by the at least one detector at a first angle with respect to a feature of the sample, receive a second detected SHG signal from said optical detection system, said second detected SHG signal collected by the at least one detector at a second angle with respect to the feature of the sample, the second angle different from the first angle; and determine a dimension of the feature of the sample based on the first detected SHG signal, the second detected SHG signal, and a mapping of an detected SHG signal to dimensions of the feature of the sample.

In other implementations described herein, a system for characterizing a sample using second harmonic generation comprises at least one optical source configured to direct a light beam onto a sample to produce second harmonic generation (SHG) signals, an optical detection system comprising at least one detector configured to receive SHG signals from said sample and generate detected SHG signals, one or more hardware processors in communication with the optical detection system, the one or more hardware processors configured to receive a first detected SHG signal, determine a change in the detected first SHG signal, and output an indication of the change.

In various implementations, the detected SHG signal is processed. For example, the detected SHG signal may be transformed by one or more calculations, etc. This processed (or modified) detected SHG signal may be used, for example, to determine geometric features (e.g., dimensions) or data regarding or based on the geometry of the partially or completely formed devices or portions thereof, to monitor change thereof and/or to monitor changes in the fabrication process, etc.

In various implementations, the detected SHG signal, processed or otherwise, or values obtained therefrom may be compared with a reference such as reference values or reference signals (simulated, empirically measured or a combination thereof), for example, to determine changes in the geometry or geometric features (e.g., dimensions) of the partially or completely formed devices, changes thereof, changes in the fabrication process or any combination of these.

In various implementations, the detected SHG signal or the modified detected SHG signal, processed or otherwise, or values obtained therefrom may be compared with previously measured detected SHG signals or previously generated modified detected SHGs (e.g., stored in a memory of the system), for example, to determine changes in the geometry or geometric features (e.g., dimensions) of the partially or completely formed devices, changes thereof, changes in the fabrication process or any combination of these. In some cases, the changes in the geometry or geometric features may comprise variation of the geometry or geometric features compared to a previously measured sample (e.g., a sample produced by the same process used to produce the sample from which the detected SHG signal is obtained).

As discussed above, the SHG signal may depend on the geometry or geometric features (e.g., dimensions) of the partially or completely formed devices or portions thereof. Additionally, the SHG signal may depend on material properties such as electronic properties, for example, at interfaces of or within the sample under test. Additional techniques that assist in obtaining such material (e.g., electronic) properties or features of the sample under test from measured SHG signals may be used in combination with other techniques such as describe herein related to obtaining SHG signals dependent on the geometry of the partially or completely formed devices. Likewise, in various implementations described herein, the SHG system may be configured to obtain SHG signals that provide information regarding the geometry or change in geometry of a partially or completely formed devices as well as information regarding material properties such as electronic properties of such devices or portions thereof.

SHG Based Optical Metrology

Part I

An SHG metrology tool is described in which electrons in a layered semiconductor substrate are excited, variously, by each of a pump light source and a probe light source having different power characteristics for the purpose of Second Harmonic Generation. For such an approach, a metrology characterization tool is provided with an "additional" integrated light source (e.g., a UV flash lamp or laser) operating as a "pump" to induce a potential difference across hetero-interface(s) in layered semiconductor device templates, together with a short or ultra-short pulsed laser (e.g., a femto-second solid state laser) operating as a "probe" light source. Utility is derived from using the two different sources for different purposes in concert or in conjunction with each other (via various time-offset and/or variable pump energy methods as further described) as distinguished from a single laser SHG or a dual or multiple laser SFG system.

In one method, the pump is employed as a pre-exciting or pre-excitation light source to allow for total characterization time of some materials to be reduced. In many such implementations, the time-dependent electric field is not primarily produced by the probe/probing laser. In one variation of this method, the pump is used to UV flash an entire wafer and then use the probe laser to raster or otherwise scan the entire wafer or some portion thereof spending minimum probe time per point (e.g., scanning as fast as hardware can move the laser). Options in this regard include row-by-row scanning with a step along the (scan) column by wafer shift. Another approach may employ wafer rotating and scanning along the radii.

In another variation, the pump allows a quick charge up of the material interface at a sample site, followed by observation of the decay of that charged interface with the probe in connection with fast-blocking and/or optical delay methods further described in in the portion of U.S. Provisional Application No. 61/980,860, filed on Apr. 17, 2014, titled "WAFER METROLOGY TECHNOLOGIES," referred to as Section II entitled, "CHARGE DECAY MEASUREMENT SYSTEMS AND METHODS". Regardless, in various embodiments, the intent of pump use for pre-excitation is to inject charge carriers into, e.g., the dielectric in a quantity sufficient to impact the interfaces.

In another method, the pump laser is employed as a post-exciting or post-excitation light source to affect an SHG signal already being produced by the probe laser at a sample site. Yet another method employs a compare/contrast of the SHG signal generated by the probe pre- and post-pump laser energy application. By probing the sample and measuring the SHG response prior to pumping, then applying radiation from the pump light source and after that, re-probing, the difference in the SHG response pre- and post-pump can be used to determine additional material properties, such as trap density in the material dielectric.

In various methods discussed herein, a timing differential (i.e., in terms of pre- and/or post-excitation by the pump source in relation to probe laser use) is employed to deliver interrogation curves evincing further information about the material interface.

In various methods, the pump and probe sources are used simultaneously, with the combination used to provide an SHG signal for determining threshold injection carrier energy. Specifically, while probing with the probe laser, a tunable pump laser is ramped-up in frequency. At a particular frequency, the SHG signal exhibits an inflection point (or a region of discontinuity). A value corresponding to the pump laser frequency at the inflection point (or the region of discontinuity) can be related to threshold injection carrier energy.

Various embodiments of the subject pump and probe system offers certain hardware-based advantage possibilities as well. In an example where the pump is a flash lamp, highly relevant cost savings can be achieved relative to 2-laser systems. Whether provided as a flash lamp or a second laser, the combination of a pump and probe as contemplated herein can also reduce the risk of optical damage to the substrate to be interrogated because illumination that is too powerful will degrade the dielectrics and even substrate if a threshold average power is exceeded. The threshold average power that causes optical damage to the substrate can be determined by experimental calibration study.

To understand the latter possibility in connection with the subject hardware some background is provided. Namely, both pump and probe energies, alone, are capable of producing an SHG signal with such hardware. While the pump and probe sources do not need to operate in conjunction to produce SHG signal, relevant material properties are derived in the subject methods primarily from the SHG intensity produced by the probe, as the pump will generally not have the peak power to drive buried interfacial SHG appropriately. Time-dependent SHG intensity curves will change based on the distribution of charge carriers across an interface, for example, between the dielectric and substrate. The time it takes for injection of carriers across an interface, for example, between the dielectric and a semiconductor substrate, is dependent upon the average power targeted on the sample. In some implementations, the probe alone can enable injection of carriers across an interface between the dielectric and substrate. In such implementations due to the inability to decouple average power from peak power, the time taken to reach the target average power that allows for injection of carriers across an interface between the dielectric and substrate without exceeding the optical damage threshold of a material may be greater than implementations using a combination of pump and probe. By using a high average power but low peak power optical source as a pump to inject carriers across an interface between the dielectric and substrate prior to probing, the time savings of increased average power can be had without the potential damage complications a high peak power at said average power may induce.

Accordingly, as compared to the pump, the subject probe is typically a higher peak power source with low average power. Stated otherwise, the probe laser is typically relatively very weak. In one aspect, this allows for minimal disturbance to the native electric field present at the substrate interface to yield an initial time-independent signal.

With higher average power but low peak power, the pump induces an electric field (E) by causing charge carriers to jump up in energy level at the material interface or across the interface. By using a relatively high average power source as the pump and quickly "charging up" the interface by giving all the available electrons the energy at least sufficient to jump into the dielectric, a situation is created where the high peak power (providing high SHG conversion rates) but low average power (due to short pulse duration and limited number of such pulses) probe laser can quickly interrogate the surface to provide time-independent SHG signal data.

Accordingly, in various embodiments described herein a reduction in the time required for a/the probe laser to move electrons to higher energy levels or across interfaces can be achieved which can allow for faster evaluations of a steady-state SHG signal and/or charge carrier time dynamics measurements. This approach also allows for separating the effects of the SHG probe from its own influence on the electric field at substrate interfaces. It also allows time-dependence in the SHG process to be sped up or ignored as well as allowing for faster acquisition of time-independent SHG data over at least part of an acquired signal from the probe beam. Likewise, another aspect allows for faster and/or more accurate determination of threshold energy for carrier injection into an interface (e.g., interface between a semiconductor and a dielectric), as well as fast(er) throughput in a line tool environment. Whatever the context, the available time reduction offered can advantageously facilitate high throughput testing in any sort of in-line metrology tool in the semiconductor industry. By way of example, to generate time dependence curves using pre-existing application of the SHG technique on a device including a 25 nm buried oxide layer under a 10 nm Silicon on Insulator (10 nm device layer/25 nm BOX SOI) takes 6 to 12+ seconds per point. Using pre-excitation as described herein, time dependence can be generated in under 1 second, pending material and pump/probe power. This advance would enable a 10×+ surface area covered on a wafer given available time/wafer on the line, or enable equivalent confidence in 10% of the time. And while these sort of numbers will vary based on material, layer thickness and specific pump/probe power and wavelength, they should be illuminating.

All said, invention embodiments hereof include each of the methodology associated with the approaches described herein, alone or in combination with elements components or features from the different parts of this application, the referenced co-pending patent applications, and any documents incorporated by reference herein, hardware to carry out the methodology, productions systems incorporating the hardware and products (including products-by-process) thereof.

Part II

To date, there has been limited adoption of SHG-based metrology tools. It is believed that this fact stems from an inability of existing systems to make distinctions between detected interfacial properties. In other words, while existing SHG techniques offer means of determining location and presence of interfacial electrically active anomalies, their methods rely on relative measurements and are not practically able to parse between electrically active anomaly types (e.g., gettered contaminants such as copper vs. bond voids) and/or to quantify detected contaminants.

However, the subject systems and methods variously enable capturing the quantitative information for making the determinations required for such activity. In these systems and methods, after charging a wafer sample with optical electro-magnetic radiation (at a specific site with a pulsed laser or with a flash lamp or other electro-magnetic energy source or light source or other means) a plurality of measurements are made to monitor transient electric field decay associated with heterointerfaces controlling the decay period.

Using decay curve data generated and characterized with multiple points, spectroscopic parameters of an anomaly or problem at a sample site can be determined such that differentiation and/or quantification of defect type or contaminant(s) is possible. In all, the decay dependent data is collected and used to provide systems by which charge carrier lifetimes, trap energies and/or trapped charge densities may be determined in order that defects and contaminants can be discerned or parsed from one another, for species differentiation if a contaminant is detected and/or for contaminant quantification if detected.

Such activity is determined on a site-by-site basis with the selected methodology typically repeated to scan an entire wafer or other material sample or region thereof. As for the computer processing required to enable such determination, it may occur in "real time" (i.e., during the scanning without any substantial delay in outputting results) or via post-processing. However, in various embodiments, control software can run without lag in order to provide the precise system timing to obtain the subject data per methodology as described below.

Optionally, sample material charge-up is monitored in connection with SHG signal production. In which case, the information gained via this signal may be employed in material analysis and making determinations.

In any case, system embodiments may include an ultra-short pulse laser with a fast shutter operating in the range of $10^2$ seconds to picosecond ($10^{-12}$ seconds) range. Such systems may be used to monitor SHG signal generation at a sample site from surface and buried interfaces of thin film materials after the introduction of a plurality of short blocking intervals. These intervals may be timed so as to monitor the field decay of interest.

The subject systems may also include an optical line delay. The delay line may be a fiber-based device, especially if coupled with dispersion compensation and polarization control optics. Alternatively, the delay line may be mirror-based and resemble the examples in U.S. Pat. No. 6,147,799 to MacDonald, U.S. Pat. No. 6,356,377 to Bishop, et al. or U.S. Pat. No. 6,751,374 to Wu, et al. In any case, the delay is used in the system in order to permit laser interrogation of the material in the picosecond ($10^{-12}$ second) to femtosecond ($10^{-15}$ second) and, possibly, attosecond ($10^{-18}$ second) ranges. Such interrogation may be useful in detecting multiple charge decay-dependent data points along a single decay curve.

The subject methods include one that involves measuring an SHG signal for decay data points acquired after successive charge-up events. The conditions for obtaining a SHG signal may be different at each charge-up event. Additionally, the time interval between successive charge-up events may be different. In this method, the multiple data points (at least two but typically three or more) can be correlated and expressed as a single composite decay curve. Another method employs minimally disruptive (i.e., the radiation used to produce the SHG signal does not significantly recharge the material) SHG signal interrogation events after a single charging event.

Yet another method for determining transient charge decay involves measuring discharge current from the sample material (more accurately, its structures that were charged by optical radiation). The time dependence (kinetics) of this signal may then be treated in the same way as if SHG sensing had been employed. Further, as above, such sensing may be done in the span of one decay interval and/or over a plurality of them following charge to a given level. In any case, electrode-specific hardware for such use is detailed below.

Regarding charge or charging level, this may be taken to a point of apparent saturation when charge dynamics are observed in standard linear time or against a log time scale. Per above, the subject methodologies optionally observe, record and analyze charging kinetic as this may yield important information.

For successive charge/interrogation events, if an initial charge state of a sample is measured and the saturation level is not far from the initial charge state, the system may omit further or subsequent characterization. In this context, what may be regarded as "not far" may mean about 1% to about 10% of charge increase versus the initial charge state to be determined by learning when the subject tool is used for a given time of sampling.

Stated otherwise, so-called "saturation" is a relative term. Using a linear time scale, material will appear saturated very quickly. But if an SHG signal intensity associated with charging is observed in log scale from 10-100 seconds, it can be observed that the later part of saturation occurs with a different time constant and is relatively more gradual or time-consuming. Thus, while examples of the methodology provided herein discuss charging to saturation, the delay and other timing may be regarded as occurring with respect to apparent saturation. Rather than waiting the full amount of time for 100% saturation, as this may be unnecessarily time consuming to reach, instead, the instrument may delay until the time it takes to get to apparent saturation or the time in which can extract important parameters, regardless of how long it takes for full saturation.

Further, it is to be understood that when monitoring the amount or degree of charge-up toward saturation (e.g., in connection with SHG monitoring), the subject methods and systems may operate with charge and/or re-charging levels at less than saturation (as discussed above) while still yielding meaningful decay curve information. Without such measurement, however, when approximate saturation is a known parameter (e.g., by experience with the subject tool with a given material) charge to saturation is employed as the target level.

Notably, various interfacial material properties may also be determined using laser beam blocking or delay as further described in the portion of U.S. Provisional Application No. 61/980,860, filed on Apr. 17, 2014, titled "WAFER METROLOGY TECHNOLOGIES," referred to as Section III, titled "TEMPERATURE-CONTROLLED METROLOGY," which is incorporated herein by reference in its entirety. Introducing a DC bias across the sample being tested can also assist in analysis of the material. Employing a DC bias actively changes the initial charge distribution at the interfaces before photo-induced voltage has any effect. To do so, the sample being tested may be mounted atop a conductive chuck which can be used as a ground for DC biasing across the sample using sample top surface probes. Other means of introducing induced voltage biases are possible as well without the use of surface probes as further described in the portion of U.S. Provisional Application No. 61/980,860, filed on Apr. 17, 2014, titled "WAFER METROLOGY TECHNOLOGIES," referred to as Section IV entitled, "FIELD-BIASED SHG METROLOGY".

Also, the subject systems may use a secondary light source in addition to the primary laser involved in blocking-type analysis for charge decay determination. Such a set of sources may be employed as a radiation pump/probe combination as further described in the portion of U.S. Provisional Application No. 61/980,860, filed on Apr. 17, 2014, titled "WAFER METROLOGY TECHNOLOGIES," referred to as Section I entitled, "PUMP AND PROBE TYPE SHG METROLOGY".

All said, invention embodiments hereof include each of the methodology associated with the approaches described herein, alone or in combination with elements components or features from the different parts of this application, the referenced co-pending patent applications, and any documents incorporated by reference herein, hardware to carry out the methodology, productions systems incorporating the hardware and products (including products-by-process) thereof.

Part III

Various field-biased (e.g., magnetic-field biases, DC bias and/or voltage bias induced by an AC field alone, with a capacitive coupling and/or a changing magnetic field) SHG-based systems and their methods of use are described. These are treated in turn. They may be used independently and/or in a combined system. Various embodiments described herein include each of the methodology associated with the approaches described above, hardware to carry out the methodology, productions systems incorporating the hardware and products (including products-by-process) thereof.

Magnetic Field Bias

A static or changing magnetic field applied to the sample will cause the second order optical susceptibility tensor of a material to change. Thus, a magnetic field could be used to increase SHG signal from the sample, to an optimum value. Moreover, a changing magnetic field can be used to induce bias as further discussed below.

Induced Voltage Bias for Eliminating DC Contact Probes

Systems and methods are described for characterizing the SHG response of a layered semiconductor material that is subjected to a discrete electric field across its interfaces without use of contact bias probes in a system that can synchronize the pulses of a probing laser and/or the gating of a detector with a predetermined amplitude of voltage of an AC, variable or pulsed bias applied to the sample to produce a corresponding or coordinated induced voltage field at the surface to be interrogated.

The subject hardware comprises an SHG apparatus (e.g., further described in the portion of U.S. Provisional Application No. 61/980,860, filed on Apr. 17, 2014, titled "WAFER METROLOGY TECHNOLOGIES," referred to as Section II titled, "CHARGE DECAY MEASUREMENT SYSTEMS AND METHODS") together with a means of inducing (e.g., a component configured to induce) a voltage at or along the "device" surface of a sample without contact. Such means or component may be either via backside contact with probes or a conductive chuck, involving capacitively coupled probes connected to a power source also in communication with backside contact probes or such a chuck, or by applying a changing magnetic field to the sample, with the purpose of inducing an external voltage field across its multilayer interfaces.

A transient electric field produced by a variable waveform (optionally AC) power supply (via any of the approaches above) induces an electric field across the interfaces of the multilayer semiconductor material. The relationship between the voltage and the material interface electrical field may be modeled by a transfer function or otherwise, including by accounting for various (capacitive or otherwise) external influences. The output of this function, given a particular amplitude and frequency of AC (or other) current, may be employed as a timing cue to trigger the laser shutter and/or photon counter simultaneously for SHG characterization of the testing point for constant near-instantaneous values of the electric field amplitude at the interfaces. As such, the system is able to simulate a constant (DC) voltage applied topside (i.e., at the device layer of the substrate) via contact electrical probes.

With direct application of AC to the backside of the sample, the system begins with the chuck at a 'neutral' or ground state, and bulk and device layers at an equilibrium potential. Then, an alternating bias is applied to the chuck, which is in galvanic contact with the bulk, or substrate layer of the multilayered semiconductor material. Since the device layer is separated from the bulk by the buried oxide layer, and not directly connected with a conductor, an electric potential field, or voltage will be created (i.e., induced) between the device and bulk layers.

Alternatively, capacitively coupled probe(s) that reside near (within about 1 to about 2 mm) but without touching the top side of the sample may be employed. A preferred approach in this regard may be a plate sized to cover (but not touch) the entire wafer, hovering with a small hole for the incident laser to pass through on its way to the sample and for the SHG beam to pass through on its way out of the sample.

In some implementations, a non-contacting electrode can be implemented using MEMS technology. For example, in an implementation, a Si wafer can be oxidized on both sides. A spiral or a grid-like electrode can then be placed by deposition on one or more locations of the wafer. The oxide material can be removed from the back-side of the wafer at those locations. An electro-magnetic field applied to the electrode can inductively bias the wafer in such implementations through near-field inductive coupling. The magnetic field produced by an external electric current can be used to generate an electric current across the wafer by inducing a current in the deposited electrode. Other methods of implementing non-contacting probes can also be used.

In any case, SHG methodology is used to interrogate the sample, for example, as further described in the portion of U.S. Provisional Application No. 61/980,860, filed on Apr. 17, 2014, titled "WAFER METROLOGY TECHNOLOGIES," referred to as Section I titled, "PUMP AND PROBE TYPE SHG METROLOGY" and/or Section III, titled "TEMPERATURE-CONTROLLED METROLOGY," both of which are incorporated herein by reference in their entirety. The same holds true with respect to the other embodiments discussed below.

Regardless, in the subject embodiments, since it is desirable to monitor SHG as a function of the voltage across the interfaces, the SHG signal will be synchronized with the power supply. This synchronization can be accomplished by controlling the laser(s) used for SHG signal production and SHG signal processing software, the laser(s) alone, or only the SHG signal processing software, in time with voltage changes. The voltage of the chuck can also be controlled.

An advantage of this synchronization is that voltage biased SHG measurements can be obtained that would be similar to DC biased SHG measurements, without using contact voltage bias probes on the front surface of the wafer. Instead of applying a DC bias, the system would use an AC bias synchronized with SHG measurement and/or generation to collect SHG data at discrete points on the voltage cycle. The AC bias could be applied using near-field inductive coupling, or via capacitive coupling of the sample. SHG data collected with these biasing techniques would yield the same material properties information as DC biased SHG.

To reduce or minimize noise and obtain statistically relevant indicator(s) of SHG intensity as a function of voltage across the interfaces, multiple photon counting windows may be desirable as further described below.

Induced Voltage Bias for Characterizing Interfacial Leakage

Systems and methods are described for characterizing interfacial leakage current and/or carrier injection energies between layers of layered (e.g., semiconductor) materials using SHG and a voltage change (such as an alternating, variable and/or pulsed voltage or current signal or a device that changes magnetic field in a manner to induce voltage change in a device layer of a sample) applied to the layered semiconductor material as per above.

By measuring the SHG response from optical pulses generated by a pulsed laser directed at a layered semiconductor/dielectrics structure while or shortly after an alternating, variable or pulsed voltage is applied to the layered semiconductor material, interfacial leakage current and/or carrier injection energies between layers can be characterized. In some embodiments, the time evolution of the SHG signal from interfaces as a function of the time constant of decay of the induced voltage can be measured. This yields information about charge carrier mobility across the interfaces.

Induced Voltage Bias for Characterizing Threshold Carrier Injection Energy

Systems and methods are described for SHG measurement applied in connection with a varied electrical field at a sample device layer in lieu of using tunable wavelength laser excitation to determine energy thresholds for photo-induced charge carrier injection into the dielectric in a layered semiconductor material. More specifically, to measure the threshold energy necessary for photo-induced charge carrier injection into the dielectric one can expose the material to a substantially monochromatic incident photon beam for SHG production and then incrementally change voltage across an interface of the exposed layered semiconductor material, measuring SHG signal count at each incremental voltage change until the SHG response has significant inflection or discontinuity or sudden change in slope from prior measurements. This change in slope could be a maximum or minimum (e.g., local maximum or minimum) or cusp, or step function, etc. The net charge change transfer due to all these processes can be described as the integral of the contributions of the 3rd harmonic injection current, "forward" leakage current to the dielectric due to the strong electric field, and "backward" discharge leakage current. Put in equation form: $Q(t)=\int (I_X+I_E-I_L)dt$ Kinetic features of this curve shape (bending moment and saturation moments of time) will then provide information for determining threshold carrier injection energy.

All said, invention embodiments hereof include each of the methodology associated with the approaches described herein, alone or in combination with elements components or features from the different parts of this application, the referenced co-pending patent applications, and any documents incorporated by reference herein, hardware to carry out the methodology, productions systems incorporating the hardware and products (including products-by-process) thereof.

BRIEF DESCRIPTION OF THE DRAWINGS

The figures diagrammatically illustrate aspects of various embodiments of different inventive variations.

FIGS. 2A/2B and 3A/3B are diagrams illustrating example pump/probe system uses for producing characteristic SHG signals.

FIGS. 6A-6C are diagrams of systems embodiments;

FIGS. 15A and 15B are schematic diagrams of SHG system components as may be used herein.

FIGS. 17A and 17B are partial cutaway, perspective views of a second chuck configuration hereof; FIG. 17C is cutaway top view of the chuck in FIG. 17A/17B.

FIG. 24 illustrates example simulated intensities of the SHG signal (solid circles) for the structure shown in FIG. 22 for several values of Fin widths from 1 nm to 10 nm. This figure also illustrates how a SHG signal measurement may be used in combination with simulation results to determine a parameter of the device under test. The computer modelling of FIG. 24 may be repeated for variations in a device geometry parameter (e.g., the width of the fin, the height of the fin, etc.). In the example shown, the fin width is varied in the simulation from one nanometer to ten nanometers, and the results are stored, e.g., in computer memory. The results are shown as a graph 4670. An experimental data point 4680 is also plotted on the graph. In various implementations, a SHG signal can be measured using an SHG system such as shown, for example, in FIG. 20, 25 or 26 or using another configuration and the measured SHG signal can be compared with modeled results of SHG signals for different device parameters (e.g., fin widths) to determine the likely parameter value (e.g., fin width) associated with the measured SHG signal. For example, a measured SHG signal intensity value 4680 shown in FIG. 24 can be compared with signal intensity values determined for different parameter values (e.g., fin widths) using modeling to estimate a parameter value (e.g., fin width) associated with the measured SHG signal intensity. In FIG. 24, for example, the width of the fin is determined to be 5.5 nanometers by interpolating between calculated SHG intensity values such as for five nanometers and six nanometers fin widths.

DETAILED DESCRIPTION

Monitoring "critical dimensions" (CD) of semiconductor devices produced by a production line is an important aspect of semiconductor manufacturing. Given that even small changes in a critical dimension, e.g., due to a fabrication process variation, can affect the performance of the semiconductor device, it can be beneficial to capture the change in an early stage of the manufacturing process to avoid production of a large number of defective devices.

Conventional metrology tools used for semiconductor device monitoring may not simultaneously satisfy the many of the desired attributes of a metrological tool including sensitivity, precision, repeatability, reliability, and cost of monitoring. The optical metrological tools, techniques, and systems described below may overcome some of the challenges associated with semiconductor device monitoring (e.g., in-line monitoring) using second harmonic light (also referred to as second harmonic generated light) as a nondestructive probe for sample monitoring and evaluation. More specifically, second harmonic generation (SHG) systems for determining critical dimension (CD) of a sample, herein referred to as SHG-CD, are described. A SHG-CD may illuminate a sample with one or more light beams and use the resulting second harmonic generated light emitted by one or more the devices on a sample to determine a physical structure (e.g., shape and/or dimensions) of the devices and/or monitor changes in such features. The sample may comprise devices and structures (e.g., complete and/or incomplete devices and structures fabricated on a wafer). In some cases, the SHG-CD may also determine material properties (or changes in material properties) of a sample or a device or structure included in the sample, using the second harmonic light.

SHG Based Optical Wafer Metrology Techniques
Part I

Figure 1A:
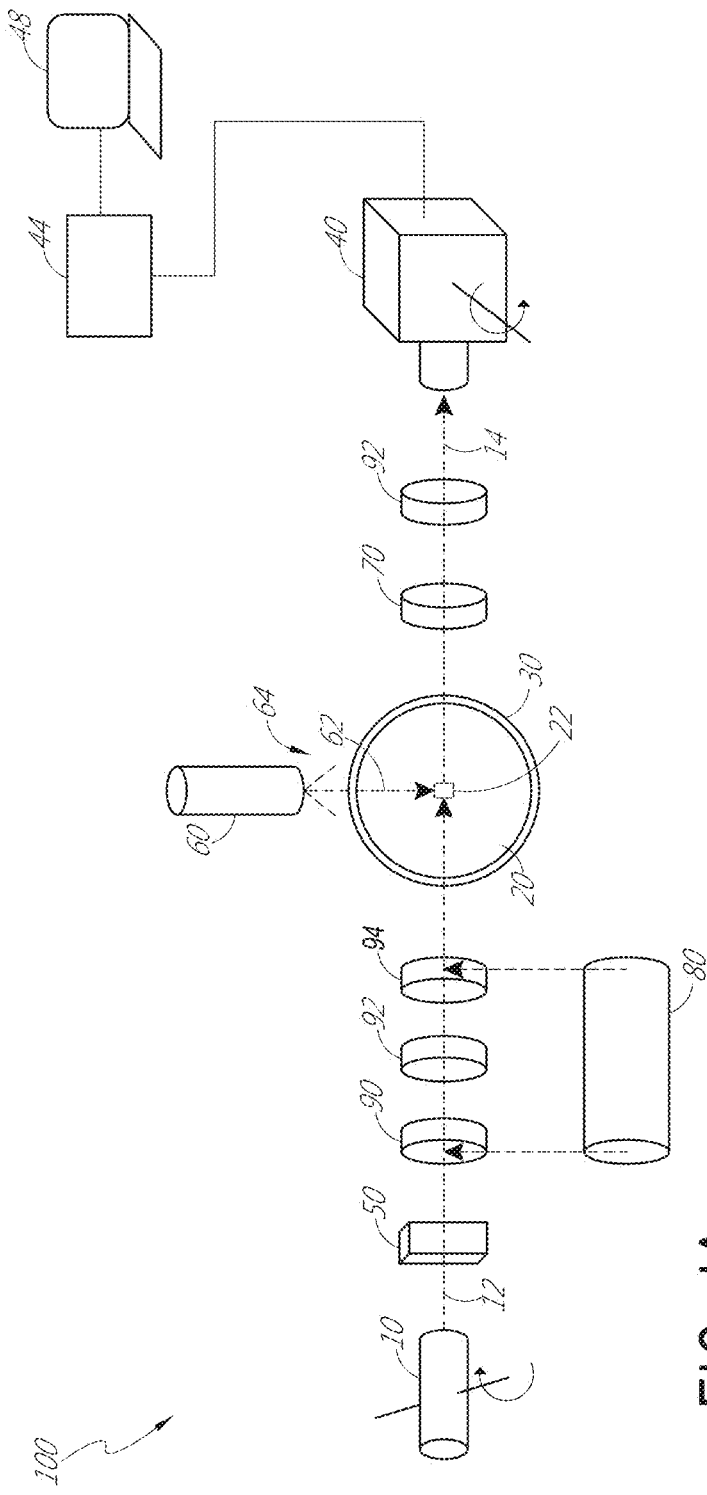
FIG. 1A is a diagram of an SHG metrology system embodiment hereof.

FIG. 1A is a diagram of a system 100 as may be employed in connection with methods for interrogating a sample, possibly to provide information regarding material properties (e.g., properties of electronic structure) of the sample. Other suitable system variations are presented in the portion of U.S. Provisional Application No. 61/980,860, filed on Apr. 17, 2014, titled "WAFER METROLOGY TECHNOLOGIES," referred to as Section II entitled, "CHARGE DECAY MEASUREMENT SYSTEMS AND METHODS" for example, as to intermediate optics, the inclusion of optical delay line(s) and optional electrode features.

Figure 1B:
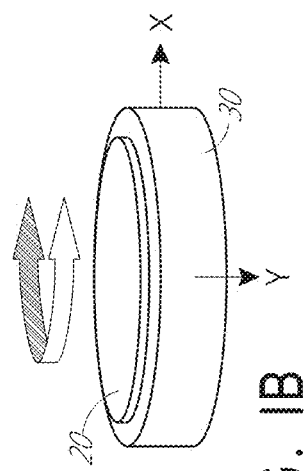
FIG. 1B is a perspective view of a chuck for use in such an SHG system.

As shown, system 100 includes a primary or probe laser 10 for directing an interrogation beam 12 of electro-magnetic radiation at a sample wafer 20, which is held by a vacuum chuck 30. As illustrated in FIG. 1B, the chuck 30 includes or is set on x- and y-stages and optionally also a rotational stage for positioning a sample site 22 across the wafer relative to where the laser(s) are aimed. The x-y stage enables scanning multiple wafer surface sites or locations 22 without movement of other hardware. A rotational stage optionally enables assessing crystal structure effects on SHG such as strain, and associated defects or areas of concern on materials being characterized. Further optional features, aspects and/or uses of chuck 30 are presented in portions of U.S. Provisional Application No. 61/980,860, filed on Apr. 17, 2014, titled "WAFER METROLOGY TECHNOLOGIES," referred to as Section IV entitled, "FIELD-BIASED SHG METROLOGY" and Section III titled "TEMPERATURE-CONTROLLED METROLOGY," both which are incorporated herein by reference in their entirety. The sample site 22 can include one or more layers. The sample site 22 can comprise a composite substrate including at least two layers. The sample site 22 can include an interface between two dissimilar materials (e.g., between two different semiconductor materials, between two differently doped semiconductor materials, between a semiconductor and an oxide, between a semiconductor and a dielectric material, between a semiconductor and a metal or an oxide and a metal).

When system 100 is in use, a beam 14 of reflected radiation directed at a detector 40 will include an SHG signal. The detector may be any of a photomultiplier tube, a CCD camera, a avalanche detector, a photodiode detector, a streak camera and a silicon detector. System 100 may also include one or more shutter-type devices 50. The type of shutter hardware used will depend on the timeframe over which the laser radiation is to be blocked, dumped or otherwise directed away from the sample site. An electro-optic blocking device such as a Pockel's Cell or Kerr Cell can be used to obtain very short blocking periods (i.e., with actuation times on the order of $10^{-9}$ to $10^{-12}$ seconds).

For longer blocking time intervals (e.g., from about $10^{-5}$ seconds and upwards) mechanical shutters or flywheel chopper type devices may be employed. However, electro-optic blocking devices will allow a wider range of materials to be tested in accordance with the methods below. A photon counting system 44 capable of discretely gating very small time intervals, typically, on the order of picoseconds to microseconds can be employed to resolve the time-dependent signal counts. For faster-yet time frames optical delay line(s) may be incorporated as noted above.

System 100 can include an additional electromagnetic radiation source 60 also referred to as a pump source. In various implementations, the radiation source 60 can be a laser illustrated as emitting a directed beam 62 or a UV flash lamp emitting a diverging or optically collimated pulse 64. In the case of a laser source, its beam 62 may be collinear with beam 12 (e.g., as directed by additional mirrors or prisms, etc.) Source 60 output wavelengths of light may be anywhere from about 80 nm and about 1000 nm. Using shorter wavelengths in this range (e.g. less than about 450 nm), is possible to drive charge excitation using fewer photons and/or with lower peak intensities than at longer wavelengths.

For a flash lamp, energy per flash or power level during flash may be substrate material dependent. A flashlamp producing a total energy of 1 J to 10 kJ per flash would be appropriate for fully depleted silicon-on-insulator (FD-SOI). However a pulsed or constant UV source would be viable as well. The important factor in the pump characteristics and use is that charge carriers are injected into the dielectric of the material to be interrogated. Manufacturers of suitable flash lamps include Hellma USA, Inc. and Hamamatsu Photonics K.K.

When a laser is employed as source 60, it may be any of a nanosecond, picosecond or femtosecond or faster pulse laser source. It may even be a continuous solid-state laser. In various embodiments, the pump source is tunable in wavelength. Commercially available options regarding lasers which are tunable include Spectra Physics' Velocity and Vortex Tunable Lasers. Additional tunable solid state solutions are available from LOTIS Ltd.'s LT-22xx series of solid state lasers.

Whether provided as a laser or a flash lamp, pump source 60 can be selected for relatively high average power. This could be from about 10 mW to about 10 W, but more typically from about 100 mW to about 4 W, depending on material to be interrogated (as, again, the consideration is ensuring that charge carrier mobility is induced in a way such that charge carriers are injected into the interface of the material (e.g., the dielectric interface), which can be material specific. The average power of the pump source 60 is selected to be below the optical damage threshold of the material. For example, pump source 60 can be selected to have an average optical power between 1-2 W when the interrogating material comprises silicon so as to not exceed the optical damage threshold for silicon.

Probe laser 10 may be any of a nanosecond, picosecond or femtosecond or faster pulse laser source. Two options that are currently commercially available lasers having the peak power, wavelength and reliability needed are doped fiber and Ti:Sapphire units. Coherent's VITESSE and Spectra Physics' MAI TAI lasers are examples of suitable Ti:Sapphire devices. Femtolasers Gmbh and others manufacture also manufacture other relevant Ti:Sapphire devices. Suitable doped fiber lasers are produced by IMRA, OneFive, and Toptica Photonics. Pico- and/or nano-second lasers from many manufacturers, such as Hamamatsu, may be options as well depending on the substrate material and pump type. Laser 10 may operate in a wavelength range between about 100 nm to about 2000 nm with a peak power between about 10 kW and 1 GW, but delivering power at an average below about 150 mW.

Various other optional so-called "intermediate" optical components may be employed in system 100. For example, the system may include a dichroic reflective or refractive filter 70 for selectively passing the SHG signal coaxial with reflected radiation directly from laser 10 and/or source 60. Alternatively, a prism may be employed to differentiate the weaker SHG signal from the many-orders-of-magnitude-stronger reflected primary beam. However, as the prism approach has proved to be very sensitive to misalignment, a dichroic system as referenced above may be preferred. Other options include the use of diffraction grating or a Pellicle beam splitter. An optical bundle 80 for focusing and collimating/columniation optics may be provided. Alternatively, a filter wheel 90, polarizer(s) 92 and/or zoom len(s) 94 units or assemblies may be employed in the system. Also, an angular (or arc-type) rotational adjustment (with corresponding adjustment for the detector) and in-line optical components may be desirable.

Figure 1C:
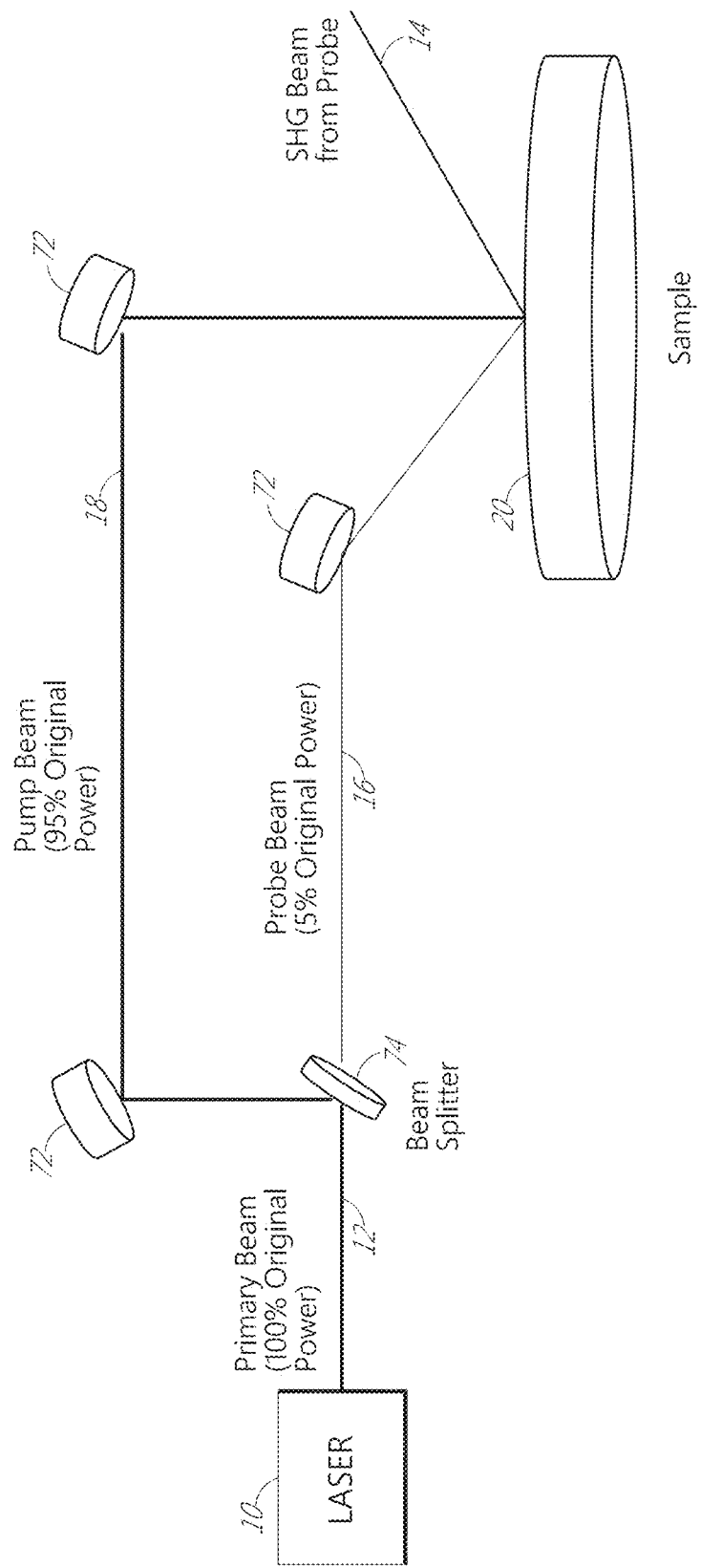
FIG. 1C is a diagram of another SHG metrology system embodiment hereof.

In the implementation illustrated in FIG. 1C, the beam 12 from the laser 10 can be split by a beam splitter 74 between two optical paths. The beam splitter 74 can split the beam 12 unequally between the two optical paths. For example, 70% of the energy of the beam 12 can be directed along a first optical path (e.g., as beam 16) and 30% of the energy of the beam 12 can be directed along a second optical path (e.g., as beam 18). As another example, 60% of the energy of the beam 12 can be directed along the first optical path and 40% of the energy of the beam 12 can be directed along the second optical path. As yet another example, 80% of the energy of the beam 12 can be directed along the first optical path and 20% of the energy of the beam 12 can be directed along the second optical path. The split may thus be unequal (e.g., 70-30%, 80-20%, 60-40% or any range therebetween, such as between 60-90% in one path and between 40-10% in another path as well as outside these ranges), sending a majority of the power in the pump beam, and a minority in the probe beam. For example, the split may be 60-70% and 40-30%, for the pump and probe, respectively, 70-80% versus 30-20% for the pump and probe, respectively, 80-90% versus 20-10%, for the pump and probe respectively, or 90-99.999% versus 10-0.001%, for the pump and probe respectively. In different embodiments, the probe beam could be between 0.001% to 49.99% while the pump beam could be between 50.001% and 99.999%, for example. The sum of the two beams may be 100% or approximate thereto. The split may be determined by the particular material system being characterized in some cases. In the example shown in FIG. 1C, 5% of the beam energy of the beam 12 is directed along the first optical path and 95% of the energy of the beam 12 is directed along the second optical path.

The beam splitter 74 can comprise a dielectric mirror, a splitter cube, a metal coated mirror, a pellicle mirror or a waveguide splitter. In implementations, where the beam 12 includes optical pulses, the beam splitter 74 can include an optical component having negligible dispersion that splits the beam 12 between two optical paths such that optical pulses are not broadened. As illustrated in FIG. 1C, each of the beams can be redirected or aimed using various mirror elements 72.

The output from the detector 40 and/or the photon counting system 44 can be input to an electronic device 48. The electronic device 48 can be a computing device, a computer, a tablet, a microcontroller or a FPGA. The electronic device 48 includes a processor that may be configured to execute one or more software modules. In addition to executing an operating system, the processor may be configured to execute one or more software applications, including a web browser, a telephone application, an email program, or any other software application. The electronic device 48 can implement the methods discussed herein by executing instructions included in a machine-readable non-transitory storage medium, such as a RAM, ROM, EEPROM, etc. The electronic device 48 can include a display device and/or a graphic user interface to interact with a user. The electronic device 48 can communicate with one or more devices over a network interface. The network interface can include transmitters, receivers and/or transceivers that can communicate such as, for example, wired Ethernet, Bluetooth®, or wireless connections.

Regarding other options, since an SHG signal is weak compared to the reflected beam that produces it, it is desirable to improve the signal-to-noise ratio of SHG counts. As photon counting gate times for the photon counting system 44 decrease for the blocking and/or delay processes described herein, improvement becomes even more important. One method of reducing noise that may be employed is to actively cool the photon counter. This can be done using cryogenic fluids such as liquid nitrogen or helium or solid state cooling through use of a Peltier device. Others areas of improvement may include use of a Marx Bank Circuit (MBC) as relevant to shutter speed. Moreover, system 100 may be incorporated in-line within a production line environment. Production line elements preceding or following system 100 may include any of epitaxial growth system, lithography and/or deposition (CVD, PVD, sputtering, etc.) systems.

Turning now to FIGS. 2A/2B and 3A/3B, these are schematic diagrams illustrating example types of SHG curves that may be produced with the subject pump/probe system in their methods of use. In FIGS. 2A and 2B, the timescale to obtain such signals in on the order of milliseconds ($10^{-3}$ s). Thus, these are "fast" processes. As further discussed below, they may offer several orders of magnitude of time-wise improvement relative to existing approaches. For example, a flash lamp capable of exposing the entire surface of a test material to UV radiation prior to SHG probing drastically reduces the overall scan time since sustained measurements at each point may not be required.

Specifically, in FIG. 2A an SHG signal 200 is measured with an initial intensity 202. This signal is produced by the probe source radiation applied at a surface location. Upon adding pump source radiation (to that of the probe which stays on) after a given temporal offset (01), the signal intensity drops along a time-dependent curve 204 to a lower level 206. Conversely, in FIG. 2B SHG signal 200' at a lower level 212 produced by probe radiation alone increases along a time-dependent curve 214 to a higher plateau 216 upon applying pump radiation after a time offset (02). Signals 200 and 200' also include a time-independent component or portion at the beginning and end of the curves.

Both observations in FIGS. 2A and 2B may be made with the subject system depending on substrate material and different laser powers (e.g., in this case, that of the pump). In various embodiments charge separation comprise electrons and holes separating from each other after excitation from a photon. Electrons injected into the $SiO_2$ conduction band from the silicon valence band by the photons from the laser are trapped primarily on the top surface of the oxide. The holes congregate mostly in the silicon valence band close to the $Si/SiO_2$ interface. This separation of charge carriers due to excitation from the incident radiation or from internal photoemission contributes to the electric field(s) present inside the subject system, which in turn changes the SHG measured. Various factors, such as the presence of gaseous Oxygen at the testing site, as well as the composition and structure of the sample in question, will determine whether the observation is made as in FIG. 2A or 2B.

Indeed, a combination of signals 200 and 200' has been observed in some instances. In those instances, the signal intensity first dropped from a peak, bottomed out, and then rose to an asymptote again. Generally, the SHG intensity curves are determined by the non-linear susceptibility tensor, which is in turn affected by molecular orientation, atomic organization, electronic structure and external fields. Charge carriers moving across the interface will change the charge state in the structure and the electric field in the sub-interfacial layer where the SHG signal generation occurs. Depending on the type (positive or negative) of charge carriers crossing the interface, and the initial state of the field across the interface, different time-dependent curves will be observed. The intensity of the detected SHG signal can depend on various factors including spot size, average laser power, and peak laser power. In various implementations, the system 100 can be configured to detect SHG signal having an intensity in a range between about 400 counts/second and about 7 million counts/second. The pump/probe system described herein can reduce the time required for the charge carriers moving across the interface to reach a saturation level. In various embodiments, the time required for the charge carriers moving across the interface to reach a saturation level can between 1 millisecond and 1000 seconds in the pump/probe system described herein. Since it may be advantageous to obtain the time evolution of the SHG signal when the charge carrier density in the region including interface is below saturation as well as when the charge carrier density in the region including interface reaches saturation level, the system can be configured to obtain SHG signal measurements within about 1 microsecond after turning on/turning off the pump radiation. For example, the system can be configured to obtain SHG signal measurements within 10 seconds after turning on/turning off the pump radiation (or probe radiation), within about 6 seconds after turning on/turning off the pump radiation (or probe radiation), within about 1 second after turning on/turning off the pump radiation (or probe radiation), within about 100 milliseconds after turning on/turning off the pump radiation (or probe radiation) or within about 1 millisecond after turning on/turning off the pump radiation (or probe radiation), within 1 microsecond after turning on/turning off the pump radiation (or probe radiation), within 1 nanosecond after turning on/turning off the pump radiation (or probe radiation) or in any range formed by any of these values (for example, for time periods greater than a nanosecond, greater than a microsecond, greater than a millisecond, etc.) as well as outside any of those ranges. These values and ranges apply for obtaining data obtained from a single point, but with proper imaging optics, could be increased to substantial areas of the wafer, up to and including the entire wafer at once. As indicated by the parentheticals above, these values and ranges also apply to the probe radiation. Reducing the charging time and the time required to obtain the SHG signal can allow for faster testing of interfaces and thus increase through-put of testing and/or manufacturing production lines.

Figure 3B:
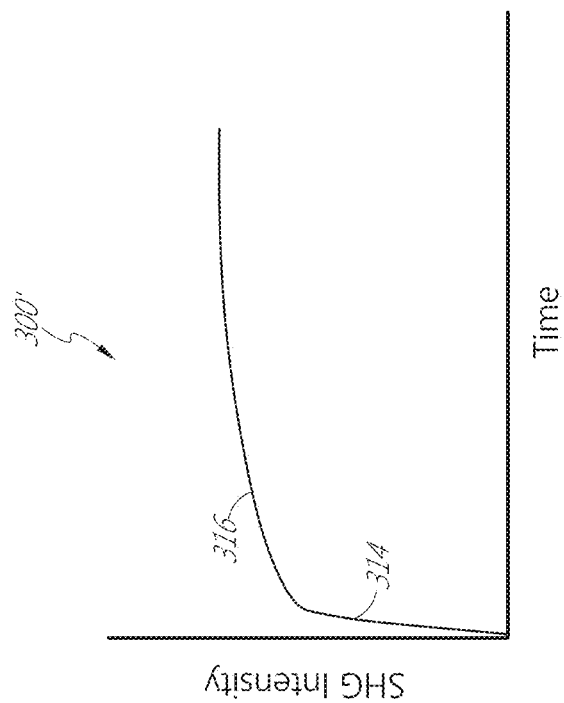
Figure 3A:
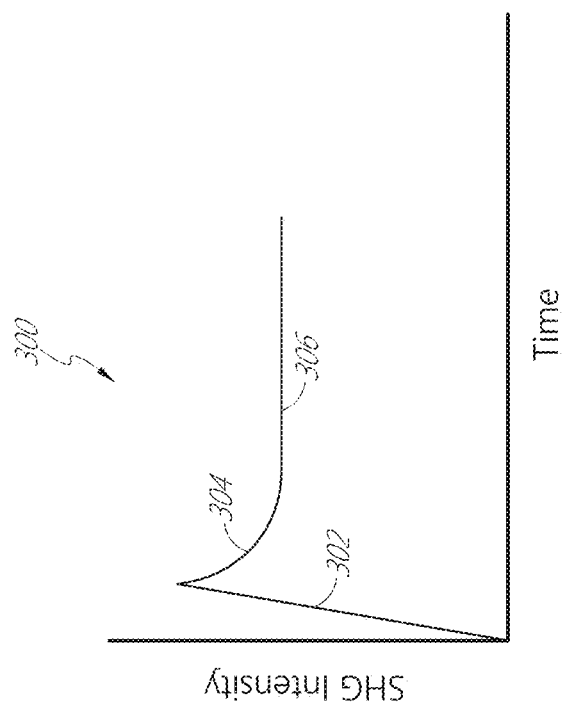

By way of comparison, FIGS. 3A and 3B schematically illustrate SHG signal curves 300 and 300' for corresponding materials in which only one radiation source is used (in this case a high average power and high peak power laser) to interrogate the substrate as in existing SHG techniques. The time scale for generating signal curves 300 and 300 in FIGS. 3A and 3B is on the order of tens-to hundreds ($10^2$ s) seconds.

Over such time, these signals (like the signals in FIGS. 2A and 2B) include lower and upper plateaus 306, 316 that can be characterized after initial 302 and/or time-dependent signals. Thus, while similar (or identical) analysis may be performed with the signals 200/200' and 300/300', the main difference is that with the subject systems (i.e., using a lower peak power femto-second probe laser in conjunction with a higher average power pump for material pre-excitation)

allows for vastly improved time-wise efficiency in obtaining the requisite signal information. Moreover, the subject approach provides a way to more easily determining time-independent SHG measurements without the use of a filter-wheel or some other method.

Figure 4:
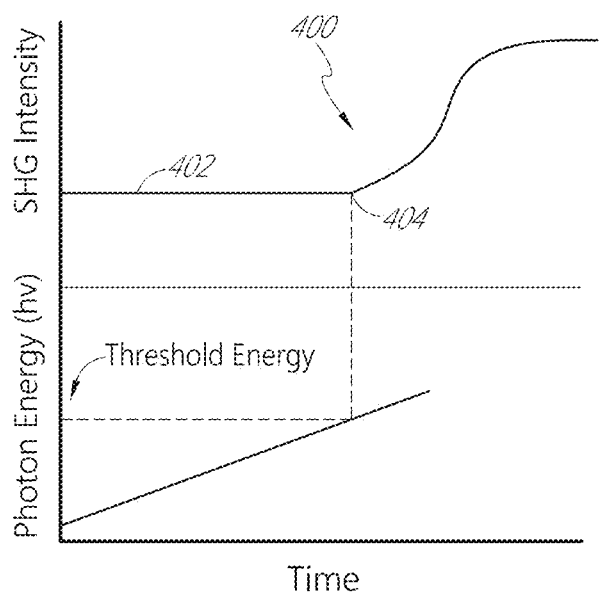
FIG. 4 is a diagram illustrating probe/pump system use to determine threshold injection carrier energy.

In any case, FIG. 4 illustrates a method for determining threshold injection carrier energy. In this case, the pump comprises a tunable wavelength laser. This allows ramp-up of the output frequency (and hence energy by E=hv) of the photons over time from the pump incident on the sample. The observed SHG activity action is illustrated as signal 400. With the pump laser so-applied or engaged, an initial SHG signal level 402 generated by application of a probe laser is observed to the point the signal suddenly changes (i.e., producing an inflection, discontinuity, maximum, minimum, step function, cusp, or sudden change in slope of sorts at 404). The frequency at this point is taken to correspond to the threshold energy. In various implementations, the threshold energy is the energy required to transport electrons from the valence band of one semiconductor material to the conduction band of another semiconductor material across an interface between two materials such as two semiconductor materials or a semiconductor material and a dielectric material (e.g., Si and $SiO_2$, Si and $Si_3N_4$, Si and $Ta_2O_5$, Si and $BaTiO_3$, Si and $BaZrO_3$, Si and $ZrO_2$, Si and $HfO_2$, Si and $La_2O_3$, Si an $Al_2O_3$, Si and $Y_2O_3$, Si and $ZrSiO_4$). The system 100 can be configured to measure threshold energy in the range between about 1.0 eV and about 6.0 eV. The systems and methods described herein can be configured to determine threshold energy for a variety of interfaces such as for example, between two different semiconductors, between a semiconductor and a metal, between a semiconductor and a dielectric, etc.

Figure 5:
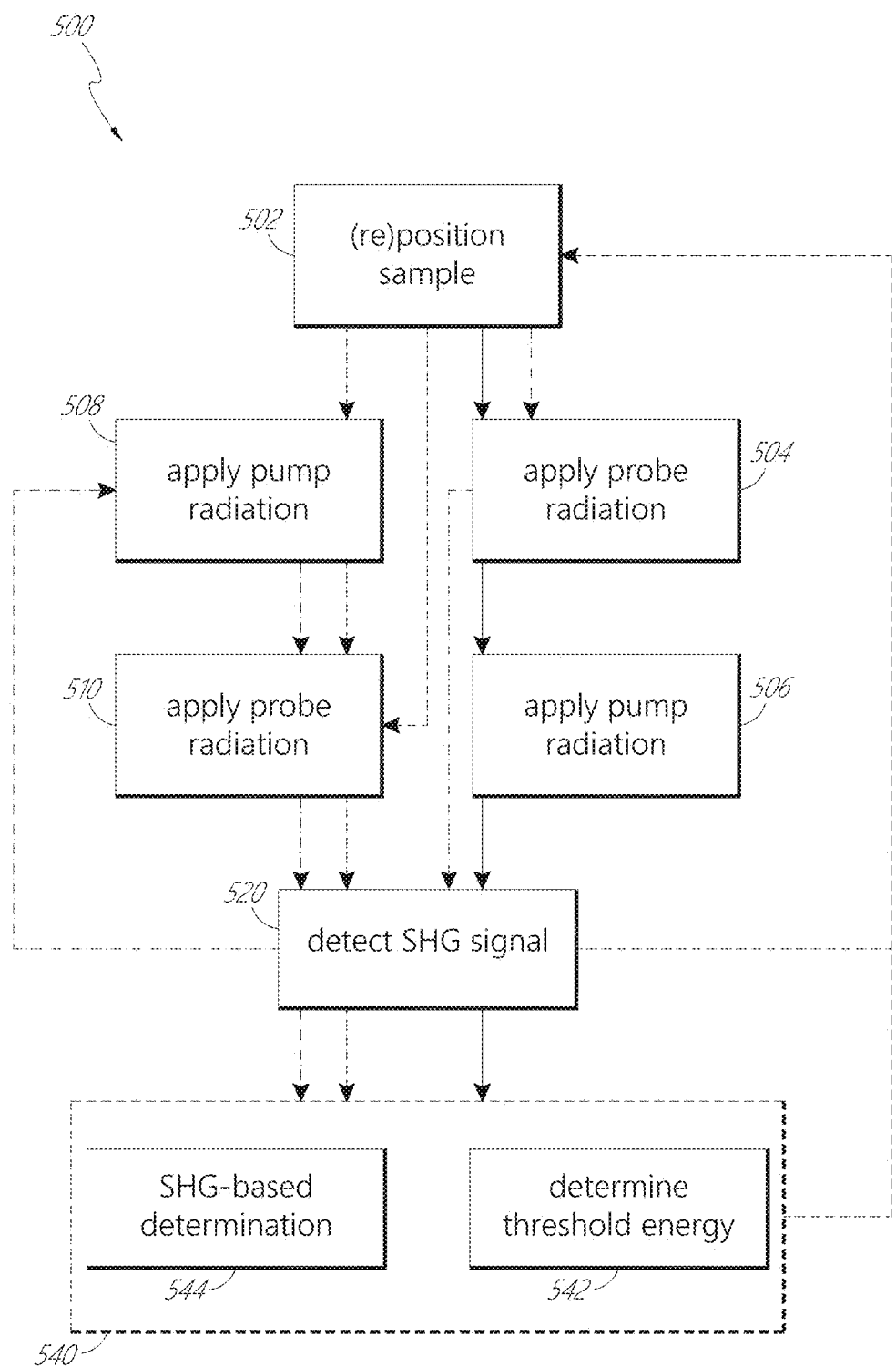
FIG. 5 is a flowchart detailing methods to produce signals as presented in the diagrams.

FIG. 5 is a flowchart 500 illustrating an implementation of a method for characterizing semiconductor devices with SHG. Various process flowpaths are indicated. Any such methods may begin at 502 with positioning a sample at a desired location (e.g., typically by locating chuck 30 after a wafer 20 has been secured thereto). Progressive positioning (i.e., re-positioning) may occur after any given SHG detection event 520 as further described for scanning multiple surface positions or even every surface position in a region of the sample or even every surface position of the sample. Alternatively, such action may occur after a given determination at 540 is made concerning a detected SHG signal (either "return" option indicated by dotted line). Further details regarding alternative determinations may be appreciated in reference to the other portions of this application referenced above. In any case, following sample positioning or re-positioning, a given flowpath is selected (or another flowpath may be run at the same surface position after in sequence to generate different data).

Following a one process flowpath (solid lines, in part), at 504 probe source radiation is applied to the sample surface at a given location. Next, at 506 pump source radiation is applied. In this example, the pump radiation is applied in a varying manner that (optionally) increases photon energy linearly by decreasing the radiation wavelength. The resulting SHG is detected at 520. At 542 signal analysis (per the example in FIG. 4) allows for carrier injection threshold energy to be determined. In various implementations, the energy of the pump radiation can correspond to the threshold energy of the semiconductor interface. Accordingly, the energy of the pump radiation can be between about 1.0 eV and about 6.0 eV. For example, to determine the threshold energy across a Si and $SiO_2$ interface, the threshold energy of the pump radiation can vary between about 4.1 eV and about 5.7 eV. Variation in the energy of the pump radiation can be accomplished by varying the frequency (or wavelength) of the radiation. For example, to interrogate a sample with an expected value of the threshold energy around 3.2 eV, the wavelength of the pump radiation can be varied between about 443 nm and about 365 nm. In various implementations, the energy of the pump radiation can be below the threshold energy of the semiconductor interface since the photons from the pump radiation can generate electrons with twice energy (e.g., when a single electron absorbs two photons). In such implementations, the charging time is increased which may provide observation with increases resolution and intensity. Increasing the charging time can also increase the time required to test a sample site which can reduce throughput.

Following another flowpath (dashed lines, in part), at 508 pump radiation is applied to the substrate. Such application may be directed only at the surface (e.g., by a laser) to be immediately interrogated or the entire surface of the wafer (e.g., using a flash lamp). Next, at 510 the section of the sample to be interrogated is exposed to probe source radiation. The resulting SHG is detected at 520. The pump-probe-detect aspects of the method may then repeat potentially after sample repositioning at 502. As indicated, however, action box 508 may be skipped and pumping again may be avoided or omitted from a sequential scanning process, as in the example above where the whole substrate was initially exposed to pump radiation. In any case, at 544 any of a variety of SHG-based signal analysis may be conducted to make a determination other than for threshold energy as in block 542 as discussed elsewhere in this patent application.

Following another process flow path (dash-and-dot/centerline lines, in part) probe interrogation is performed at 504 and 510 before and after pump radiation is applied at 508 with SHG signal data collection at 520 directly after probe radiation application at 504 and 510. Again, this method may be done recursively to sample a plurality of sites such as every section of a substrate or a region thereof, returning to flowchart element 502 for repositioning and the probe-detect-pump-probe-detect method or sub-method repeated.

Notably, any of the SHG signal analysis methods or sub-methods (generically embraced in box 540 and 542) can be performed in real-time, as in instantaneous or near-instantaneous output. In doing so, any of the spectrographic properties determined by the data gathered can be computed by a software package either by integrated software on the machine or remotely. Alternatively, SHG signal analysis may be handled in post-processing after some or all of the SHG data has been detected or collected.

The systems and methods described herein can be used to characterize a sample (e.g., a semiconductor wafer or a portion thereof). For example, the systems and methods described herein can be used to detect defects or contaminants in the sample as discussed above. The systems and methods described herein can be configured to characterize the sample during fabrication or production of the semiconductor wafer. Thus, the systems and methods can be used along a semiconductor fabrication line in a semiconductor fabrication facility. The systems and methods described herein can be integrated with the semiconductor fabrication/production line. The systems and methods described herein can be integrated into a semiconductor fab line with automated wafer handling capabilities. For example, the system can be equipped with an attached Equipment Front End Module (EFEM), which accepts wafer cassettes such as a Front Opening Unified Pod (FOUP). Each of these cassettes can be delivered to the machine by human operators or by automated cassette-handling robots which move cassettes from process to process along fabrication/production line.

In various embodiments, the system can be configured such that once the cassettes are mounted on the EFEM, the FOUP is opened, and a robotic arm selects individual wafers from the FOUP and moves them through an automatically actuated door included in the system, into a light-tight process box, and onto a bias-capable vacuum chuck. The chuck may be designed to fit complementary with the robotic arm so that it may lay the sample on top. At some point in this process, the wafer can be held over a scanner for identification of its unique laser mark.

Accordingly, a system configured to be integrated in a semiconductor fabrication/assembly line can have automated wafer handling capability from the FOUP or other type of cassette; integration with an EFEM as discussed above, a chuck designed in a way to be compatible with robotic handling, automated light-tight doors which open and close to allow movement of the robotic wand/arm and software signaling to EFEM for wafer loading/unloading and wafer identification.

Part II

Figure 6C:
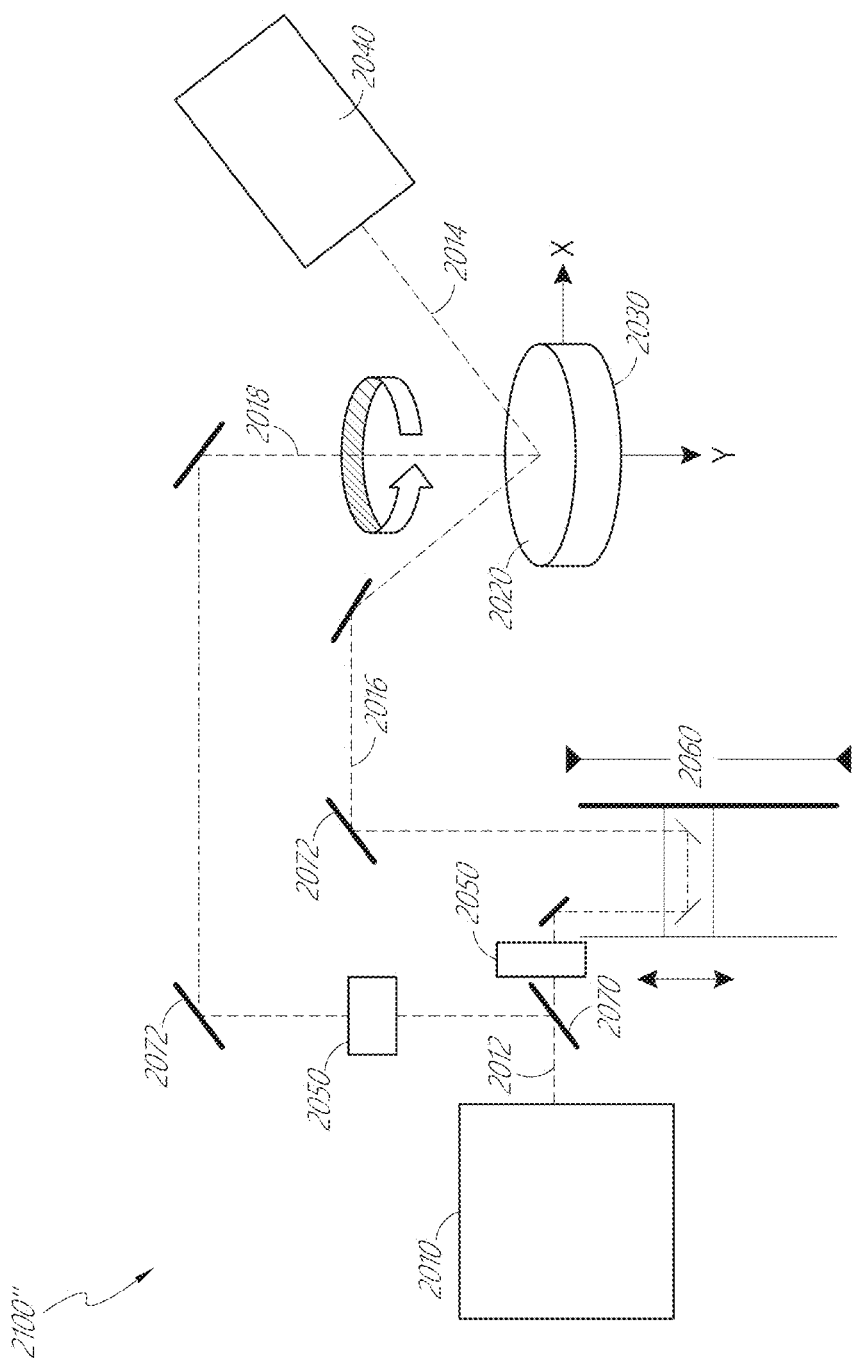

FIG. 6A is a diagram of a first system 2100 as may be employed in connection with interrogation of samples using second harmonic generation. Alternative systems 2100' and 2100" are shown in FIGS. 6B and 6C. Each system includes a primary laser 2010 for directing a primary beam 2012 of electro-magnetic radiation at a sample wafer 2020, which sample is held by a vacuum chuck 2030. The chuck 2030 includes or is set on x- and y-stages and optionally also a rotational stage for positioning a sample site 2022 across the wafer relative to where the laser(s) are aimed. A beam 2014 of reflected radiation directed at a detector 2040 will include an SHG signal. The detector may be any of a photomultiplier tube, a CCD camera, an avalanche detector, a photodiode detector, a streak camera and a silicon detector. The sample site 2022 can include one or more layers. The sample site 2022 can comprise a composite substrate including at least two layers. The sample site 2022 can include an interface between two dissimilar materials (e.g., between two different semiconductor materials, between two differently doped semiconductor materials, between a semiconductor and an oxide, between a semiconductor and a dielectric material, between a semiconductor and a metal, between an oxide and a metal, between a metal and a metal or between a metal and a dielectric).

Also common to each of the embodiments is the inclusion of one or more shutter-type devices 2050. These are employed as described in connection with the methodology below. The type of shutter hardware used will depend on the timeframe over which the laser radiation is to be blocked, dumped or otherwise directed away from the sample site.

An electro-optic blocking device such as a Pockel's Cell or Kerr Cell is used to obtain very short blocking periods (i.e., with switching times on the order of $10^{-9}$ to $10^{-12}$ seconds). For longer blocking time intervals (e.g., from about $10^{-5}$ seconds and upwards) mechanical shutters or flywheel chopper type devices may be employed.

However, electro-optic blocking devices will allow a wider range of materials to be tested in accordance with the methods below. A photon counting system 2044 capable of discretely gating very small time intervals, typically, on the order of picoseconds to microseconds can be included to resolve the time-dependent signal counts.

Hardware is contemplated for pushing the methods into faster-yet time frames. Namely, as shown in FIG. 6C, the system(s) may include delay line hardware 2060. Beam splitting and switching (or shuttering on/off) between a plurality of set-time delay lines for a corresponding number of time-delayed interrogation events is possible. However, a variable delay line may be preferred as offering a single solution for multiple transient charge decay interrogation events on a time frame ranging from immediately (although delay of only $10^{-12}$ seconds may be required for many methodologies) to tens of nanoseconds after pump pulse. The desired delay time may even go into the microsecond regime if using a slower, kilohertz repetition laser. And while such hardware is uniquely suited for carrying out the subject methodology (both of which methodology and such hardware is believed heretofore unknown), it might be put to other uses as well.

In the implementation illustrated in FIG. 6C, the beam 2012 from the laser 2010 can be split by a beam splitter 2070 between two optical paths. The beam splitter 2070 can split the beam 2012 unequally between the two optical paths. For example, 70% of the energy of the beam 2012 can be directed along a first optical path (e.g., as beam 2016) and 30% of the energy of the beam 2012 can be directed along a second optical path (e.g., as beam 2018). As another example, 60% of the energy of the beam 2012 can be directed along the first optical path and 40% of the energy of the beam 2012 can be directed along the second optical path. As yet another example, 80% of the energy of the beam 2012 can be directed along the first optical path and 20% of the energy of the beam 2012 can be directed along the second optical path. The beam splitter 2070 can comprise a dielectric mirror, a splitter cube, a metal coated mirror, a pellicle mirror or a waveguide splitter. In implementations, where the beam 2012 includes optical pulses, the beam splitter 2070 can include an optical component having negligible dispersion that splits the beam 2012 between two optical paths such that optical pulses are not broadened. As indicated by the double-arrow in FIG. 6C, the path of an "interrogation" beam 2016 taken off a beam splitter 2070 from primary beam 2012 can be lengthened or shortened to change its arrival timing relative to a "pump" beam 2018 wherein each of the beams are shown directed or aimed by various mirror elements 2072. Another approach (mentioned above) employs fiber optics in the optical delay component and/or other optical pathways (e.g., as presented in U.S. Pat. No. 6,819,844 incorporated herein by reference in its entirety for such description).

The output from the detector 2040 and/or the photon counting system 2044 can be input to an electronic device 2048 (see, e.g., FIGS. 6A and 6B). The electronic device 2048 can be a computing device, a computer, a tablet, a microcontroller or a FPGA. The electronic device 2048 includes a processor or processing electronics that may be configured to execute one or more software modules. In addition to executing an operating system, the processor may be configured to execute one or more software applications, including a web browser, a telephone application, an email program, or any other software application. The electronic device 2048 can implement the methods discussed herein by executing instructions included in a machine-readable non-transitory storage medium, such as a RAM, ROM, EEPROM, etc. The electronic device 2048 can include a display device and/or a graphic user interface to interact with a user. The electronic device 2048 can communicate with one or more devices over a network interface. The network interface can include transmitters, receivers and/or transceivers that can communicate over wired or wireless connections.

Figure 10:
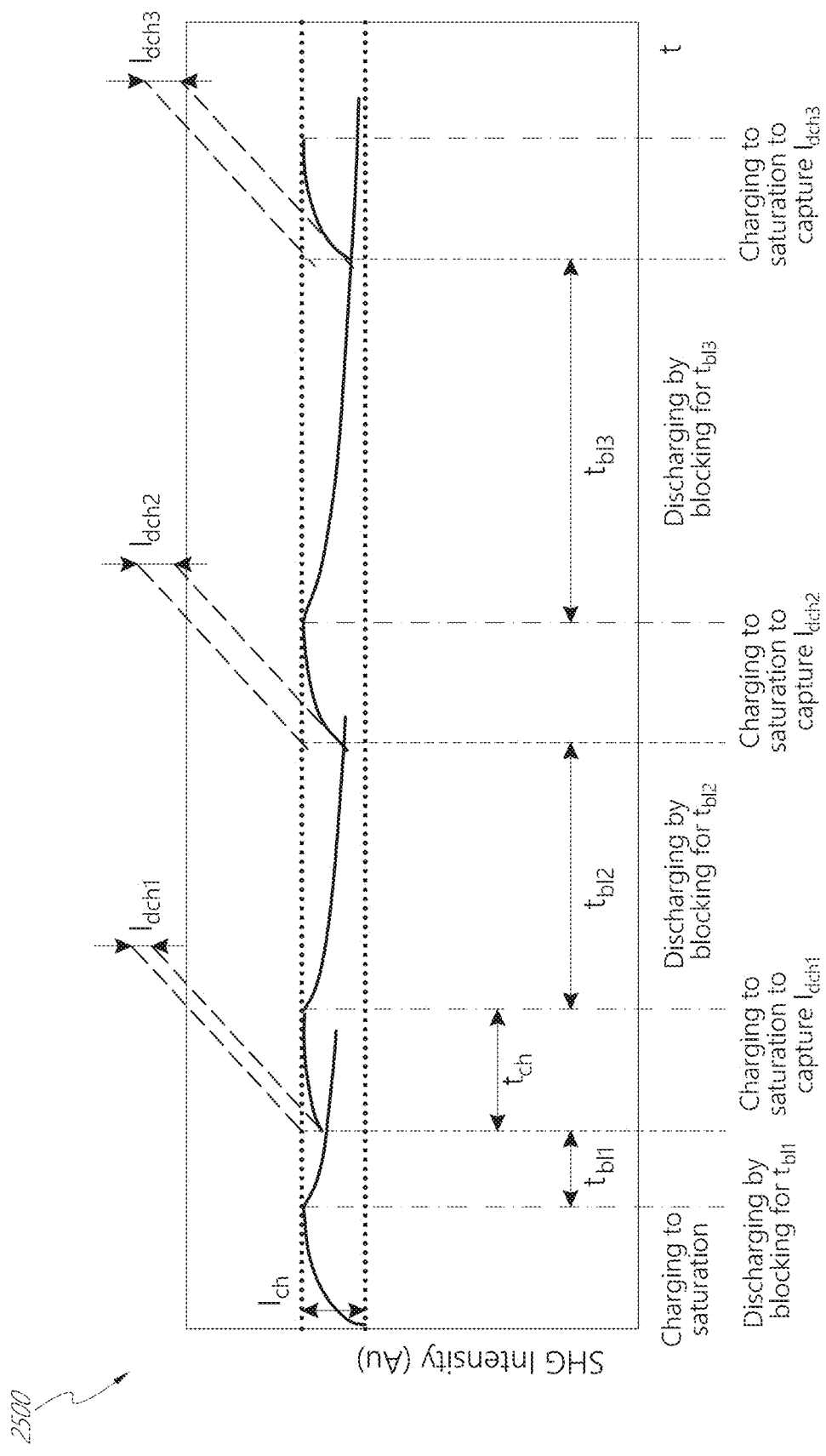
FIGS. 10 and 11 plot SHG interrogation-related method embodiments.
Figure 11:
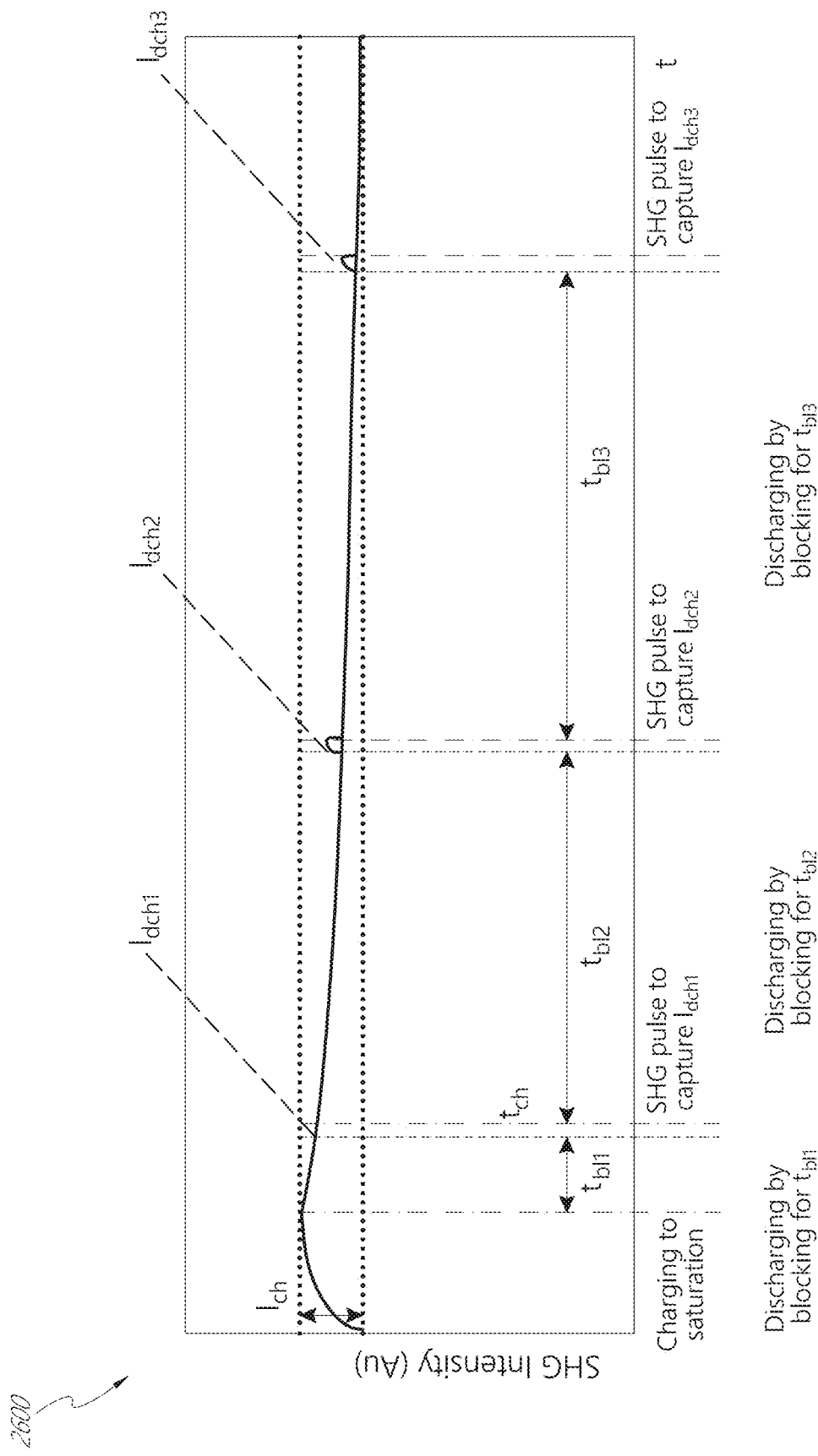

Another potential aspect of system 2100" concerns the manner in which the initial beam splitter works. Namely, the split may be unequal (e.g., 70-30%, 80-20%, 60-40% or any range therebetween, such as between 60-90% in one path and between 40-10% in another path as well as outside these ranges), sending a majority of the power in the pump beam, and a minority in the probe beam. For example, the split may be 60-70% and 40-30%, for the pump and probe, respectively, 70-80% versus 30-20% for the pump and probe, respectively, 80-90% versus 20-10%, for the pump and probe respectively, or 90-99.999% versus 10-0.001%, for the pump and probe respectively. In different embodiments, the probe beam could be between 0.001% to 49.99% while the pump beam could be between 50.001% and 99.999%, for example. The sum of the two beams may be 100% or approximate thereto. The split may be determined by the particular material system being characterized in some cases. The value (at least in part) of doing so may be to help facilitate methods such as shown in FIGS. 10 and 11 in which the power involved in SHG interrogation subsequent to material charging is desirably reduced or minimized as discussed below. Still another aspect is that the pump and probe beams are brought in at different angles. Such an approach facilitates measuring pump and probe SHG responses separately. In such cases, two detectors may be advantageously employed with one for each reflected beam path.

Various other optional optics distinguish the embodiments shown. For example, embodiments 2100 and 2100' are shown including a dichroic reflective or refractive filter 2080 for selectively passing the SHG signal coaxial with reflected radiation directly from the laser 2010. Alternatively, a prism may be employed to differentiate the weaker SHG signal from the many-orders-of-magnitude-stronger reflected primary beam. However, as the prism approach has proved to be very sensitive to misalignment, a dichroic system as referenced above may be preferred. Other options include the use of diffraction grating or a Pellicle beam splitter. As shown in system 2100, an optical bundle 2082 of focusing and collimating/collimation optics may be provided. As shown in system 2100', a filter wheel 2084, zoom lens 2086 and/or polarizers 2088 may be employed in the system(s). Also, an angular (or arc-type) rotational adjustment (with corresponding adjustment for the detector 2040 and in-line optical components) as shown in system 2100' may be desirable. An additional radiation source 2090 (be it a laser illustrated emitting a directed beam 2092 or a UV flash lamp emitting a diverging or optically collimated or a focused pulse 2094) may also be incorporated in the system(s) to provide such features as referenced above in connection with the portion of U.S. Provisional Application No. 61/980, 860, filed on Apr. 17, 2014, titled "WAFER METROLOGY TECHNOLOGIES," referred to as Section I entitled "PUMP AND PROBE TYPE SHG METROLOGY," and/or initial charging/saturation in the methods below.

In these systems, laser 10 may operate in a wavelength range between about 700 nm to about 2000 nm with a peak power between about 10 kW and 1 GW, but delivering power at an average below about 100 mW. In various embodiments, average powers between 10 mW and 10 W should be sufficient. Additional light source 2090 (be it a another laser or a flash lamp) may operate in a wavelength range between about 80 nm and about 800 nm delivering an average power between about 10 mW and 10 W. Values outside these ranges, however, are possible.

Regarding other system options, since an SHG signal is weak compared to the reflected beam that produces it, it may be desirable to improve the signal-to-noise ratio of SHG counts. As photon counting gate times decrease for the blocking and/or delay processes described herein, improvement becomes even more useful. One method of reducing noise that may be employed is to actively cool the detector. The cooling can decreases the number of false-positive photon detections that are generated randomly because of thermal noise. This can be done using cryogenic fluids such as liquid nitrogen or helium or solid state cooling through use of a Peltier device. Others areas of improvement may include use of a Marx Bank Circuit (MBC) as relevant to shutter speed.

These improvements may be applied to any of the systems in FIGS. 6A-6C. Likewise, any or all of the above features described above in connection with systems 2100 and 2100' may be incorporated in system 2100". Indeed a, mix-and-match of features or components is contemplated between all of the systems.

Figure 7:
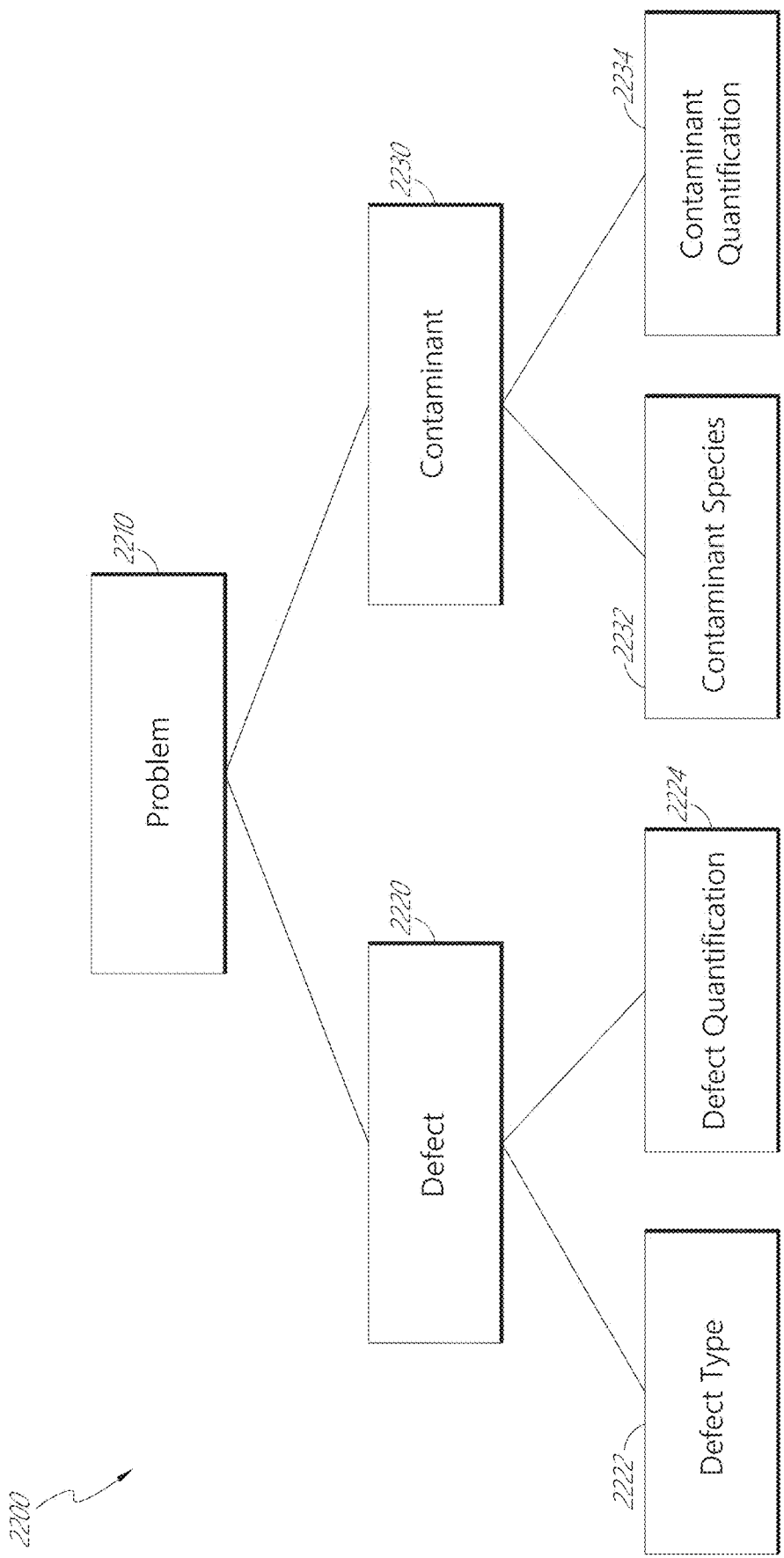
FIG. 7 is a chart of system function.

With such systems running the subject methodology, various determinations can be made not heretofore possible using laser-blocking and/or delay related techniques. FIG. 7 illustrates a process map or decision tree 2200 representing such possibilities. Namely, a so-called problem 2210 that is detected can be parsed between a defect 2210 (extended defects such as bond voids or dislocations, Crystal Originated Particle (COP) or the like) and a contaminant 2220 (such as copper inclusion or other metals in point defect or clustered forms). In terms of a defect, the defect type 2222 and/or a defect quantification 2224 determination (e.g., in terms of density or degree) can also be made. In terms of a contaminant, the contaminant species or type 2232 and/or a contaminant quantification 2234 determination can be made. Such parsing between defect and contaminant and identification of species may be performed in connection with determining charge carrier lifetimes, trap energies, trap capture cross-section and/or trap densities then comparing these to values in look-up tables or databases. Essentially these tables or databases include listings of properties of the material as characterized by the subject methods, and then matching-up the stated properties with entries in a table or database that correspond to particular defects or contaminants.

Trap capture cross-section and trap density may be observed in connection with, optionally, detected charging kinetics. As for determining charge carrier lifetimes and trap energies, the following equation based on work by I. Lundstrom, provides guidance:

$$\tau = \tau_0 \exp\left\{\frac{4}{3\hbar}\sqrt{2em_{ox}^*}[\phi_T^{3/2} - (\phi_T - E_{ox}d_T)^{3/2}]/E_{ox}\right\}$$

where $\tau$ is the tunneling time constant for the tunneling mechanism of the trap discharge, <r denotes the trap energy, $E_{ox}$ denotes the strength of the electric filed at the interface and the remaining equation variables and context are described at I. Lundstrom, JAP, v. 43, n. 12, p. 5045,1972 which subject matter is incorporated by reference in its entirety. Further modeling and calculation options may be appreciated in reference to the portion of U.S. Provisional Application No. 61/980,860, filed on Apr. 17, 2014, titled "WAFER METROLOGY TECHNOLOGIES," referred to as Section III, titled "TEMPERATURE-CONTROLLED METROLOGY," which is incorporated herein by reference in its entirety.

In any case, the decay curve data obtained by the subject sample interrogation can be used to determine the parameters of trap energy and charge carrier lifetime by use of physical models and related mathematics. Representative sets of curves 2300, 2300' such as those pictured in FIGS. 8A and 8B may be calculated (where FIG. 8B highlights or expands a section of the data from FIG. 8A) from the equation above.

These curves demonstrate the relationship between time constant (vertical axis) and dielectric thicknesses (horizontal axis) for different trap or barrier energies. The vertical axis includes the ultrafast time scales of down to nanoseconds (1E-9 s)). The horizontal axes are tunneling distances (or dielectric thickness, both terms being generally equivalent in this example). The different curves are lines of constant barrier energy. For example, in FIG. 8B, an electron caught in a trap with an energy depth of the listed barrier energy of 0.7 eV would exhibit a detrapping time constant of about 1E-5 seconds if the dielectric thickness was 40 Angstroms.

Further modeling with Poisson/Transport solvers can be used to determine trap density in MOS-like structures and more exotic devices using charge carrier lifetimes and known trap energies. Specifically, the photo-injected current due to femto-second optical pulses induces bursts of charge carriers which reach the dielectric conduction band. The average value of this current can be related to carrier concentration and their lifetimes in the regions. The E-field across the interface is the proxy by which SHG measures these phenomena.

Figure 8A:
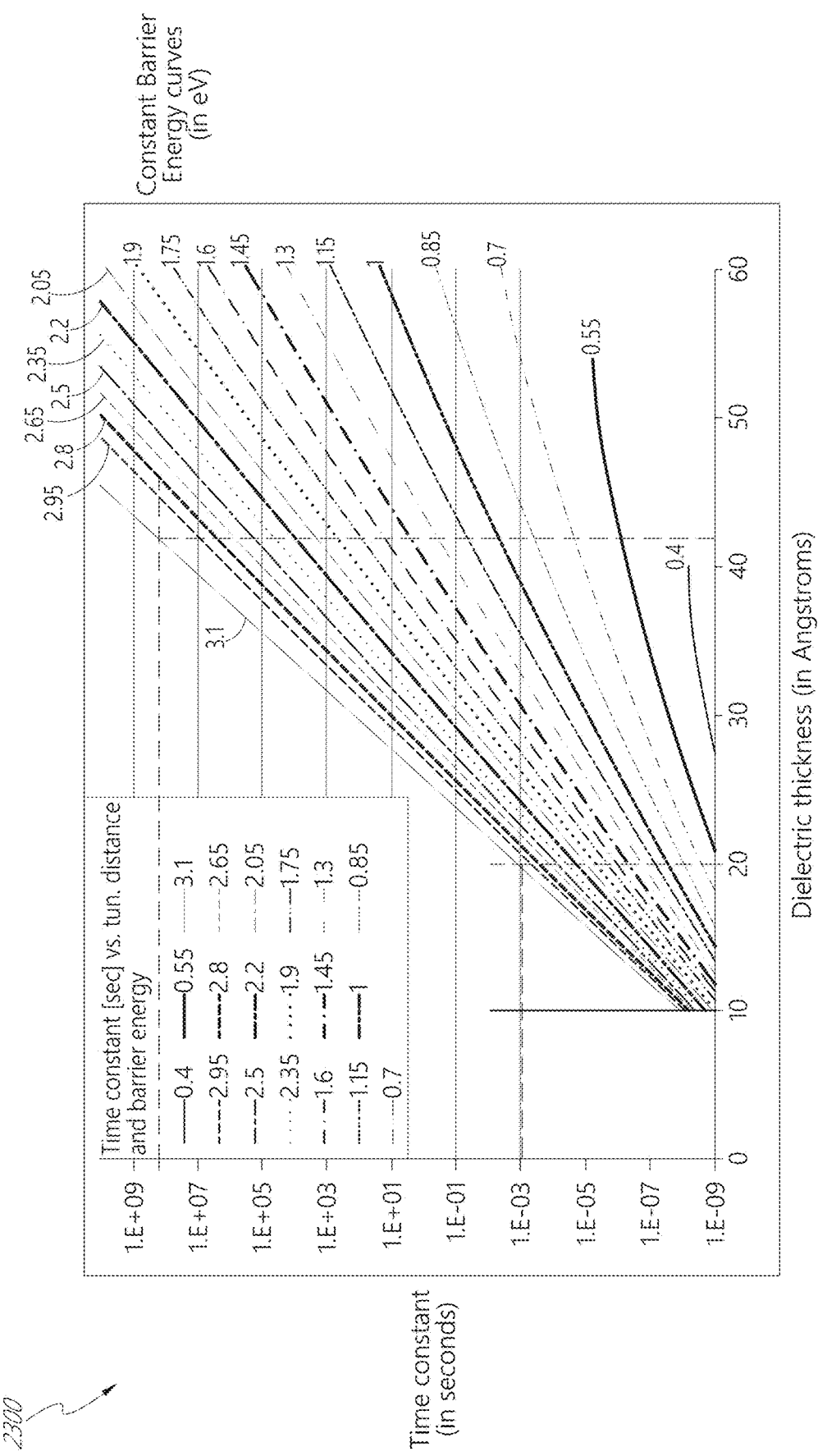
FIGS. 8A and 8B are charts representative of the manner of delivering such function.
Figure 8B:
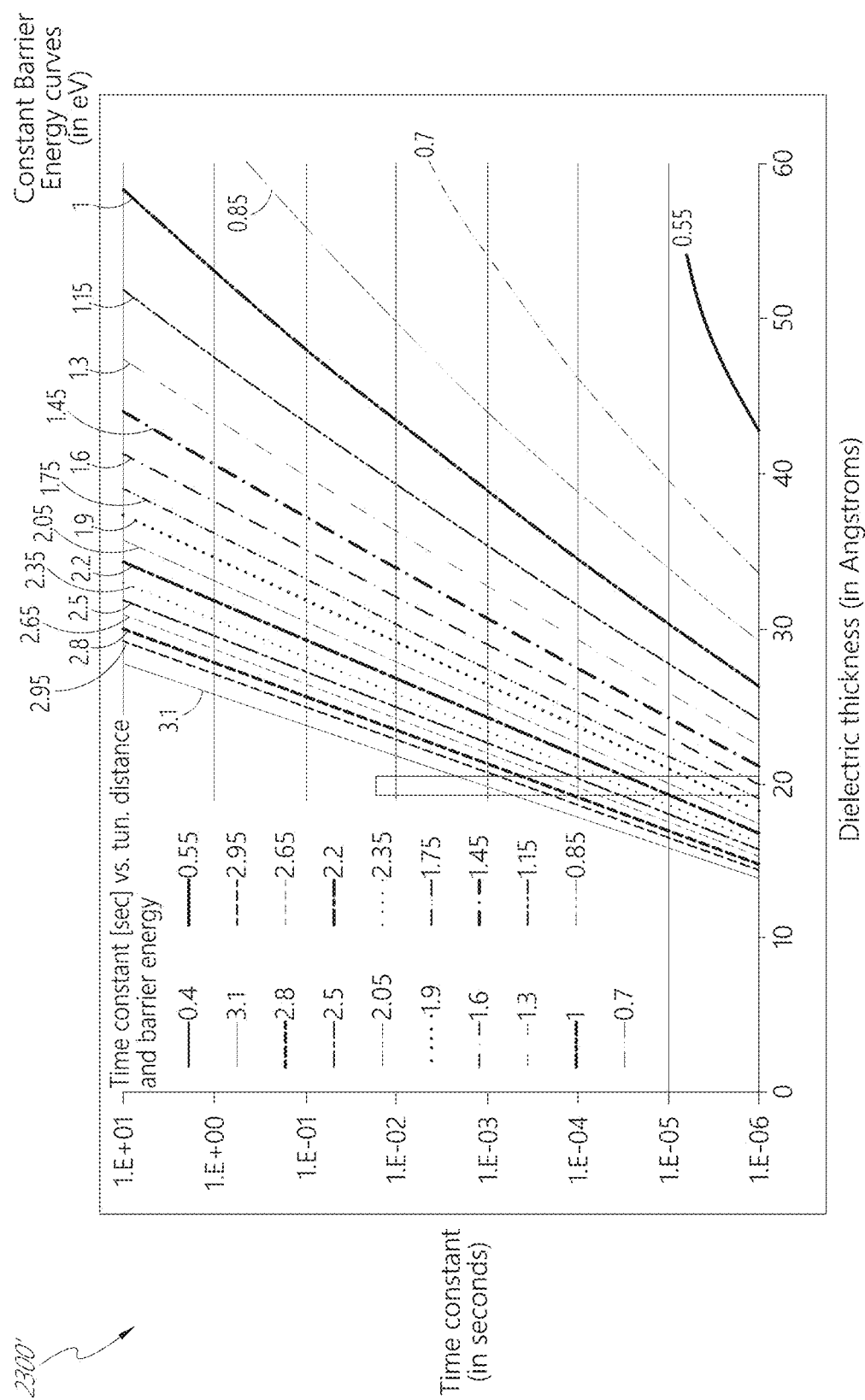

In the plot of FIG. 8A, it can be observed (see dashed lines) that 20 Angstrom of oxide has 1 msec discharge time constant for a trap having an energy of about 3 eV To relate the plots to an example of use in the subject system, suppose a 20 Angstrom oxide is interrogated after blocking laser excitation. As shown in FIG. 8B (see highlighted box) the result will be observable current from 1 µsec to about 1 msec and then all the current dies out.

The decay curves discussed in this application can be a product of multiple processes (e.g., charge relaxation, charge recombination, etc.) from traps having different energies and different relaxation/recombination time constants. Nevertheless, in various embodiments, the decay curves can be generally expressed by an exponential function $f(t)=A\exp(-\lambda t)+B$, where A is the decay amplitude, B denotes the baseline offset constant and $\lambda$ denotes a decay constant. This general exponential function can be used to approximately characterize the "extent of decay" from experimentally obtained decay data curve. In various embodiments, it is possible to use the half-life $t_{1/2}$, average lifetime $\tau$, and decay constant $\lambda$, to characterize the extent of decay for a decay curve (obtained experimentally or by simulation). For example, the parameters A, B, and $\lambda$ can be obtained from the decay data points that are obtained experimentally as discussed below. An average lifetime r can then be calculated from the parameters A, B, and $\lambda$ using theory of radioactive decay as a way of setting benchmarks for what is qualitatively called partial, or full-decay. For example, in some embodiments, $\tau$ can be given by the equation $(t_{1/2})/(\ln(2))$.

In various implementations, the charge state can be considered to have fully decayed after a time span of three average lifetimes $\tau$, which corresponds to ~95% decay from full saturation. Partial decay can be expressed in terms of signal after a certain number of average lifetimes $\tau$ have elapsed.

In operations, the systems determine parameters (e.g., carrier lifetimes, trap energies, trapping cross-section, charge carrier density, trap charge density, carrier injection threshold energy, charge carrier lifetime, charge accumulation time, etc.) based at least in part on the subject methodology on a point-by-point basis on a portion (e.g., die size portion) of the wafer or an entire wafer. An entire wafer (depending on the material, surface area, and density of scan desired) can often be scanned in less than about 10 minutes, with these parameters determined for each point scanned. In various embodiments, a location of the wafer can be scanned in a time interval between about 100 milliseconds and about 3 seconds. For example, a location of the wafer can be scanned in about 950 milliseconds.

Figure 9:
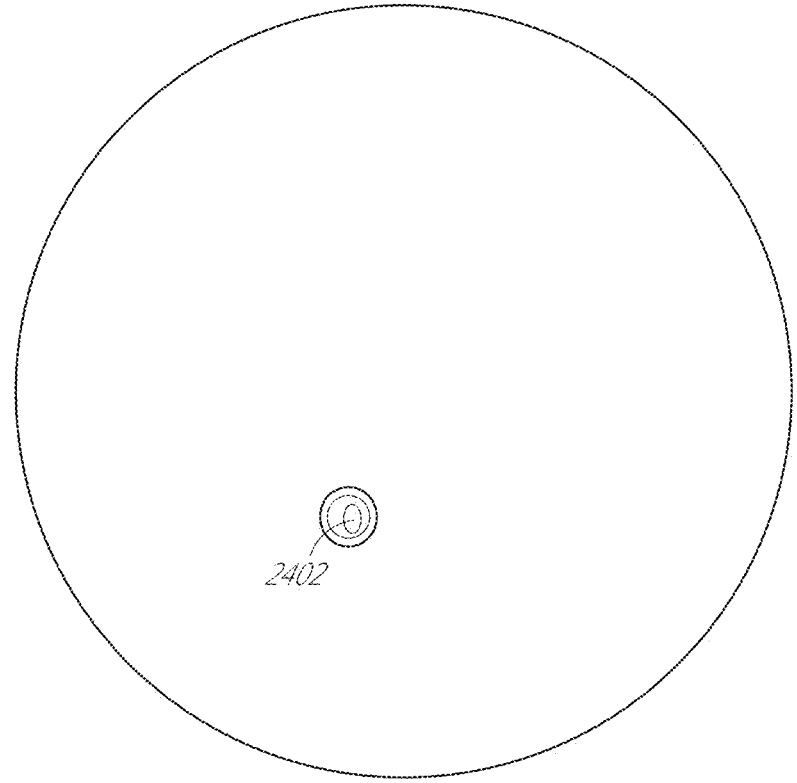
FIG. 9 represents system function in a graphical output.

A matrix of data containing the spatial distributions of the parameters determined can be plotted as individual color-coded heat maps or contour maps for each parameter, as a means for quantitative inspection, feedback and presentation. FIG. 9 illustrates one such map 2400. It depicts how a defect 2402 may be portrayed. But it is possible to show any of the further refined subject matters in FIG. 7. Once quantitative data has been obtained, providing such output is merely a matter of changing the code in the plotting program/script.

Such information and/or other information treated below may be shown on a computer monitor or dedicated system display and/or it may be recorded for later reference or use for analysis on digital media. In addition, each wafer spatial distribution can be cross-correlated by referencing with ellipsometry data to correct for layer thickness variability and cross-calibrated with independent contamination characterization data obtained, for example, by Total Reflection X-ray Fluorescence (TXRF), Time of Flight Secondary Ion Mass Spectroscopy (TOF-SIMS) and the like. These initial or corrected spatial distributions can then be compared to those from wafers known to be within specification, to determine if the samples in question have any defects or problematic features which warrant further testing. In general, however, it is desirable to use low-cost SHG and other methods hereof calibrated with, by or against slow and expensive direct methods like TXRF, etc.

Human decisions may be employed (e.g., in inspecting a generated heat map 2400) initially in determining the standard for what is an acceptable or unsatisfactory wafer, until the tool is properly calibrated to be able to flag wafers autonomously. For a well-characterized process in a fab, human decisions would then only need to be made to determine the root cause of any systemic problem with yields, based on the characteristics of flagged wafers.

However implemented, FIG. 10 provides a plot 2500 illustrating a first method embodiment hereof that may be used in making such determinations. This method, like the others discussed and illustrated below relies on characterizing SHG response with multiple shutter blocking events in which interrogation laser is gated for periods of time.

In this first example, a section of a sample to be interrogated is charged (typically by a laser) to saturation. In this example, a single source is used to generate as pump beam and probe beam, although separate pump and probe sources can be used in other embodiments. During which time, the SHG signal may be monitored. The saturation level may be known by virtue of material characterization and/or observing asymptotic behavior of the SHG signal intensity associate with charging ($I_{ch}$). Upon (or after) reaching saturation, the electromagnetic radiation from the laser (pump beam) is blocked from the sample section. The laser (probe beam) is so-gated for a selected period of time ($t_{b/1}$). After gating ceases, an SHG intensity measurement ($I_{dch1}$) is made with the laser (probe beam) exposing the surface, thus observing the decay of charge at a first discharge point. After charging the material section (with the pump beam) to saturation again over a period of time ($t_{ch}$), a second blocking event occurs for a time ($t_{bl2}$) different than the first in order to identify another point along what will become a composite decay curve. Upon unblocking the laser (probe beam), SHG signal intensity ($I_{dchs2}$) is measured again. This reduced signal indicates charge decay over the second gating event or blocking interval. Once-again charged to saturation by the laser (pump beam), a third differently-timed blocking event ($t_{bl3}$) follows and subsequent SHG interrogation and signal intensity measurement ($I_{dch3}$) is made for a third measurement of charge decay in relation to SHG intensity.

Although in the above example, the sample is charged to a saturation level, in other examples, the sample can be charged to a charge level below saturation. Although in the above example, the three blocking times $t_{bl1}$, $t_{bl2}$ and $t_{bl3}$ are different, in other examples, the three blocking times $t_{bl1}$, $t_{bl2}$ and $t_{bl3}$ can be the same. In various examples, the sample can be charged to a charging level initially and the SHG intensity measurement ($I_{dch1}$), ($I_{dch2}$) and ($I_{dch3}$) can be obtained at different time intervals after the initial charging event.

As referred to above, these three points (corresponding to $I_{dch1}$, $I_{dch2}$ and $I_{dch3}$) can be used to construct a composite charge decay curve. It is referred to herein as a "composite" curve in the sense that its components come from a plurality of related events. And while still further repetition (with the possibility of different gating times employed to generate more decay curve data points or the use of same-relation timing to confirm certainty and/or remove error from measurements for selected points) may be employed so that four or more block-then-detect cycles are employed, it should be observed that as few as two such cycles may be employed. Whereas one decay-related data point will not offer meaningful decay curve characterization, a pair defining a line from which a curve may be modeled or extrapolated from to offer some utility, whereas three or more points for exponential decay fitting will yield an approximation with better accuracy. Stated otherwise, any simple (e.g., not stretched by dispersive transport physics) decay kinetics has a general formula: Measurable(t)=$M_0$*exp(−t/tau) so to find two unknown parameter $M_0$ and tau at least 2 points are needed assuming this simple kinetics. In dispersive (i.e., non-linear) kinetics it is desirable to measure as many point as possible to extract (n−1)-order correction parameters if n-points are measured and then apply a model appropriate for that order of approximation. Also, that set of measurements is to be measured for different electric fields (E) to be real practical and precise with the tau to assign it for a certain type of defects.

The method above can provide parameter vs. time (such as interfacial leakage current or occupied trap density v. time) kinetic curve by obtaining measurements at a few time points. A time constant (τ) can be extracted from the parameter vs. time kinetic curve. The time constant can be attributed to a time constant characteristic for a certain type of defect.

In any case, the decay-dependent data obtained may be preceded (as in the example) by SHG data acquisition while saturating the material with the interrogation (or probe) laser. However, charging will not necessarily go to saturation (e.g., as noted above). Nor will the measurement necessary be made prior to the blocking of a/the charging laser. Further, the charging will not necessarily be performed with the interrogation/probe laser (e.g., see optional pump/ probe methodology cited above).

Regardless, after the subject testing at one sample site, the sample material is typically moved or indexed to locate another section for the same (or similar) testing. In this manner, a plurality of sections or even every section of the sample material may be interrogated and quantified in scanning the entire wafer as discussed above.

FIG. 11 and plot 2600 illustrate an alternative (or complimentary approach) to acquiring charge decay related data by scanning is shown in plot 2600. In this method, after charging to saturation a/the first time, continuous (or at least semi-continuous) discharge over multiple blocking time intervals ($t_{bl1}$, $t_{bl2}$, $t_{bl3}$) is investigated by laser pulses from an interrogation or a probe laser measuring different SHG intensities ($I_{dch1}$, $I_{dch2}$, $I_{dch3}$). The intensity and/or frequency of the laser pulses from the interrogation/probe laser are selected such that the average power of the interrogation/ probe laser is reduced to avoid recharging the material between blocking intervals while still obtaining a reasonable SHG signal. To do so, as little as one to three laser pulses may be applied. So-reduced (in number and/or power), the material excitation resulting from the interrogation or probe laser pulses may be ignored or taken into account by calibration and or modeling considerations.

In various embodiments, a separate pump source can be used for charging. However, in some embodiments, the probe beam can be used to charge the sample.

In any case, the delay between pulses may be identical or tuned to account for the expected transient charge decay profile or for other practical reason. Likewise, while the delay is described in terms of "gating" or "blocking" above, it is to be appreciated that the delay may be produced using one or more optical delay lines as discussed above in connection with FIG. 6C. Still further, the same may hold true for the blocking/gating discussed in association with FIG. 10.

Further, as above, the method in FIG. 11 may be practiced with various modifications to the number of blocking or delay times or events. Also, SHG signal may or may not be measured during charge to saturation. Anyway, the method in FIG. 11 may be practiced (as illustrated) such that the final gating period takes the SHG signal to null. Confirmation of this may be obtained by repeating the method at the same site in a mode where charging intensity ($I_{ch}$) is measured or by only observing the SHG signal in (re)charging to saturation.

Figure 12A:
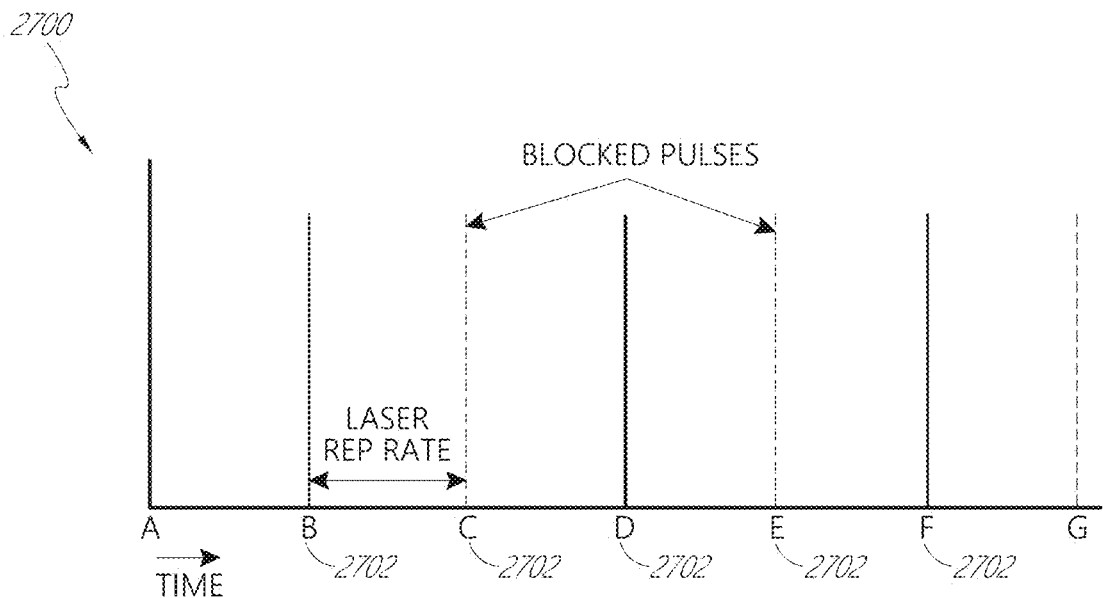
FIGS. 12A-12E plot time dynamics associated with the system in FIG. 6C that may be employed in the methods of FIGS. 10 and 11.

FIGS. 12A-12E are instructive regarding the manner in which the subject hardware is used to obtain the decay-related data points. FIG. 12A provides a chart 2700 illustrating a series of laser pulses 2702 in which intermediate or alternating pulses are blocked by shutter hardware (e.g., as described above) in a so-called "pulse picking" approach. Over a given time interval, it is possible to let individual pulses through (indicated by solid line) and block others (as indicated by dashed line).

Figure 12B:
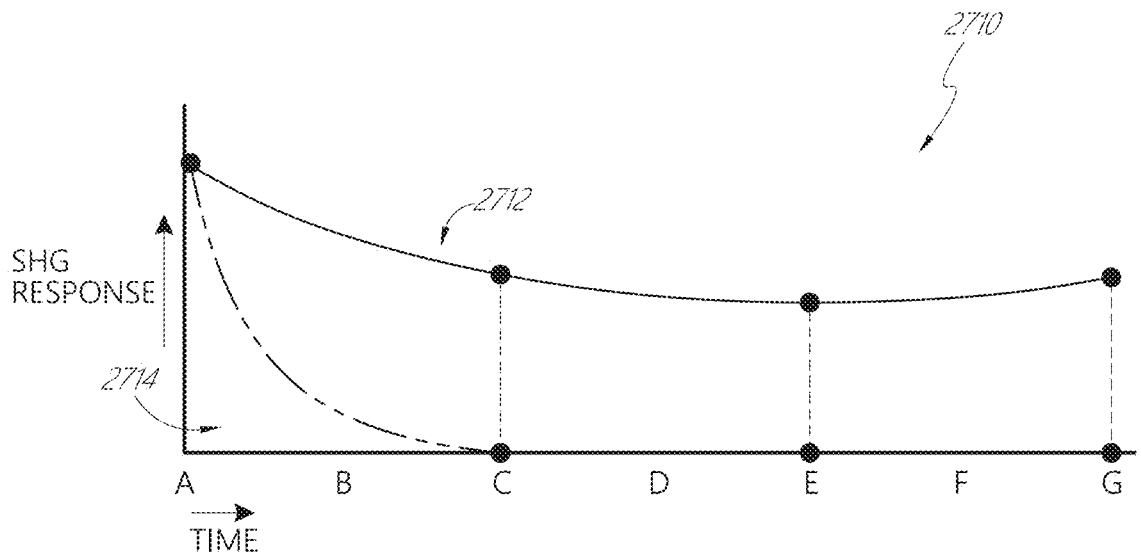

FIG. 12B provides a chart 2710 illustrating the manner in which resolution of a blocking technique for SHG investigation can be limited by the repetition (rep) rate of the probe laser. Specifically, when presented with a decay curve like decay curve 2712 it is possible to resolve the time delay profile with blocking of every other pulse using a pulsed laser illustrated to operate at the same time scale as in FIG. 12A. However, a shorter curve 2714 cannot be resolved or observed under such circumstances. As such, use optical delay stage(s) can offer additional utility.

Figure 12C:
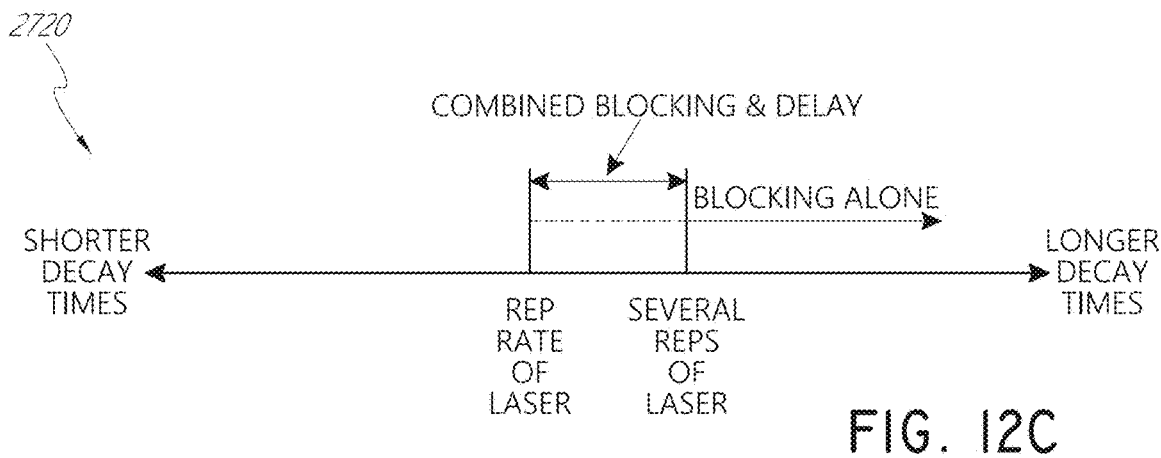

Accordingly, chart 2720 in FIG. 12C illustrates (graphically and with text) how blocking and introducing a delay with respect to a reference time associated with charging the sample can offer overlapping areas of usefulness, in terms of the decay time of the curve relative to the rep rate of the laser. It also shows how there are short time ranges when only delay stages would allow interrogation of the decay curve, and longer time ranges when only blocking the pumping and/or the probing beam would be practical.

Figure 12D:
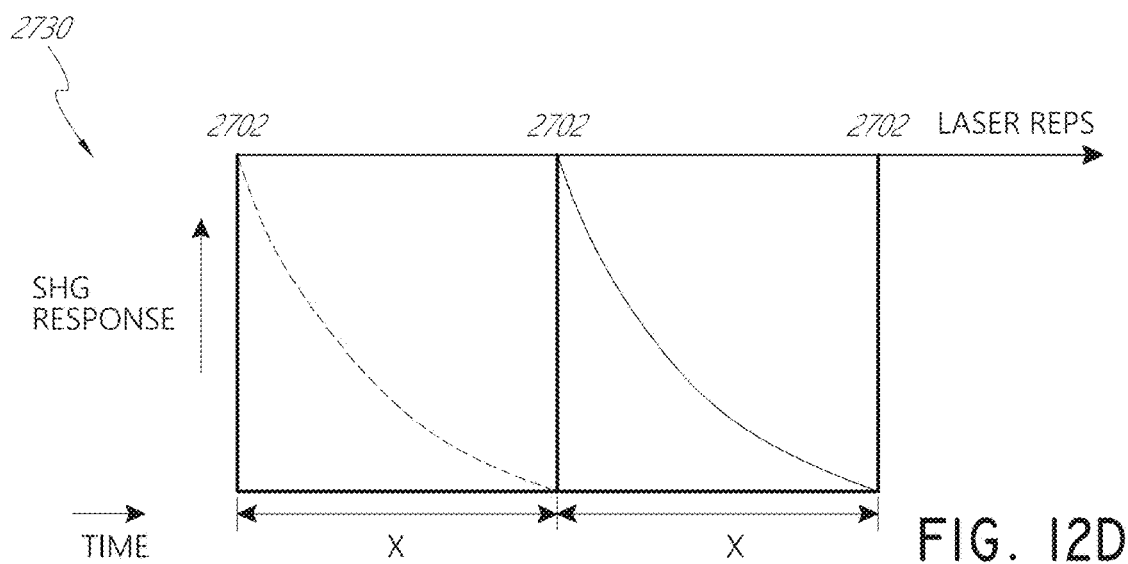
Figure 12E:
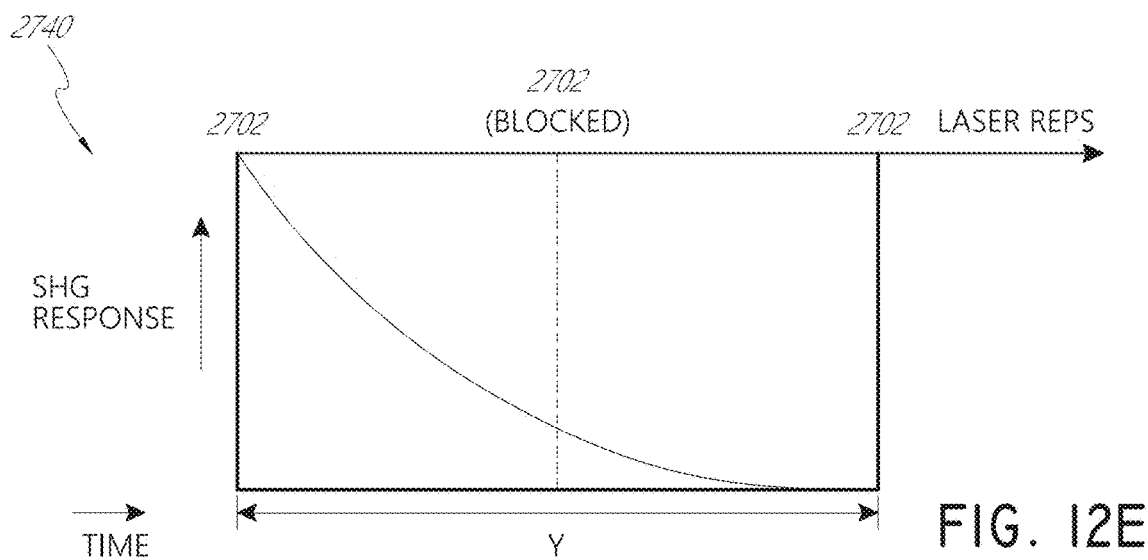

FIGS. 12D and 12E further illustrate the utility of the combined block/delay apparatus. Chart 2730 illustrates exemplary SHG signals produced by individual laser pulses 2702. With a delay stage alone, only the range (X) between each such pulse may be interrogated by varying optical delay. In contrast, additional utility over a range (Y) may be achieved with a system combining a delay stage and blocking or shutter means such as a chopper, shutter, or modulator. As illustrated by chart 2740, such a system is able to measure decay curves (and their associated time constants) in the range from one to several pulse times.

Figure 13:
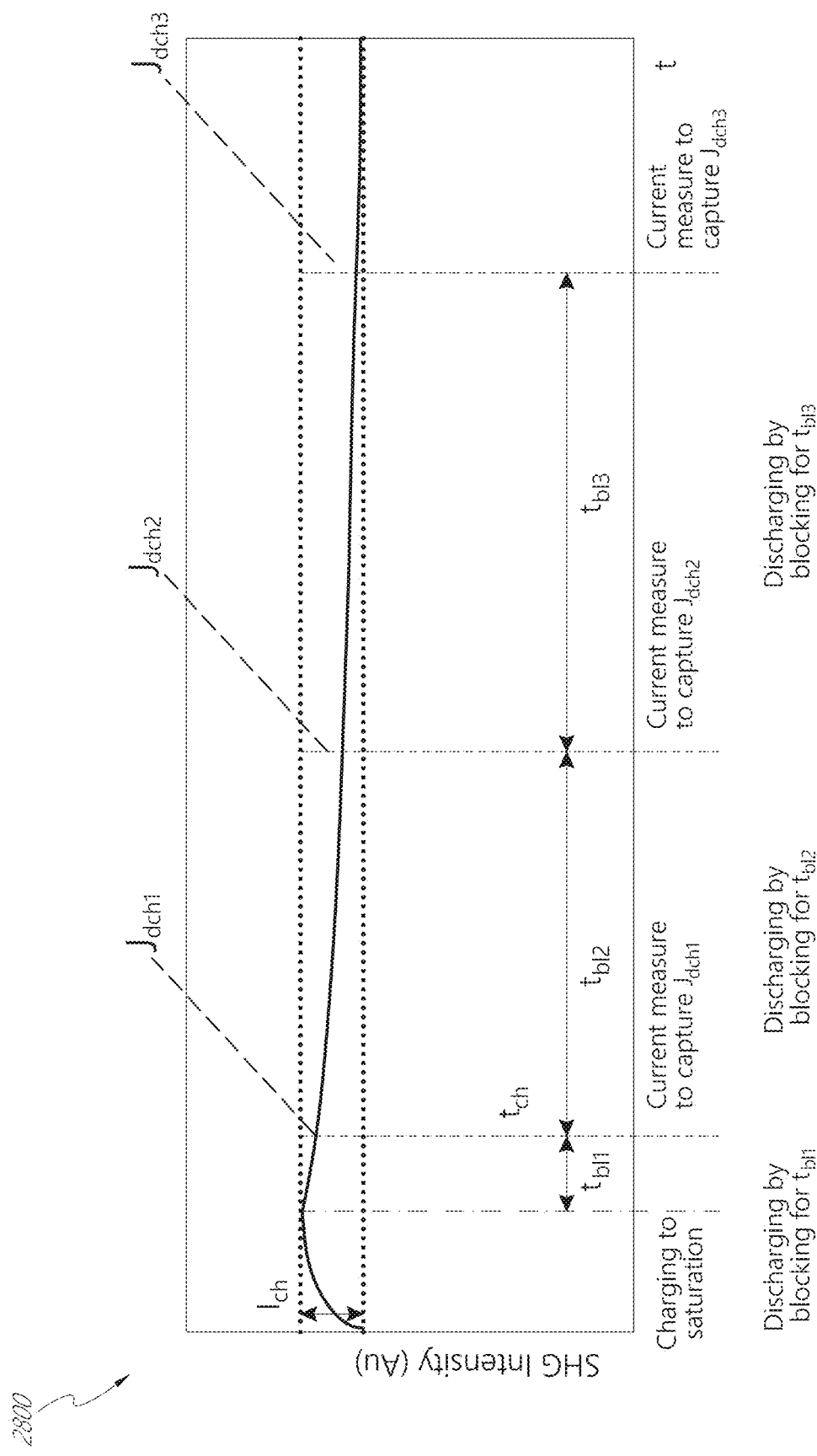
FIG. 13 plots a current-based interrogation method for observing transient electric field decay.

FIG. 13 provides a plot 2800 illustrating a third method embodiment hereof. This embodiment resembles that in FIG. 11, except that discharge current ($J_{dch1}$, $J_{dch2}$, $J_{dch3}$) is measured at time intervals (e.g., $t_i=t_0$, $2t_0$, $3t_0$, $7t_0$, $10t_0$, $20t_0$, $30t_0$, $70t_0$—basically according to a log time scale vs. linear time—where $t_0$ is a scale parameter of about $10^{-6}$ sec or $10^{-3}$ sec when measurement is started) after charging the material with a laser (optionally monitoring or capturing its SHG intensity ($I_{ch}$) signal) or other electro-magnetic radiation source and then blocking or otherwise stopping the laser radiation application to the sample, thereby allowing discharge. This approach gives an estimation of the mobile carrier lifetime in the substrate by the moment after the e-h-plasma in the substrate is decayed and when the discharge current starts to be seen, thus offering an important physical parameter of the wafer. And after carrier lifetime is determined, the discharge of current can be interpreted in its time dependence (i.e., its kinetics regarding charge decay) in the same manner as if it were obtained by SHG sensing of discharged charge.

Various embodiments can be used to measure time constant (e.g., for decay) having a range of values. For example, the time constants can range between 0.1 femtosecond and 1 femtosecond, 1 femtosecond and 10 femtoseconds, 10 femtoseconds and 100 femtoseconds, 100 femtoseconds and 1 picosecond, between 1 picosecond and 10 picoseconds, between 10 picoseconds and 100 picoseconds, between 100 picoseconds and 1 nanosecond, between 1 nanosecond and 10 nanoseconds, between 10 nanosecond and 100 nanoseconds, between 100 nanoseconds and 1 microsecond, between 1 nanoseconds and 100 microseconds, between 100 microseconds and 1 millisecond, between 1 microsecond and 100 milliseconds, between 100 microsecond and 1 second, between 1 second and 10 seconds, or between 10 second and 100 seconds or larger or smaller. Likewise, time delays (A) for example between the probe and pump (or pump and probe) can be, for example, between 0.1 femtosecond and 1 femtosecond, 1 femtosecond and 10 femtoseconds, 10 femtoseconds and 100 femtoseconds, 100 femtoseconds and 1 picosecond, between 1 picosecond and 10 picoseconds, between 10 picoseconds and 100 picoseconds, between 100 picoseconds and 1 nanosecond, between 1 nanosecond and 10 nanoseconds, between 10 nanosecond and 100 nanoseconds, between 100 nanoseconds and 1 microsecond, between 1 nanoseconds and 100 microseconds, between 100 microseconds and 1 millisecond, between 1 microsecond and 100 milliseconds, between 100 microsecond and 1 second, between 1 second and 10 seconds, between 10 second and 100 seconds. Values outside these ranges are also possible.

Figure 14A:
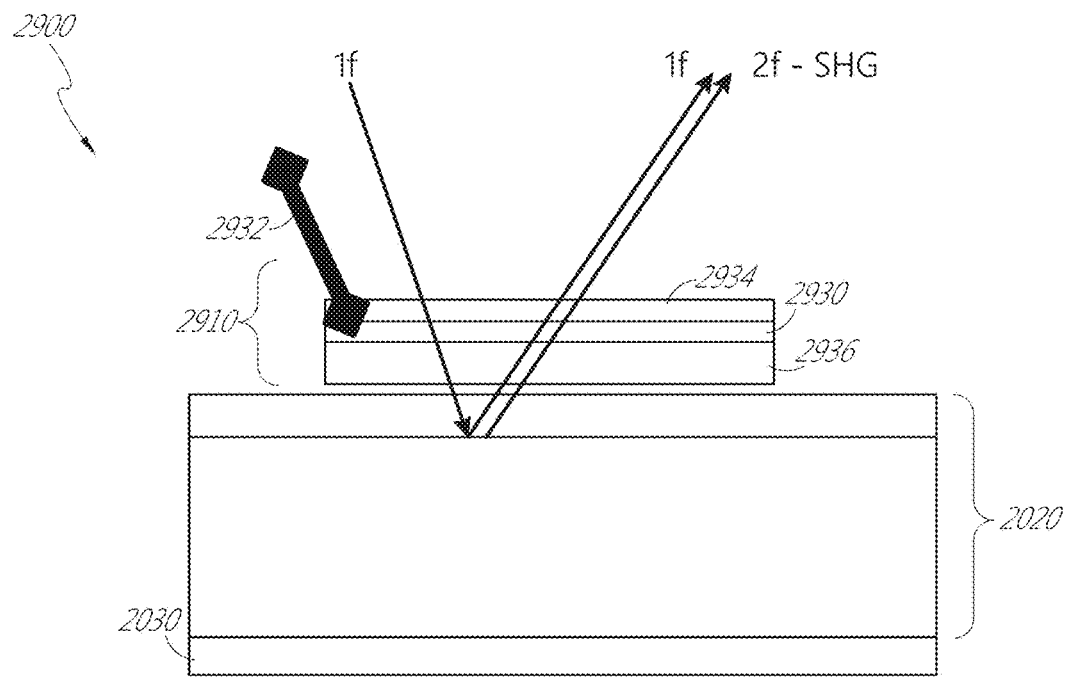
FIGS. 14A and 14B illustrate hardware configurations that may be employed in the method of FIG. 13.
Figure 14B:
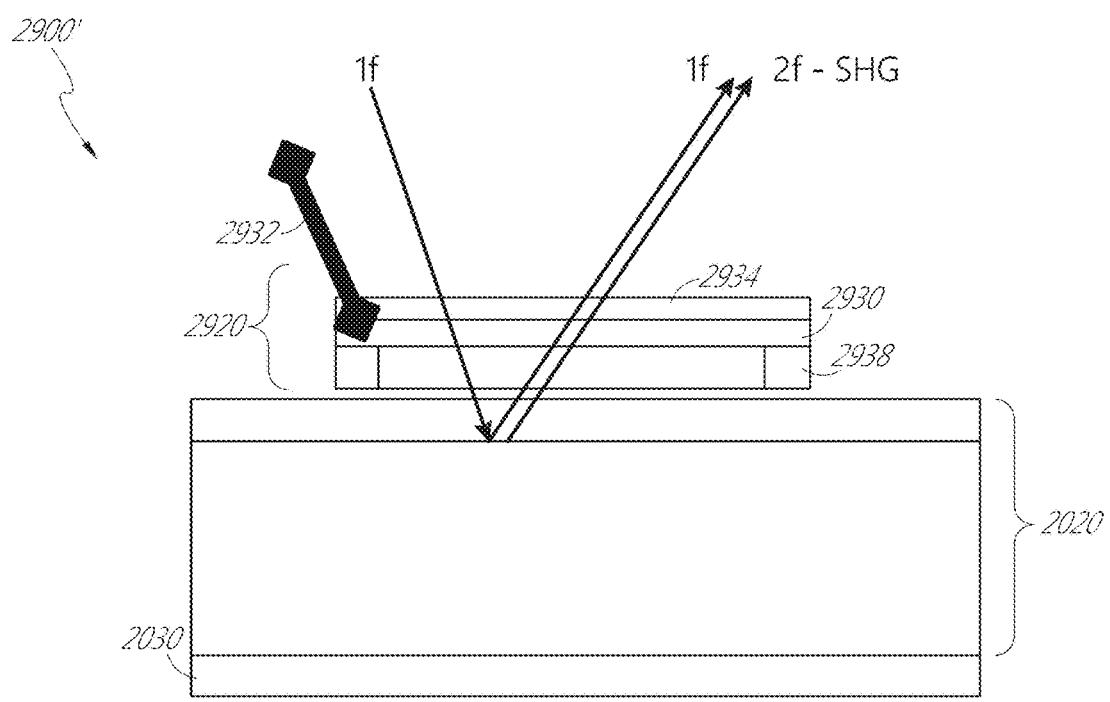

Various physical approaches can be taken in providing a system suitable for carrying out the method in FIG. 13—which method, notably, may be modified like those described above. Two such approaches are illustrated in FIGS. 14A and 14B.

Systems 2900 and 2900' use gate electrodes 2910 and 2920, respectively, made of a conductive material that is transparent in the visible light range. Such an electrode may touch a wafer 2020 to be inspected, but need not as they may only be separated by a minimal distance. In various implementations, the electric field in the dielectric can be estimated by extracting the electrode-dielectric-substrate structure parameters using AC measurement of the Capacitance-Voltage curve (CV-curve). CV-curve measurement can be done by using a standard CV-measurement setup available on the market, connected to a material sample in the subject tool (e.g., the applied voltage is to provide the electric field in the dielectric between about 0.1 MV/cm and about 5 MV/cm). The wafer may be held upon a conductive chuck 2030 providing electrical substrate contact. Another alternative construction for a gate electrode would be an ultra-thin Au film or Al film on a glass of 10-30 A thickness which can reduce the sensitivity due to absorption of some photons by the thin semi-transparent metal layer.

However, electrodes 2910 and 2920 present no appreciable absorption issues (although some refraction-based considerations may arise that can be calibrated out or may be otherwise accounted for in the system). These electrodes may comprise a transparent conductor gate layer 2930 made of a material such as ZnO, SnO or the like connected with an electrical contact 2932. An anti-reflective top coat 2934 may be included in the construction. Gate layer 2930 may be set upon a transparent carrier made 2936 of dielectric ($SiO_2$) with a thickness ($D_{gc}$) as shown. In various embodiments, the transparent carrier comprises an insulator that is used as a gate for a noncontact electrode that may employ for example capacitive coupling to perform electrical measurements, similar to those described in the portion of U.S. Provisional Application No. 61/980,860, filed on Apr. 17, 2014, titled "WAFER METROLOGY TECHNOLOGIES," referred to as Section IV entitled, "FIELD-BIASED SHG METROLOGY". As the wafer is charged from the incoming laser radiation, the electric field across one or more of its interfaces will change, and the layers of the wafer should capacitively couple with the plates in the electrode similar to a plate capacitor. The charging of the electrode will involve movement of charge carriers that will be measured as current.

$D_{gc}$ would be calibrated by measuring CV curve on the semiconductor substrate with a non-invasive approach and used in electric field (E) calculation when applied voltage is known. A negligible gap distance between the gate and sample can be an air gap. Alternatively the electrode can be directly in contact with the sample rather than being separated by an air gap or dielectric. Accordingly normal CV or IV measurements may be performed in various embodiments.

Or given a close refractive index match between water and $SiO_2$, filling the gap with deionized water may be helpful in reducing boundary-layer reflection without any ill effect (or at least one that cannot be addressed). Deionized (or clean-room grade) water can maintain cleanliness around the electrically sensitive and chemically pure substrate wafers. Deionized water is actually less conductive than regular water.

In FIG. 14B, a related construction is shown with the difference being the architecture of the carrier or gate-holder 2938. Here, it is configured as a ring, optimally formed by etched away in the center and leaving material around the electrode perimeter as produced using MEMS techniques.

But in any case, because of the large unoccupied zone through with the laser and SHG radiation must pass, it may be especially desirable to fill the same with DI water as described above.

Regardless, in the overall electrode 2910, 2920 constructions each embodiment would typically be stationary with respect to the radiation exciting the material in use. Prior to and after use, the electrode structure(s) may be stowed by a robotic arm or carriage assembly (not shown).

As describe above, in various embodiments the electrode directly contacts the wafer to perform electrical measurements such as measuring current flow. However, non-contact methods of measuring current, such as for example using electrodes that are capacatively coupled with the sample, can also be used.

The systems and methods described herein can be used to characterize a sample (e.g., a semiconductor wafer or a portion thereof). For example, the systems and methods described herein can be used to detect defects or contaminants in the sample as discussed above. The systems and methods described herein can be configured to characterize the sample during fabrication or production of the semiconductor wafer. Thus, the systems and methods can be used along a semiconductor fabrication line in a semiconductor fabrication facility. The systems and methods described herein can be integrated with the semiconductor fabrication/production line. The systems and methods described herein can be integrated into a semiconductor fab line with automated wafer handling capabilities. For example, the system can be equipped with an attached Equipment Front End Module (EFEM), which accepts wafer cassettes such as a Front Opening Unified Pod (FOUP). Each of these cassettes can be delivered to the machine by human operators or by automated cassette-handling robots which move cassettes from process to process along fabrication/production line.

In various embodiments, the system can be configured such that once the cassettes are mounted on the EFEM, the FOUP is opened, and a robotic arm selects individual wafers from the FOUP and moves them through an automatically actuated door included in the system, into a light-tight process box, and onto a bias-capable vacuum chuck. The chuck may be designed to fit complementary with the robotic arm so that it may lay the sample on top. At some point in this process, the wafer can be held over a scanner for identification of its unique laser mark.

Accordingly, a system configured to be integrated in a semiconductor fabrication/assembly line can have automated wafer handling capability from the FOUP or other type of cassette; integration with an EFEM as discussed above, a chuck designed in a way to be compatible with robotic handling, automated light-tight doors which open and close to allow movement of the robotic wand/arm and software signaling to EFEM for wafer loading/unloading and wafer identification.

Part III

FIGS. 15A and 15B show suitable hardware for use in the SHG systems and methods as further described in the portion of U.S. Provisional Application No. 61/980,860, filed on Apr. 17, 2014, titled "WAFER METROLOGY TECHNOLOGIES," referred to as Section I entitled "PUMP AND PROBE TYPE SHG METROLOGY". Other system and method options are presented in the portion of U.S. Provisional Application No. 61/980,860, filed on Apr. 17, 2014, titled "WAFER METROLOGY TECHNOLOGIES," referred to as Section II entitled "CHARGE DECAY MEASUREMENT SYSTEMS AND METHODS," for example, as to intermediate optics, the inclusion of optical delay line(s) and optional electrode features.

As shown, system 3000 includes a primary or probe laser 3010 for directing an interrogation beam 3012 of electromagnetic radiation at a sample wafer 3020, which is held by a vacuum chuck 3030. As illustrated in FIG. 15B, the chuck 3030 includes or is set on x- and y-stages and optionally also a rotational stage for positioning a sample site 3022 across the wafer relative to where the laser(s) are aimed. The x-y stage enables scanning multiple wafer surface sites or locations 3022 without movement of other hardware. A rotational stage optionally enables assessing crystal structure effects on SHG. Further optional features, aspects and/or uses of chuck 3030 are presented elsewhere in this application entitled. The sample site 3022 can include one or more layers. The sample site 3022 can comprise a composite substrate including at least two layers. The sample site 3022 can include an interface between two dissimilar materials (e.g., between two different semiconductor materials, between two differently doped semiconductor materials, between a semiconductor and an oxide, between a semiconductor and a dielectric material, between a semiconductor and a metal or an oxide and a metal).

When system 3000 is in use, a beam 3014 of reflected radiation directed at a detector 3040 will include an SHG signal. The detector 3040 may be any of a photomultiplier tube, a CCD camera, an avalanche detector, a photodiode detector, a streak camera and a silicon detector. System 3000 may also include one or more shutter-type devices 3050. The type of shutter hardware used will depend on the timeframe over which the laser radiation is to be blocked, dumped or otherwise directed away from the sample site 3022. An electro-optic blocking device such as a Pockel's Cell or Kerr Cell can be used to obtain very short blocking periods (i.e., with actuation times on the order of $10^{-9}$ to $10^{-12}$ seconds).

For longer blocking time intervals (e.g., from about $10^{-5}$ seconds and upwards) mechanical shutters or flywheel chopper type devices may be employed. However, electro-optic blocking devices will allow a wider range of materials to be tested in accordance with the methods below. A photon counting system 3044 capable of discretely gating very small time intervals, typically, on the order of picoseconds to microseconds can be employed to resolve the time-dependent signal counts. For faster-yet time frames optical delay line(s) may be incorporated as noted above.

System 3000 can include an additional electromagnetic radiation source 3060 also referred to as a pump source. In various implementations, the radiation source 3060 can be a laser illustrated as emitting a directed beam 3062 or a UV flash lamp emitting a diverging or optically collimated pulse 3064. In the case of a laser source, its beam 3062 may be collinear with beam 3012 (e.g., as directed by additional mirrors or prisms, etc.) Source 3060 output wavelengths of light may be anywhere from about 80 nm and about 1000 nm. Using shorter wavelengths in this range (e.g. less than about 450 nm), is possible to drive charge excitation using fewer photons and/or with lower peak intensities than at longer wavelengths.

For a flash lamp, energy per flash or power level during flash may be substrate material dependent. A flashlamp producing a total energy of 1 J to 10 kJ per flash would be appropriate for fully depleted silicon-on-insulator (FD-SOI). However a pulsed or constant UV source would be viable as well. The important factor in the pump characteristics and use is that charge carriers are injected into the dielectric of the material to be interrogated. Manufacturers of suitable flash lamps include Hellma USA, Inc. and Hamamatsu Photonics K.K.

When a laser is employed as source 3060, it may be any of a nanosecond, picosecond or femtosecond or faster pulse laser source. It may even be a continuous solid-state laser. In various embodiments, the pump source is tunable in wavelength. Commercially available options regarding lasers which are tunable include Spectra Physics' Velocity and Vortex Tunable Lasers. Additional tunable solid state solutions are available from LOTIS Ltd.'s LT-22xx series of solid state lasers.

Whether provided as a laser or a flash lamp, pump source 3060 can be selected for relatively high average power. This could be from about 10 mW to about 10 W, but more typically from about 100 mW to about 4 W, depending on material to be interrogated (as, again, the consideration is ensuring that charge carrier mobility is induced in a way such that charge carriers are injected into the interface of the material (e.g., the dielectric interface), which can be material specific. The average power of the pump source 3060 is selected to be below the optical damage threshold of the material. For example, pump source 3060 can be selected to have an average optical power between 1-2 W when the interrogating material comprises silicon so as to not exceed the optical damage threshold for silicon.

Probe laser 3010 may be any of a nanosecond, picosecond or femtosecond or faster pulse laser source. Two options are currently commercially available regarding lasers have the peak power, wavelength and reliability needed are doped fiber and Ti:Sapphire units. Coherent's VITESSE and Spectra Physics' MAI TAI lasers are examples of suitable Ti:Sapphire devices. Femtolasers Gmbh and others manufacture also manufacture other relevant Ti:Sapphire devices. Suitable doped fiber lasers are produced by IMRA, OneFive, and Toptica Photonics. Pico- and/or nano-second lasers from many manufacturers, such as Hamamatsu, may be options as well depending on the substrate material and pump type. Laser 3010 may operate in a wavelength range between about 100 nm to about 2000 nm with a peak power between about 10 kW and 1 GW, but delivering power at an average below about 150 mW.

Various other optional so-called "intermediate" optical components may be employed in system 3000. For example, the system 3000 may include a dichroic reflective or refractive filter 3070 for selectively passing the SHG signal coaxial with reflected radiation directly from laser 3010 and/or source 3060. Alternatively, a prism may be employed to differentiate the weaker SHG signal from the many-orders-of-magnitude-stronger reflected primary beam. However, as the prism approach has proved to be very sensitive to misalignment, a dichroic system as referenced above may be preferred. Other options include the use of diffraction grating or a Pellicle beam splitter. An optical bundle 3080 for focusing and collimating/columniation optics may be provided. Alternatively, a filter wheel 3090, polarizer(s) 3092 and/or zoom len(s) 3094 units or assemblies may be employed in the system. Also, an angular (or arc-type) rotational adjustment (with corresponding adjustment for the detector) and in-line optical components may be desirable.

The output from the detector 3040 and/or the photon counting system 3044 can be input to an electronic device 3048. The electronic device 3048 can be a computing device, a computer, a tablet, a microcontroller or a FPGA. The electronic device 3048 includes a processor that may be configured to execute one or more software modules. In addition to executing an operating system, the processor may be configured to execute one or more software applications, including a web browser, a telephone application, an email program, or any other software application. The electronic device 3048 can implement the methods discussed herein by executing instructions included in a machine-readable non-transitory storage medium, such as a RAM, ROM, EEPROM, etc. The electronic device 3048 can include a display device and/or a graphic user interface to interact with a user. The electronic device 3048 can communicate with one or more devices over a network interface. The network interface can include transmitters, receivers and/or transceivers that can communicate such as, for example, wired Ethernet, Bluetooth®, or wireless connections.

Regarding other options, since an SHG signal is weak compared to the reflected beam that produces it, it is desirable to improve the signal-to-noise ratio of SHG counts. As photon counting gate times for the photon counting system 3044 decrease for the blocking and/or delay processes described herein, improvement becomes even more important. One method of reducing noise that may be employed is to actively cool the photon counter. This can be done using cryogenic fluids such as liquid nitrogen or helium or solid state cooling through use of a Peltier device. Others areas of improvement may include use of a Marx Bank Circuit (MBC) as relevant to shutter speed. Moreover, system 3000 may be incorporated in-line within a production line environment. Production line elements preceding or following system 100 may include any of epitaxial growth system, lithography and/or deposition (CVD, PVD, sputtering, etc.) systems.

Figure 16A:
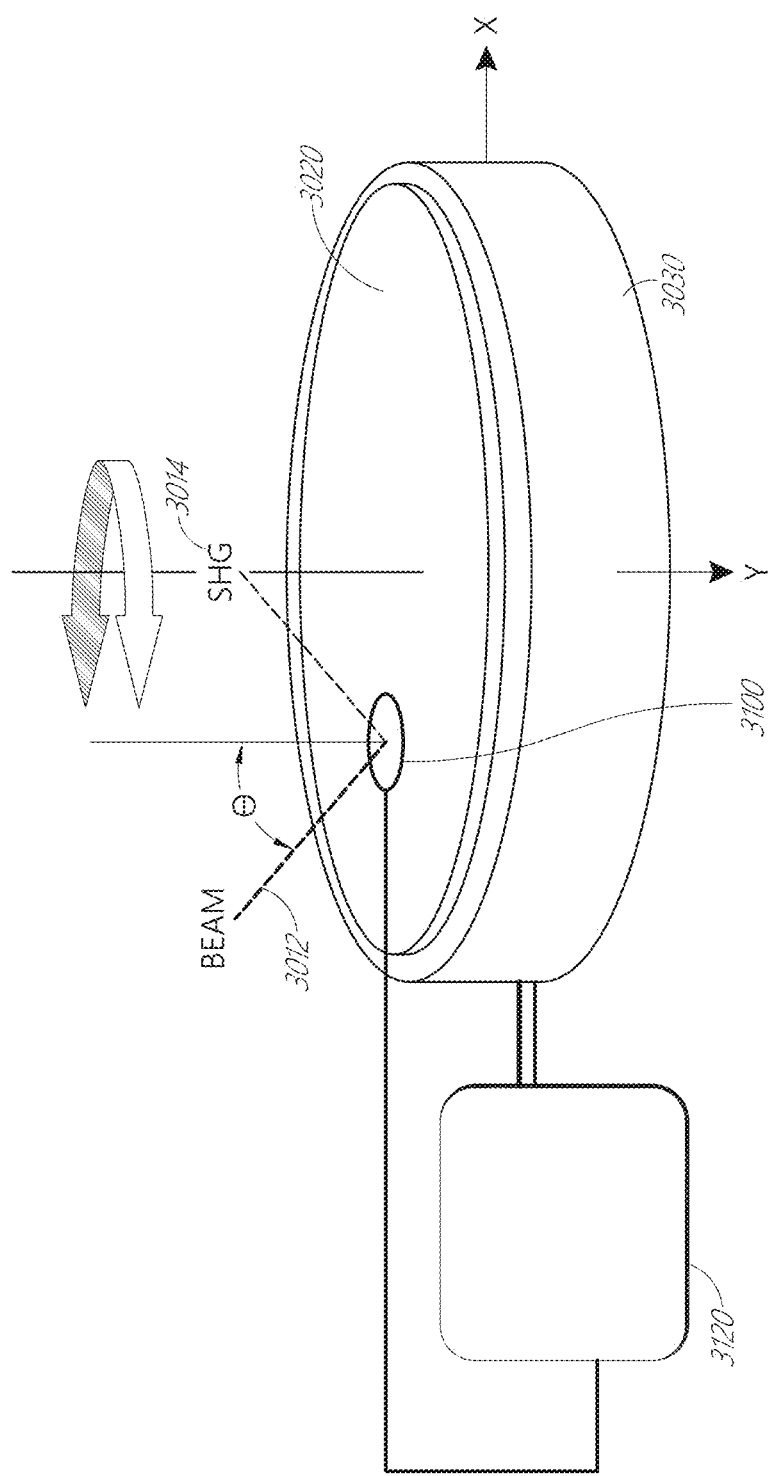
FIG. 16A is a perspective view of a first chuck configuration hereof.
Figure 16B:
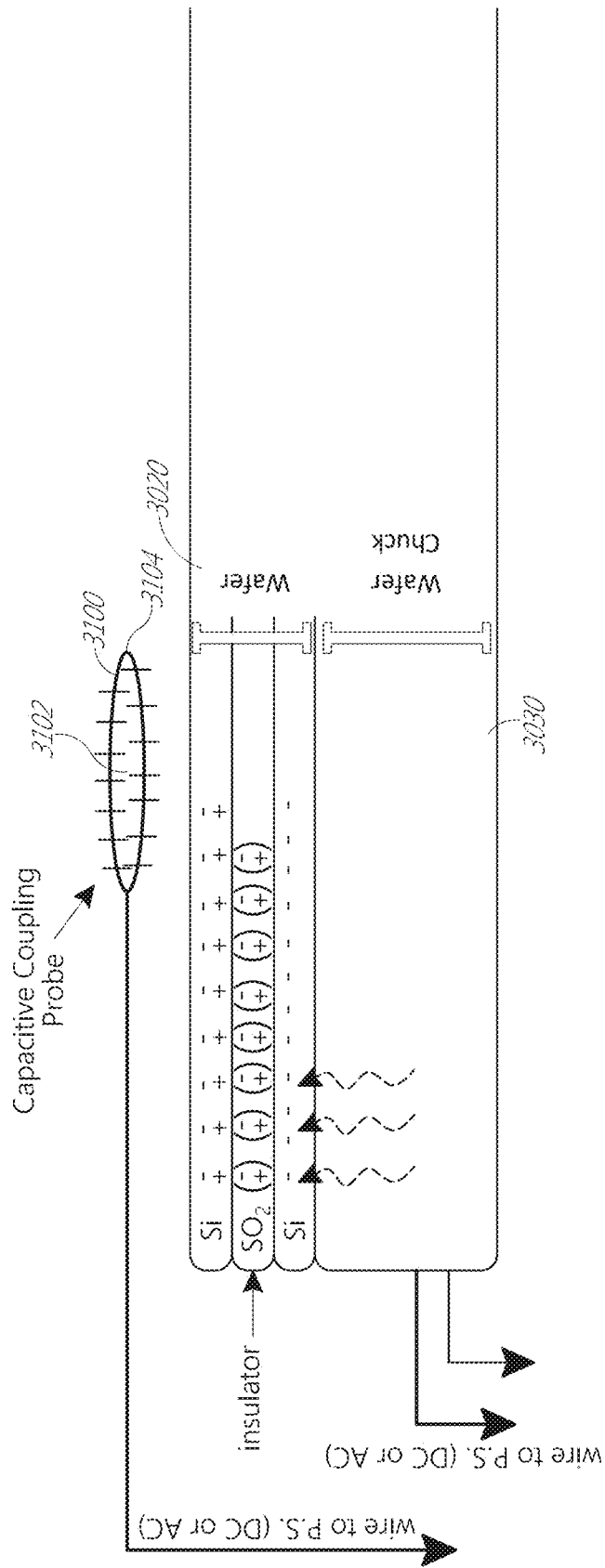
FIG. 16B is a side-sectional view of the chuck configuration in FIG. 16A.

In any case, FIGS. 16A and 16B provide views of a first set of purpose-specific chuck hardware that may be employed in the subject SHG system. The chuck 3030 holds a wafer 3020 by vacuum thereto or other means. The chuck 3030 is conductive and connected to a power supply. Optionally, a capacitive coupling probe 3100 is also connected to the power supply 3120. The power supply may be computer controlled, or at least its output is coordinated by computer for timing reasons as summarized above. The probe 3100 may likewise be controlled and/or monitored. It will be controlled in the sense that it will be part of a capacitive circuit attached to the power supply 3120. It may be monitored along with the chuck 3030 by a voltmeter to ensure that voltage is being induced as intended.

The probe 3100 includes a hole 3102 or port (e.g., 0.2 mm in diameter) in its ring 3104 to allow the optical beams 3012, 3014 (interrogation beam(s) and reflected SHG beam) to pass unblocked, and is fixed relative to the optics so that it moves or stays with the optical elements to remain centered on the (re)positioned sample site 3022 as the device surface is scanned. The coupling (indicated as having a positive "+" charge) is positioned close to the sample device surface (e.g., within about 1 mm to about 2 mm) but does not touch. It is supported by a cantilever arm or otherwise. The probe 3100 may be provided as a ring 3104 as shown in FIG. 16B, or it may comprise a larger disc or plate.

With the example shown in cross section in FIG. 16B, a wafer 3020 or device surface (comprising silicon) is separated from a silicon bulk layer by $SiO_2$ insulator. Thus, as explained above, the need for inductive bias to the device surface because it is otherwise (at least substantially) electrically insulated or isolated from the underlying silicon in contact with the conductive chuck 3030.

FIGS. 17A-17C detail an electromagnetic chuck 3030 that includes electrical coil(s) 3130 connected to a power supply 3120. In use, the wafer 3020 sits and is secured on top of the chuck 3030. When an alternating current (AC) is applied to the coil(s) 3130, this generates an alternating magnetic field through the wafer 3020. The magnetic field induces an electric potential across the wafer 3020 including its device surface. This electric field then enables the various modes of SHG interrogation noted above, some of which are detailed below. Alternatively, DC current may be applied to the coils 3130 which are oriented parallel to the chuck 3030, creating a constant magnetic field across the chuck for other effects as described above.

Figure 18A:
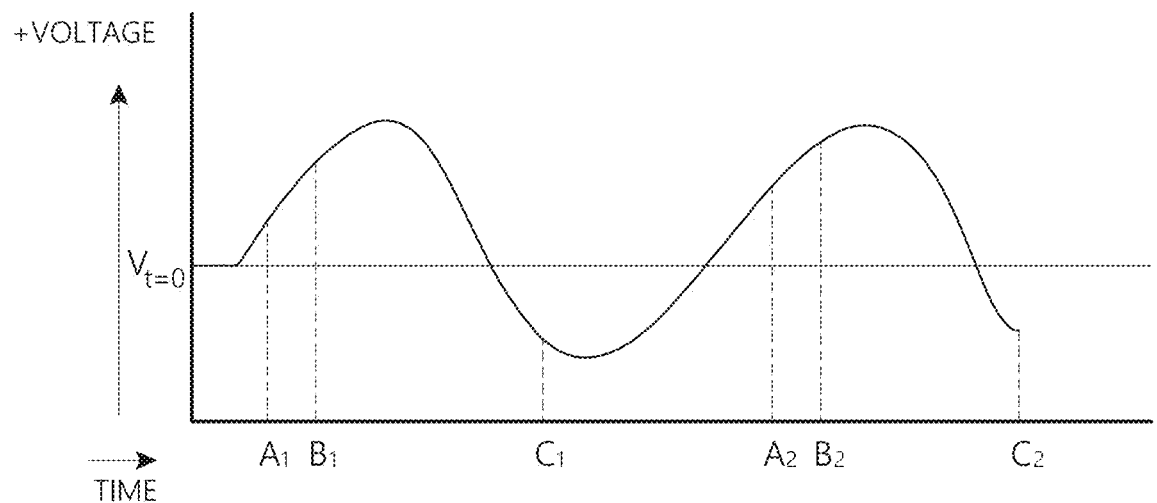
FIGS. 18A and 18B relate to AC voltage applied to and exhibited in a sample for DC bias probe elimination.
Figure 18B:
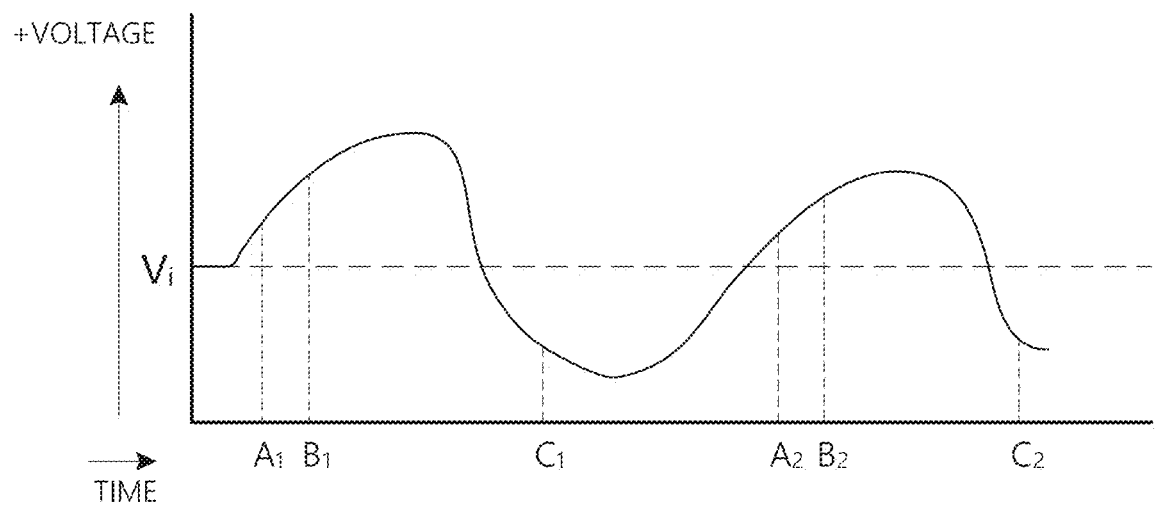
Figure 19A:
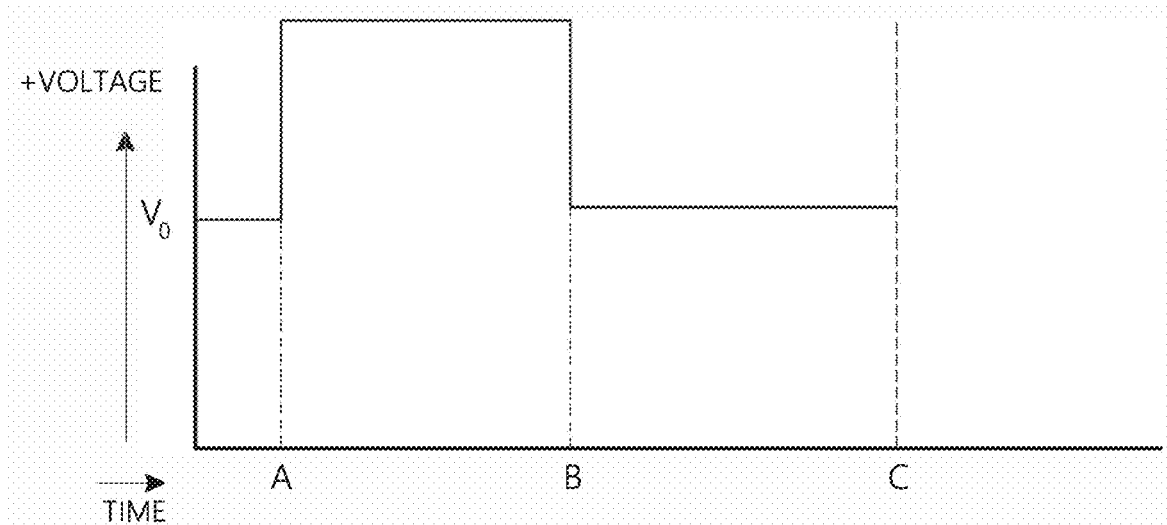
FIGS. 19A and 19B relate to AC voltage applied to and exhibited in a sample for testing leakage current.
Figure 19B:
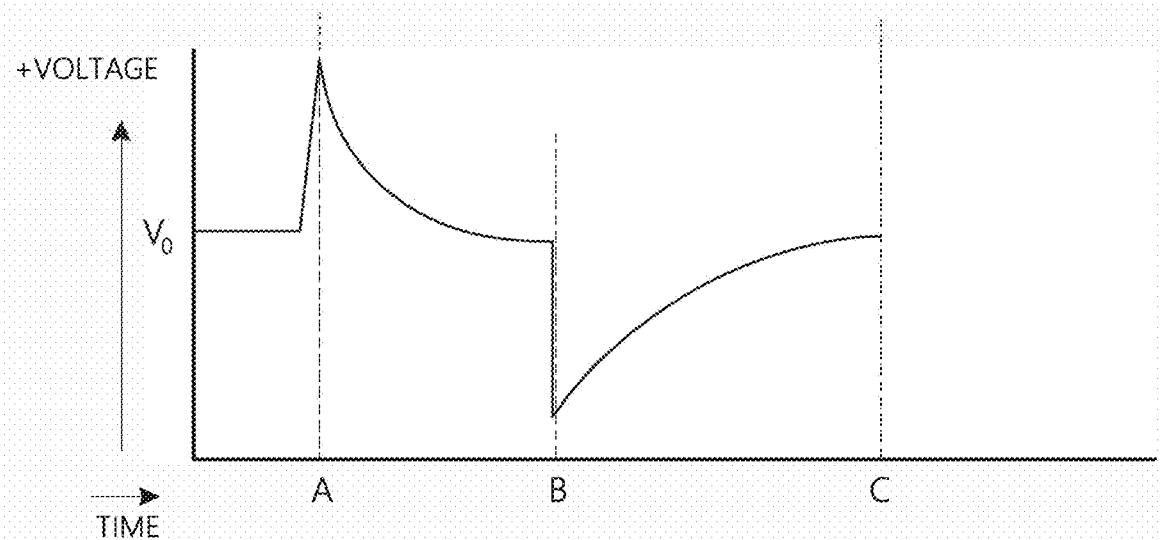

FIG. 18A shows an example AC voltage (V) profile (sinusoidal wave) applied to the substrate bulk layer over time. FIG. 18B shows a hypothetical response for induced voltage between the device and bulk layers ($V_i$) of the substrate on which the device is fabricated. In various embodiments, the substrate can comprise the silicon wafer or a portion of a semiconductor material. FIG. 19A shows an example AC voltage ($V_o$) profile (square wave) applied to the substrate bulk layer over time. FIG. 19B shows a hypothetical response for induced voltage between the device and bulk layers ($V_i$). Notably, the voltage input in either of FIG. 18A or 19A may differ from that shown, and could potentially be applied in steps, ramps, sine waves, or other forms.

More specifically regarding FIGS. 18A and 18B, as alluded to above, in order to minimize noise and obtain statistically relevant indicator(s) of SHG intensity as a function of voltage across the interfaces, multiple photon counting windows may be desirable. For such purposes, example points A1 and A2 are timed so that the voltage between the bulk and device layers, voltage A, is the same for both points. This is true for example points B1 and B2 at voltage B, and example points C1 and C2 at voltage C. Using voltage A as an example, SHG is recorded, and counts at points A1 can be summed with counts at point A2 and further at A3, A4, $A_n$ . . . in an arbitrarily long series depending on the desired measurement time. The total number of counts measured in this period is then divided by the time over which this "gate" spans as a way of finding the average number of counts per second, so that SHG intensity can be plotted as a function of bulk-device voltage A. The same method can be used to obtain measurements for voltage B at points B1 and B2 as well as at B3, B4, $B_n$ . . . in an arbitrarily long series depending on the desired measurement time. The total number of counts measured in this period is then divided by the time over which this "gate" spans as a way of finding the average number of counts per second, so that SHG intensity can be plotted as a function of bulk-device voltage B. Likewise, this method can be used to obtain measurements for voltage C at points C1 and C2 as well as at C3, C4, $C_n$ . . . in an arbitrarily long series depending on the desired measurement time. The total number of counts measured in this period is then divided by the time over which this "gate" spans as a way of finding the average number of counts per second, so that SHG intensity can be plotted as a function of bulk-device voltage C. Further details regarding the utility of SHG intensity as a function of bias voltage can be found in the DC biasing literature, an example of which is, "Charge Trapping in Irradiated SOI Wafers Measured by Second Harmonic Generation," IEEE Transactions on Nuclear Science, Vol. 51, No. 6. December 2004 and "Optical probing of a silicon integrated circuit using electric-field-induced second-harmonic generation," Applied Physics Letters 88, 114107, (2006), each of which publication is incorporated herein by reference in its entirety.

More specifically regarding FIGS. 19A and 19B, these figures illustrate an example for interrogating a Silicon-On-Insulator (SOI) device. In this example, a conductive chuck begins at a 'neutral' ground state, and bulk and device layers being at an equilibrium potential. At moment 'A', voltage applied to the chuck is changed rapidly, applying that voltage to the sample's conductive bulk layer. Since the sample's device layer is separated from the bulk by a thin buried oxide layer and not directly connected with a conductor, an electric potential field, or voltage will be induced between the device and bulk layers. Between times 'A' and 'B', the voltage applied to the chuck is not changed. Since the dielectric between the bulk and device layers is not perfect, the induced potential will drive a leakage current between the layers, causing the potential between the bulk and device layers to return to its natural state. This spike and decay in electric field is then monitored via SHG to provide insight to the leakage current. At time 'B' the voltage applied to the chuck is returned to ground, causing the voltage across the interface to reverse.

The systems and methods described herein can be used to characterize a sample (e.g., a semiconductor wafer or a portion thereof). For example, the systems and methods described herein can be used to detect defects or contaminants in the sample as discussed above. The systems and methods described herein can be configured to characterize the sample during fabrication or production of the semiconductor wafer. Thus, the systems and methods can be used along a semiconductor fabrication line in a semiconductor fabrication facility. The systems and methods described herein can be integrated with the semiconductor fabrication/production line. The systems and methods described herein can be integrated into a semiconductor fab line with automated wafer handling capabilities. For example, the system can be equipped with an attached Equipment Front End Module (EFEM), which accepts wafer cassettes such as a Front Opening Unified Pod (FOUP). Each of these cassettes can be delivered to the machine by human operators or by automated cassette-handling robots which move cassettes from process to process along fabrication/production line.

In various embodiments, the system can be configured such that once the cassettes are mounted on the EFEM, the FOUP is opened, and a robotic arm selects individual wafers from the FOUP and moves them through an automatically actuated door included in the system, into a light-tight process box, and onto a bias-capable vacuum chuck. The chuck may be designed to fit complementary with the robotic arm so that it may lay the sample on top. At some point in this process, the wafer can be held over a scanner for identification of its unique laser mark.

Accordingly, a system configured to be integrated in a semiconductor fabrication/assembly line can have automated wafer handling capability from the FOUP or other type of cassette; integration with an EFEM as discussed above, a chuck designed in a way to be compatible with robotic handling, automated light-tight doors which open and close to allow movement of the robotic wand/arm and software signaling to EFEM for wafer loading/unloading and wafer identification.

As described above each of Sections I, II, III, and IV of U.S. Provisional Application No. 61/980,860, filed on Apr. 17, 2014, titled "WAFER METROLOGY TECHNOLOGIES," are incorporated herein by reference in their entirety. Similarly, co-pending patent applications (i) U.S. patent application Ser. No. 14/690,179, filed Apr. 17, 2015 titled "Pump and Probe Type Second harmonic generation Metrology", published as U.S. Publication No. 2015/0330908, (ii) U.S. patent application Ser. No. 14/690,256, filed Apr. 17, 2015 titled "Charge Decay Measurement Systems and Methods", published as U.S. Publication No. 2015/0331029, and (iii) U.S. patent application Ser. No. 14/690,251, filed Apr. 17, 2015 titled "Field-Biased Second harmonic generation Metrology", published as U.S. Publication No. 2015/0331036, are each incorporated herein by reference in their entirety. PCT Application No. PCT/US2015/026263, filed Apr. 16, 2015 titled "WAFER METROLOGY TECHNOLOGIES" is also incorporated herein by reference in its entirety. Accordingly, features from the disclosure of any of these documents incorporated by reference may be combined with any features recited elsewhere herein.

Dimensional Metrology Using Second-Harmonic Generation

Semiconductor metrology can include measuring the "critical dimensions" of devices. These critical dimensions can include, for example, measuring the width, length and/or depth of a transistor or memory cell, the thickness of a gate oxide or the diameter of a contact hole (via) through an interlayer dielectric layer. Small changes in any of these dimensions, due to fabrication process variations, can lead to poorly functioning or non-working devices. Therefore, in certain cases it can be useful to monitor these dimensions during manufacturing to prevent yield problems or performance issues. It can be especially beneficial to monitor the manufacturing process at the early part of the device fabrication. For example, it can take weeks to manufacture a complete semiconductor product; if a defect in an early part of the manufacturing process is not detected until the final test, all the product produced in the interim is at risk of being defective. Therefore, monitoring the early part of the production process can be beneficial: missing a mistake early on can result in the loss of millions of parts.

Techniques for measuring the dimensions of devices early in the production process include optical and electron-beam based approaches. The two methods for production monitoring of critical device dimensions include are Critical Dimension-Scanning Electron Microscope (CD-SEMs) and Optical Critical Dimension (OCD) tools. CD-SEMs are scanning electron microscopes designed specifically for measuring the critical dimensions (CDs) of semiconductor electronic devices; Optical CD tools (OCDs) use the scattering of light from the surface of a semiconductor wafer containing devices to monitor for changes to the dimensions of the devices as they are being manufactured. Additional tools, used less frequently, include transmission electron microscopes (TEM) and atomic force microscopes (AFM). Each tool has advantages and disadvantages.

The shrinking dimensions of devices may benefit from increasing precision in the metrology tools used to monitor the production process. In addition, three-dimensional (3D) geometries are now being used that make it more difficult to measure and monitor the production process. These 3D geometries include FinFETs, Gate-All-Around and nanowires for transistor geometries. NAND memory devices are now being produced many layers of devices stacked vertically; these devices benefit from metrology of the full stack, including features buried beneath the surface. The shrinking dimensions and introduction of 3D complex geometries can be a challenge to current metrology tools.

Ideally, a metrology tool is sensitive, precise, repeatable, reliable and fast. Sensitivity is how small a change is detectible: can the metrology tool detect a five-percent change in dimension? For ten-nanometer features, the metrology tool might be benefit from detecting a sub-nanometer change in dimension. Precision can be different than sensitivity: will the metrology tool be able to discern between different changes? If a metrology tool cannot differentiate between different changes—say between the width at the top versus the bottom of a feature, it can present problems. If many different geometry changes produce the same result, it may be difficult to monitor the process using that tool because of the ambiguity in what is causing the change in measurement. A sensitive tool that lacks precision may set off alarms on process variations, many of which are unimportant. It may be advantageous instead for a metrology tool to measure different important parameters of a device independently, so that there is a one-to-one correlation between a measurement and a geometry change.

Repeatability is different than either sensitivity or precision. To monitor a production process, the variation introduced by the measurement tool may advantageously be much smaller than the variation in the process that is to be detected. It can be disadvantageous to have a tool that produces different results over time that are comparable to or larger than the variations in the devices being monitored. Metrology tools can have drift over time, due to changing environmental conditions (temperature, e.g.) or internal components (contamination on lenses, e.g.). In contrast, it would be advantageous for the measurement tool to be highly repeatable, giving the same result for the same feature dimension.

Repeatability, sensitivity and precision can compete with each other in a metrology tool. For example, a tool that always produces the same result, independent of the device geometry, will have perfect repeatability, but lack any sensitivity. A tool that can detect any change may be too sensitive to changes that are not important, i.e., lack precision and repeatability. The useful to tool may detect and identify important process changes and filter out unimportant ones—until the unimportant ones become important. These requirements can change over time, as the manufacturing process becomes more mature or new processes are introduced. Therefore, some flexibility in the metrology tool can be useful.

The cost-of-ownership can also be an important consideration in a metrology tool for production. In addition to the initial cost of the tool, the capital expense, there is the cost of maintaining the tool, including preventative maintenance and repairs. The lifetime of the tool is important: is the tool useful for only one generation of product, or can it be used for several generations of production? Another cost factor is the throughput of the tool: how fast can it make measurements? If the tool is too slow, many tools may be required, multiplying the cost. A useful tool may advantageously be able to keep pace with the production line. In some cases, for example, if the production line can process sixty silicon wafers per hour, the metrology tool can make the measurements on sixty wafers per hour. Lower throughput may slow the production process or not provide complete metrology results; faster throughput will not speed up the production line, so it may not generally necessarily be required.

Two more components to cost-of-ownership are damage to parts and time-to-results. If the measurement tool damages the inspected parts so that they have to be scrapped, this adds to the cost of the tool. Every scrapped part adds to the cost of the tool, and can significantly add to the cost-of-ownership, especially for high-volume production. Time-to-results is an indirect cost, that depends on how quickly a production change can be detected. If one metrology tool can detect a change in a few minutes, while another tool takes hours, the former tool may be much more valuable. During the time between when a process change occurs and when it is corrected, bad parts may be being manufactured. These bad parts are likely scrapped, and therefore increase the cost of the metrology tool. Therefore, it can be advantage to obtain results quickly to reduce or minimize production loss (i.e., maintain or increase yield).

Current metrology tools used for semiconductor device monitoring can vary considerably in these attributes of sensitivity, precision, repeatability, reliability, speed, nondestructive evaluation, and cost. For example, a TEM (transmission electron microscope) is very sensitive and precise, able to make measurements to less than one-tenth of a nanometer on a single transistor; however, it can involve removing a section of the device, which can be destructive to the sample. TEM analysis also involves an expensive tool, an experienced operator and a relatively long time to obtain results—hours or possibly even days. Therefore, the TEM, while very precise and sensitive, may not be used as an "inline" monitor or is not a direct part of the production line.

Two common tools used in the production of advanced semiconductor integrated circuits are the CD-SEM and Optical CD. The CD-SEM can take a direct, top-down image of a device. The resulting image can be used to make measurements of the dimensions of a device. If many devices are present in an image, many measurements may be made, improving the sensitivity of the measurement by averaging. CD-SEM's offer a simple, direct measurement, but they have measurement errors that can be problematic. In particular, charging of the device due to electron bombardment can cause imaging distortions that result in measurement errors. Electron bombardment can also contaminate the device, resulting in changing dimensions that reduce precision. For example, a device that initially appears ten nanometers wide may appear to increase to twelve nanometers due to contamination. Also, CD-SEM's are not as fast as optical tools, generally speaking, and are more complex tools, resulting in a higher-cost of ownership.

Optical critical-dimension metrology tools (OCD) can provide a fast, non-destructive method to measure critical dimensions of devices; however, they can be challenged by smaller geometries and 3D structures. The wavelength of light used can be in the visible, ultra-violet (UV) or infrared (IR) part of the spectrum. These optical wavelengths can range from about two hundred nanometers to over one thousand nanometers, and can be far longer than the device dimensions being measured, which can currently be in the one to one hundred nanometer range. Therefore, sensitivity can be a problem for these tools. Also, since they are not directly measuring an image, it can be difficult to differentiate between a measurement change and the root cause of that change—a problem with precision. Also, OCD tools average many devices together into a single measurement—hundreds or thousands of devices. This improves measurement precision and sensitivity, but introduces limitations on use. OCD tools cannot measure individual devices like a CD-SEM or TEM can; OCD tools have a large sample area, measured in tens or hundreds of microns, so are typically used only on vast fields of identical devices—either test structures or memory arrays. Again, this is a disadvantage compared to CD-SEM tools, which can measure individual devices or small areas. On the other hand, OCD tools are fast and relatively reliable, and do not damage the sample. Therefore, OCD tools are used to monitor production for many types of semiconductor devices.

Unfortunately, as device dimensions shrink and geometry becomes 3D and more complex, OCD tools are having increasing difficulty maintaining the required precision and sensitivity. One way to compensate for smaller feature sizes is to decrease the wavelength of the light used in OCD—going from visible light to UV; however, UV light can be less able to penetrate into 3D structures, especially as used in NAND memory devices. While silicon is transparent at IR wavelengths, it is not transparent at visible or UV wavelengths, making the metrology of buried structures difficult or impossible. Using IR light can measure buried structures, but is less sensitive to small dimensional changes due to the long wavelength of the light.

Small-angle x-ray scattering (SAXS) has been proposed and tools are being developed using this technique. X-rays have the advantage of being very short wavelengths—less than one nanometer, typically—so they can be very precise measurements; however, x-rays can have significant disadvantages for a production tool. First, they may involve complex and expensive equipment to generate, focus and detect, as compared to OCD. Second, they may cause damage to electronic devices, making them questionable for production use. Third, they may be slower to make a measurement than either OCD or CD-SEM in some cases. Because of these factors, it is not clear whether SAXS can be used as a replacement for either OCD or CD-SEM. Therefore, there exists a current and growing need for a new technology to extend or replace current inline production metrology tools.

To address some of the difficulties associated with performing metrology on semiconductor devices (e.g., semiconductor devices at various stages of production) with increasing complexity and shrinking dimensions, a new dimensional metrology system and method based on second harmonic generation of light (also referred to herein as SHG-CD for Second Harmonic Generation-Critical Dimension) is disclosed herein.

Second-Harmonic Generation (SHG) is a non-linear optical phenomenon in which light (e.g., pulses of light) at one frequency impinge on a sample and generates light at twice the frequency herein referred to SHG light, SHG signal, SHG light, or second-harmonic generated light. Additional information regarding second harmonic generation, is described above and is provided, for example, in U.S. Pat. No. 10,591,525 issued to Koldiaev et al on Mar. 17, 2020 and titled "Wafer Metrology Technologies", which is hereby incorporated herein by reference in its entirety. Second-harmonic generation generally involves a non-centrosymmetric material, an interface or a defect: some property of the sample that breaks inversion symmetry of the sample (e.g., at a point or in a region where interaction with incident light occurs). In a material such as silicon, which is centrosymmetric, second harmonic generation occurs at interfaces and defects where the inversion symmetry is broken. Second harmonic generation can be enhanced by static electric field (DC) at interfaces or defects. These static electric fields can be created by an interface between different materials, a space-charge region (SCR), doping or defects. The resulting "electric-field induced second harmonic generation" of light, EFISHG, may be used to probe electronic properties of the sample such as electronic states at buried interfaces and defects, including band-bending, density of states, charging and adatom adsorption.

Additionally, small changes in the physical features of a semiconductor device can create large changes in internal electric fields in the device. The change in electric fields internal to the sample, caused by changes in the dimensions of the device, in turn changes the second-harmonic generation of light in the sample. Similarly, this effect may be also referred to as electric-field induced second-harmonic generation of light, or EFISHG.

A second harmonic generation system for determining critical dimension (also referred to as SHG-CD system) may illuminate a sample, a structure, and/or a device (e.g., an electronic device) and use the SHG light emitted by the device to determine the corresponding physical structure (e.g., shape and/or dimensions) of the device and/or monitor changes in such features. In some cases, the SHG-CD system may use SHG light emitted by devices produced in a production line to monitor the quality and stability of the production procedure and possibly improve the production yield and/or the performance of the produced devices. The devices that are measured by the SHG-CD system, can be either completed or yet to be completed and the changes can be unplanned variations (e.g., variation associated with changes in a processing tool associated with degradations, environmental changes, malfunction, variations in consumable used by the processing tool, and the like). In some cases, the SHG-CD system may use SHG light emitted by a sample, device, and/or structure to determine one or more material properties of the sample, device, and/or the structure. In some cases, the SHG-CD system may use SHG light emitted by a sample, device, and/or structure to determine both geometric feature and material properties of a sample, device, and/or structure.

An SHG-CD system can be more sensitive to small local changes to three-dimensional geometry than other non-destructive techniques, such as OCD or CD-SEM and may reduce or eliminate the need for destructive production monitoring, such as cross-section TEM or SEM, or x-ray analysis. A SHG-CD system may be faster than electron-beam or x-ray techniques and can reduce the cost of sample monitoring (e.g., in a production line).

In addition or in the alternative to monitoring for changes in physical features (e.g., shape and/or dimensions) of the devices or portions thereof and thus monitoring production, a SHG-CD system may provide a feedback signal, feedback data, or information usable to control a production step of the device. In some cases, a feedback signal, feedback data, or information may be used to control a production step that produces the monitored sample. In some cases, the SHG-CD system may be included in a sample evaluation step and may provide a feedback signal or feedback data, to a step prior to or upstream the evaluation step. This prior step in the fabrication process may include, for example, lithography, etching, or deposition steps. In some implementations, SHG-CD may provide a feed-forward signal, feed-forward data, or feed forward information usable to control a production step following the monitoring step or the sample measurement. In some such implementations, the subsequent or downstream step(s) may be adjusted based at least in part on the feedforward signal, feedforward data, and/or feedforward information, provided by SHG-CD to adjust or correct for fabrication process changes detected by the SHG-CD system.

In some examples, a SHG-CD system directs light such as pulsed light (e.g., pulsed laser light) onto a sample, such as a silicon wafer comprising semiconductor devices or partially constructed semiconductor devices. The SHG-CD may be used to monitor a sample at some point in the semiconductor fabrication process, by directing light toward the sample and detecting the resulting SHG light (also referred to as SHG signal). The pulses of incident light may generate light at the second harmonic (or half the wavelength) of the incident light, sometimes referred to as a second-harmonic generation (SHG) signal and/or SHG light. The SHG signal can be measured using one or more detectors. These detectors can be configured to measure one or more of the intensity, angular distribution, or polarization of the SHG signal, or any combination thereof, by generating a detected SHG signal (e.g., an electronic signal). In some cases, the detected SHG signal can be proportional to an intensity of the SHG light incident on the detector (e.g., on an optoelectronic sensor of the detector). In addition, the incident light pulses may be adjusted to improve (e.g., increase) the SHG signal from the sample, such as by selecting polarization, wavelength or intensity. In addition, the orientation of the sample may possibly be adjusted, such as by rotating the sample with respect to the scattering plane of the light (e.g., a plane formed by an incident beam and an axis perpendicular to the sample surface).

In some cases, the sample may be prepared for the second-harmonic generation measurement by exposure to a secondary light beam or electric charge. For example, a region of the sample from which the SHG light is emitted may be optically pumped by directing a second or auxiliary beam of light onto the region. The secondary or auxiliary light beam may be at the same or a different wavelength as the primary light beam incident on the sample (pulses used to generate the SHG signal). The electric charge may, for example, come from a corona discharge. Some examples of optically pumping with an auxiliary light source as well as example configurations for providing charge are discussed above. Optical pumping and/or electronic charge accumulation or deposition, however, need not be provided and thus the SHG-CD need not include a light source for optical pumping in addition to the probe light source.

In various systems and methods, the SHG signal can be monitored for changes to the SHG signal (e.g., changes associated with intensity, polarization, spatial distribution, etc.) that may indicate changes in the production of the semiconductor devices (e.g., changes in one or more processes prior to measurement). These changes in production of the semiconductor devices may produce a change in the devices geometric features such as a change in device dimension (e.g., width, length, height, thickness), such as the width of a transistor feature, or the alignment or spacing between features. These changes in geometric features may also possibly include change in shape. In some cases, the SHG signal and/or the detected SHG signal may be processed (in the optical or electronic domain) to make the changes in the SHG signal and/or the detected SHG signal more apparent. In some implementations, the SHG signal may be used to alert manufacturing personnel or equipment of a potential problem with production. In some implementations, the SHG signal or the detected SHG signal may be used to provide feedback to production equipment earlier or upstream in the production process to improve device yield or performance. In some implementations, the SHG signal or the detected SHG signal may be used to provide a feedforward signal to a subsequent or downstream step in the production process to correct for prior changes.

In some cases, a change or variation in a geometric feature of a sample or a device may comprise a difference between the geometric feature of the sample or device and a saved geometric feature stored in a memory of the system. In some examples, the saved geometric feature may comprise a reference geometrical feature (e.g., provided by a user), or a previously determined geometrical feature by the SHG-CD system.

In some examples, a SHG signal may be used to determine the geometric or electronic structure of a feature of a fabricated device. The device may be a finished product or at some earlier stage of production. The SHG signal may be compared to a database of (e.g., geometric) features to determine the structure of the device (e.g., geometric) feature. In some cases, the SHG signal may be compared to a database of (e.g., material characteristics) features to determine the electronic structure of the device (e.g., material properties). The SHG signal may also be used to calculate the structure (e.g., geometric structure) based on a priori knowledge of the structure. The database of (e.g., geometric and/or material property) features may include data calculated and/or measured prior to the measurement of the device to facilitate rapid identification of the device structure. These results (e.g., determined features) may also be used to alert manufacturing personnel of process variations, feedback or feed forward as described previously.

In various designs, a primary pulsed laser beam strikes a spot on the surface of an integrated circuit (e.g., silicon integrated circuit). The pulses may generate light at the second-harmonic of the primary beam via interaction with the integrated circuit (e.g., a device in the integrated circuit). The SHG signal is measured using one or more detectors. The measurements may include the intensity, angular distribution, polarization or any combination thereof of the SHG light. The sample may also be rotated to take multiple measurements (e.g., corresponding to different angles of incidence and/or SHG light emitted along different directions), and the wavelength of the primary beam may also be varied.

The detected SHG signal may be processed and compared to a detected SHG signal produced by computer simulation using a model. The model may include geometrical information from the sample such as one or more dimensions or shapes. In some examples, the geometrical information (e.g., reference geometrical information) may include at least two dimensions. For example, the geometric information may include the height, width or length of a feature and may potentially include thickness and/or spacing. The geometric information may also comprise shape, which may include for example angles, orientations, degree of smoothness, roughness, or other feature or characteristics.

The model may be generated empirically from measurements or calculated, or a combination of both. The model may be used to evaluate the processed SHG light signal to determine either the structure (e.g. geometric structure) or a change in the structure (e.g. geometric structure) of the devices on the sample.

The results of said comparison may be used to monitor a fabrication process. In some examples, if the comparison indicates a significant change to the device structure such as device geometric structure (e.g., an unplanned variation in a geometric feature), the process may be temporarily suspended until the problem is fixed. The results of said comparison may additionally, or alternatively, be used to assist in development of a new device structure or process for fabrication of a device.

Figure 20:
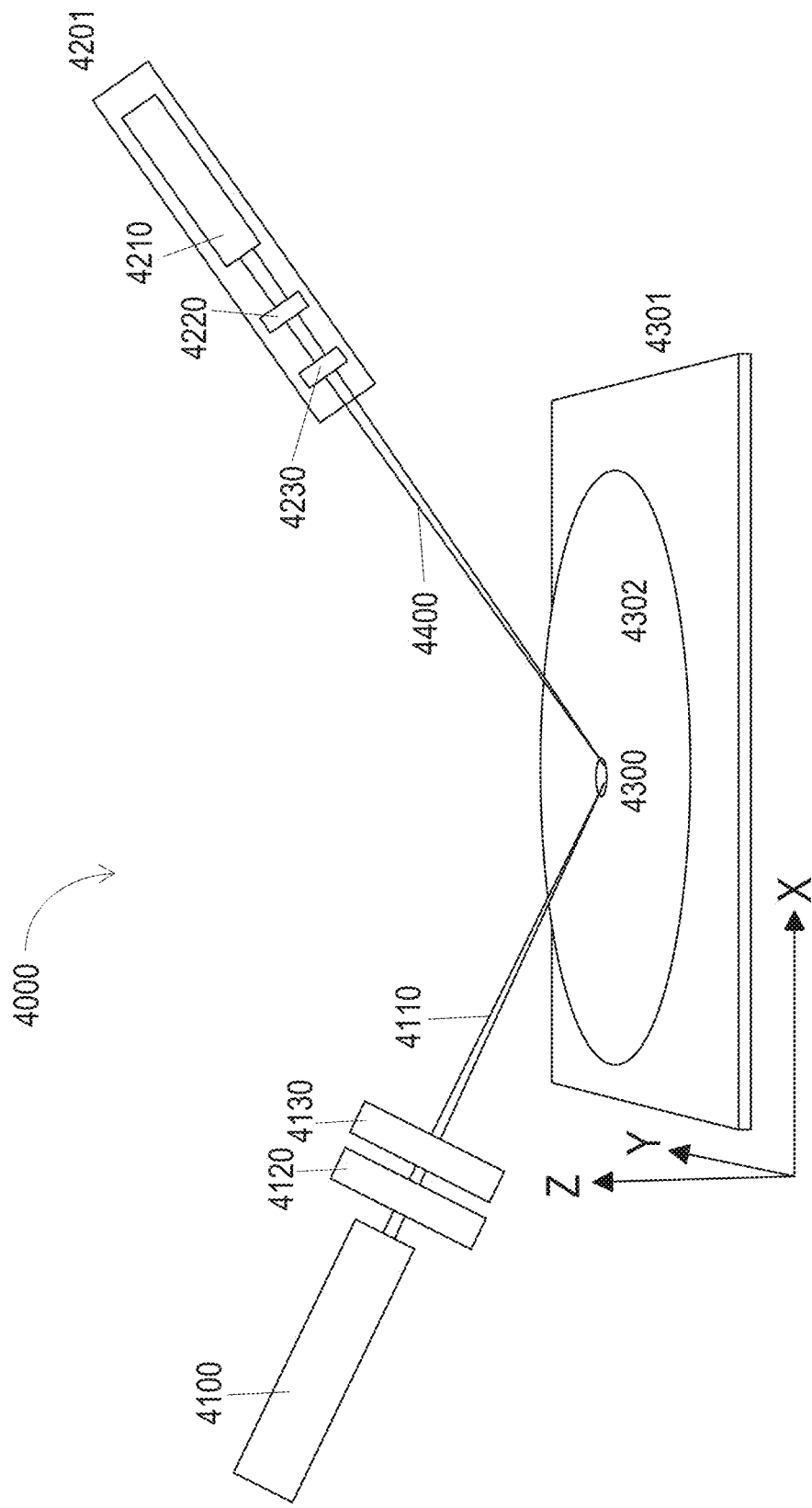
FIG. 20 shows aspects of an example sample inspection system 4000 for characterizing a sample using Second Harmonic Generation (SHG) signal. In the illustrated example, a pulsed laser source 4100 is directed at the sample 4302 to be inspected. One or more detectors 4201, 4210 are situated to collect light 4400 at the second harmonic wavelength emitted by the sample 4302. In some cases, the detector 4201 can be a detector module comprising the detector 4210 and one or more optical components. In some cases, the detector 4201 or the detector 4210 may comprise a detector array (e.g., a one or two dimensional detector array) comprising a plurality of pixels. The detectors 4201, 4210 may be located at or moved to different positions (e.g., measurement positions) to sample light at different angles (e.g., different angles of inclination and/or different azimuthal angles). The detectors 4201, 4210 may also contain filters 4230 to eliminate light at wavelengths other than the second harmonic, and may have polarizing filters 4220 to select different polarizations of light. Additional detectors can be used to detect light at the primary wavelength. The sample 4302 may be mounted on a stage 4301 which can be moved (such as laterally) to position a portion of the sample under the incident light 4110. The stage 4301 may additionally or alternatively include height adjustments and rotation (e.g., to provide for different azimuthal angles with respect to an axis of rotation perpendicular to the sample surface, e.g., z-axis in FIG. 20).

FIG. 20 illustrates an example SHG-CD system 4000 for measuring and monitoring features (e.g., critical dimensions) of a sample or devices included in the sample. In the example shown in FIG. 20, a laser source 4100 (e.g., a pulsed laser source such a Ti:sapphire laser) may be 4100 used to generate a laser beam 4110. In some cases, the laser beam 4110 may comprise pulses having a duration from 10 to 50 femtosecond, 50-100 femtoseconds, from 100 to 150 femtoseconds, 150 femtoseconds to 200 femtoseconds, or any values between these ranges or larger or smaller. In some cases, the laser beam 4110 may have a wavelength (e.g., a center wavelength) from 500 nm to 700 nm, from 700 nm to 900 nm, from 900 nm to 1200 nm, from 1200 nm to 1500 nm, from 1500 nm to 2000 nm, or any values in between or larger or smaller. In some cases, the laser beam 4110 may comprise pulses with a duration of 100 femtoseconds and have wavelength (e.g., a center wavelength) of 800 nm. In some such cases, the laser source 4100 can be a Coherent Mira Ti:sapphire laser. The laser beam 4110 may be directed to a sample 4302 to be inspected. In some examples, a polarizer 4120 may select the polarization of the laser beam 4110, and focusing optics 4130 may focus the laser beam 4110 on the sample 4302 and thereby illuminate a spot or a region 4300 on the sample 4302. In some cases, the illuminated spot or region may contain one or more devices (e.g., semiconductor devices) or structures. In some cases, a portion of one or more devices may overlap with the illuminated region. In some cases, the sample 4302 may sit on a stage 4301 that can position (e.g., laterally in a plane parallel to the top surface of the sample 4302 along x and/or y directions) and/or rotate the sample 4302 (e.g., in an azimuthal or polar direction with respect to a Cartesian coordinate system having an axis perpendicular to the surface of the sample (e.g., z-axis of the xyz system shown in FIG. 20). The devices on sample 4302 may be complete or at various stages of production (e.g., at an early stage), such as after fabrication of the gate layer or after lithographic exposure and development of a photoresist or hard mask. In some cases, the stage 4301 may be a movable or adjustable so that a portion of the sample 4302 illuminated by the laser beam 4110. can be moved (e.g., laterally). In some examples, the height and/or rotation state of the stage 4301 may be adjustable (e.g., manually, or electronically). For example, an angle of incidence of the laser beam 4110 with respect to the sample 4302 may be controlled by controlling an azimuthal angle of the stage 4301.

In some implementations, the stage 4301 may not be part of the SHG-CD system 4000. In some cases, the stage 4301 can be included in a tool in the corresponding production line. In some such cases, the SHG-CD system 4000 may be in communication with the tool to send control signals for controlling the position/orientation of the stage 4301, or receive readout signals indicating the position/orientation of the stage 4301.

In some implementations, one or more detectors 4201, 4210 may be positioned with respect to the illuminated spot or region 4300 so as to collect at least one light beam 4400 emitted or reflected from the illuminated region 4300. In some cases, the light beam 4400 may comprise a second harmonic of the laser beam 4110 emitted by the sample 4302 (e.g., via a second order nonlinear interaction of the laser beam 4110 with the sample 4302). In some examples, detector 4201, 4210 may detect a second-harmonic generated light 4400 (also referred to as SHG signal and/or SHG light) having a wavelength of 400 nm generated upon interaction of a laser beam 4110 having a wavelength of 800 nm. In some cases, the detectors 4201, 4210 may be located or moved to different positions to sample light beams (e.g., SHG light) propagating at different angles (e.g., different angles of inclination and/or different azimuthal angles). In some examples, the detectors 4201, 4210 may include one or more filters (e.g., filter 4230). In some such examples, the spectral filter 4230 may be used to block, filter out or eliminate light having wavelengths different from a second harmonic of the beam 4400. In some cases, the detectors 4201, 4210 may include one or more polarizers (e.g., polarizer 4220). In some such cases, the polarizer 4220 may be used to select a polarization of the detected light, e.g., by allowing the transmission of light having a first polarization state and absorbing or redirecting light having a second polarization. In some cases, the detector 4201 can be a detector module comprising the detector 4210 and one or more optical components. In some cases, the detector 4201 or the detector 4210 may comprise a detector array. In some cases, the detector 4201, 4210 may comprise a photomultiplier tube (e.g., for measuring intensity of the SHG light). In some cases, the detector 4201, 4210 may comprise one or more optical elements configured to direct and/or focus the SHG light 4400 to the detector 4210. In some implementations, at least one detector may be used to detect light at having a wavelength of the laser beam 4110 (also referred to as primary wavelength).

In some implementations, the system may compare the measured SHG signals (e.g., the detected SHG signals) against predicted SHG signals or predicted detected SHG signals generated by simulating second harmonic generation by the measured device (e.g., an electronic device such as a semiconductor device) using a digital model of the measured device. The outcome of such comparison can be used to determine a dimension (or a shape) of a physical feature of the measured device, or determine whether a change in dimension (or shape) has occurred, for example, compared to: a previously measured dimension (e.g., stored in the memory of the system), the dimensions used for simulating the SHG signal, or a reference dimension (e.g., stored in the memory of the system).

In some implementations, the SHG-CD system may compare a first SHG signal or a first group of SHG signals received from a first sample with a second SHG signal or a second group of SHG signals received from a second sample, e.g., to detect a change in a fabrication process. For example, the SHG-CD system, may measure a first detected SHG signal or a first group of detected SHG signals and compare them with a second detected SHG signal or a second group of detected SHG signals stored in a memory of the system. The second detected SHG signal or the second group of detected SHG signals may be received from the second sample and stored after receiving the first SHG signal or a first group of SHG signals from the first sample. In some cases, the first and the second samples may be fabricated by the same fabrication system. In some cases, a difference between the first detected SHG signal and the second detected SHG signal may indicate a change in fabrication step in the fabrication process. In some cases, if the difference exceeds a specified value (e.g., a specified value stored in a memory of the SHG-CD system), the SHG-CD system may output a signal indicative of the change in the fabrication step. In some cases, the fabrication step can be a fabrication step performed on the first and the second samples before the SHG measurement.

Figure 21:
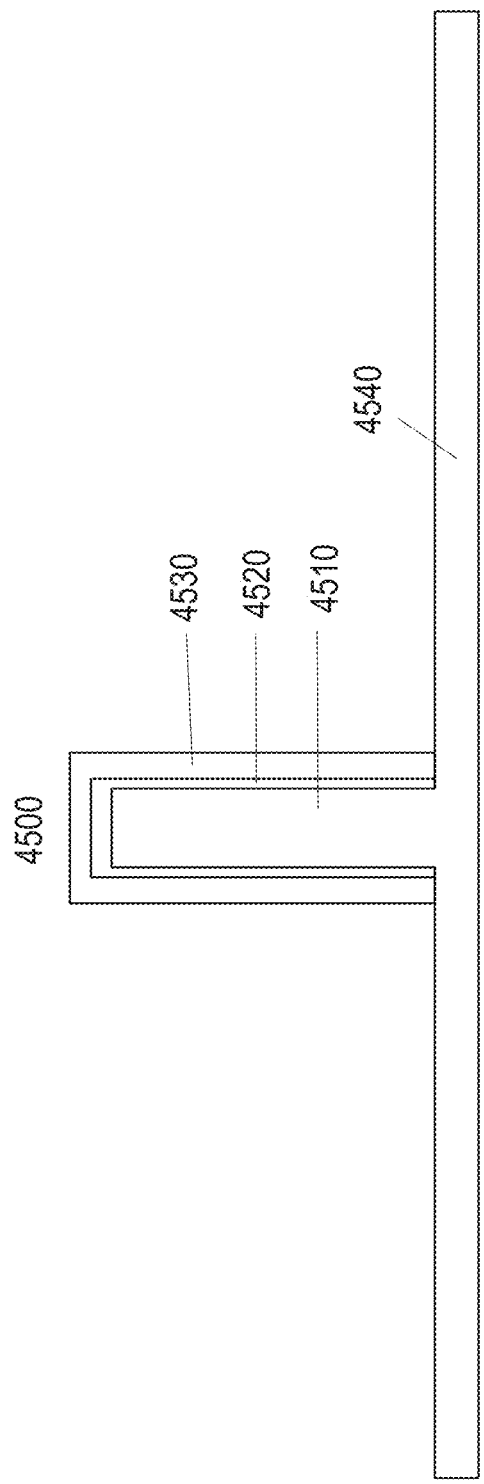
FIG. 21 illustrates an example cross section of a semiconductor device/part of a portion of a semiconductor device, a FinFET transistor geometry 4500. The example FinFET structure may include some combination of a silicon substrate 4540, a vertical "Fin" of silicon 4510, an oxide layer covering the Fin 4520 and a conductive gate contact 4530.
Figure 22:
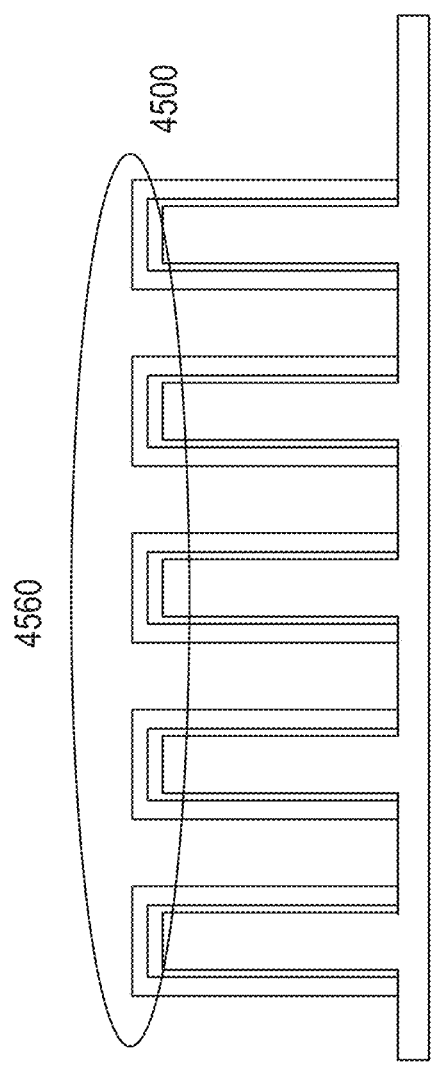
FIG. 22 illustrates an example FinFET array structure comprising a plurality of FinFET transistors. The FinFET geometry 4500 is repeated along a one-dimensional array 4560. In some cases, a SHG signal produced by such an array of FinFETs (e.g., upon illumination by an incident laser beam) can be simulated using computer modeling and the effect of different parameters, e.g., height, width, spacing, periodicity, shape, etc. on the resulting SHG signal, e.g., on the intensity of the SHG signal, can be simulated using computer modeling. For example.

To generate the digital model of the SHG signal, the geometry and materials for a device structure and optical configuration (used to illuminate the device) can be input to a modeling program (e.g., a program for modeling nonlinear light-matter interaction), which calculates a predicted SHG emission for the provided device structure and optical configuration. For example, FIG. 21 shows a simplified configuration of a FinFET transistor 4500 on a silicon wafer 4540. This FinFET transistor has a silicon fin 4510 width of 5 nm, a hafnium-oxide gate oxide layer 4520 and a tungsten gate contact layer 4530. As shown in FIG. 21 this transistor has geometric features such as dimensions (e.g., height, width, and the like), and/or a shape including tilt (or lack thereof) and sidewall slope (or lack thereof). FIG. 22, shows a one-dimensional array 4560 formed by multiple FinFET transistors. In some cases, for simulation purposes, the one-dimensional array 4560 may be assumed to be infinitely wide and repeating indefinitely. As shown in FIG. 22 the one dimensional array has geometric features such as spacing between the FinFET transistors, and dimensions (e.g., height, width, and the like), and/or a shape (e.g., tilt (or lack thereof), sidewall slope (or lack thereof), and the like), of each FinFET transistor.

Figure 23:
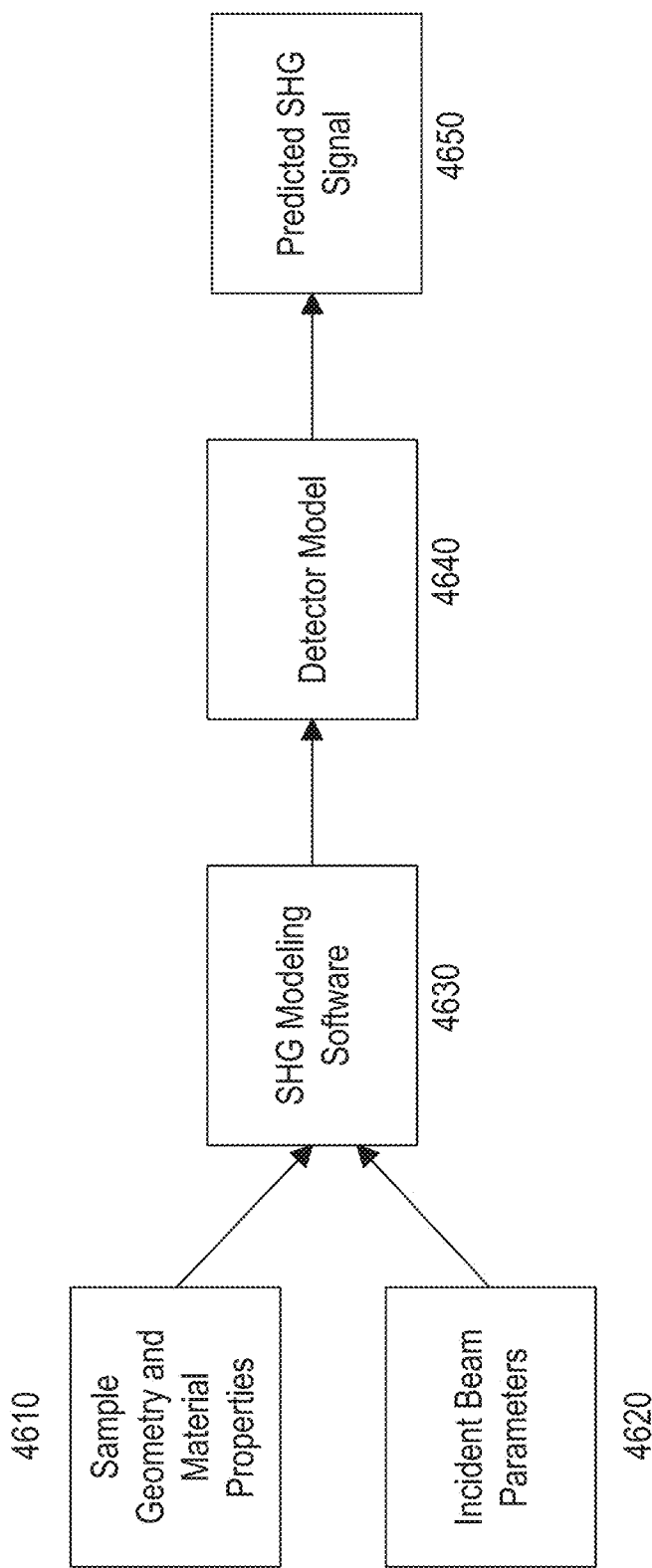
FIG. 23 illustrates an example process of predicting the SHG signal generated by a sample (e.g., a structure in a sample). In various implementations, the sample geometry and material properties 4610 and the incident beam parameters 4620 may be used as input into a SHG modeling software 4630, that may be used to model the SHG signal generated by a structure on the sample having a specific geometry and outputs results regarding the SHG signal, for example. In various implementations, the output of the SHG modeling software can be an emission pattern of the SHG signal generated by the structure. In some cases, the emission pattern can be further processed using a computer model of a detector 4640 (e.g., a detector used to generate the SHG signal), which provides a prediction of the signals 4650 that may be output by the detector included in the an SHG system (e.g., the SHG sample inspection system shown in FIG. 20) used to characterize the sample.

FIG. 23 shows an example process that may be used to generate a predicted SHG signal and a predicted detected SHG signal. In FIG. 22, a device model 4610 (e.g., a digital model) of the FinFET array 4560, and a beam model 4620 of the incident pulsed beam 4110 are used as input to software 4630 capable of modeling SHG light emitted by a structure (e.g., a structure on a sample under test) upon illumination by an incident beam of light. An example of such software may include, but is not limited to: Lumerical's FDTD (Finite Difference Time Domain) software available from Ansys Canada Ltd, Vancouver, British Columbia. In some cases, the device model may include geometrical and material properties of the structure under test (e.g., the FinFET array) and the beam model may include beam parameters of the light beam incident on the structure. The modeling software 4630 may calculate an emission pattern of the SHG light expected from illuminating the structure by the incident beam of light. In some examples, the resulting emission pattern may be input to a detector model 4640 (e.g., a detector model associated with a detector or detector type used to measure the emitted SHG light) which may filter the emission pattern and produce expected detected SHG signals 4650 for that sample geometry and materials 4610. In some cases, the detector model may filter the emission pattern based, e.g., on an entrance aperture of the detector.

Figure 24:
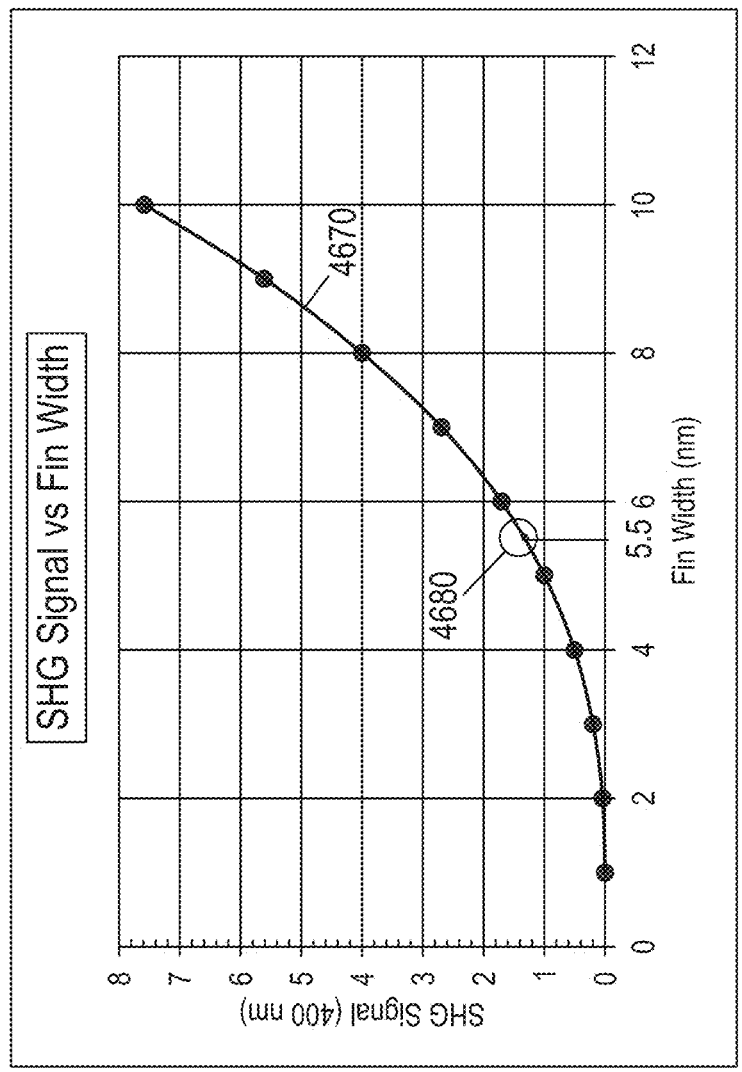
FIG. 24 shows results of simulating the SHG signal intensity for an array of identical FinFET transistors when the width of the fin is changed from 1 nm to 10 nm.

FIG. 24 illustrates simulated detected SHG signals plotted against the width of a FinFET transistor (e.g., a silicon FinFET) showing an example relationship between the simulated detected SHG signal and Fin width. In some cases, the detected SHG signal can be proportional to an intensity of the SHG light generated by the FinFET upon illumination. In the illustrated example, the data points for the SHG signal are calculated for a discrete series of fin widths ranging from 1 nm to 10 nm in 1 nm steps. The result is a graph 4670 of the values of relative SHG intensity (e.g., normalized intensity) for different fin widths as shown in FIG. 24 (solid circles). In some cases, the graph 4670 may be used to predict a width of a FinFET under test (e.g., having the same geometry as the FinFET used in the simulation) based on a measured SHG signal from the FinFET under test. For example, a measured SHG signal intensity 4680 may be used to determine the width of the silicon fin on the device, in this case 5.5 nm, by interpolation between calculated data points at 5 nm and 6 nm. Interpolation, extrapolation, as well as other methods may be employed.

In some examples, more than one possible change to the device geometry may cause a similar change in the SHG signal generated by the device, making it difficult to identify the change that occurred (e.g., with respect to a previously measured device, or a reference device). For example, a change in height or a change in width of the device may cause the same change in SHG signal. Therefore, it may be desirable to use additional detectors that measure the SHG emitted light at different angles (e.g., angles of inclination) and/or different polarizations to more accurately capture the changes using the additional data obtained from signals provided by the additional detectors. In some examples, the additional detectors can be introduced into the detector model 4640 in FIG. 23. This provides additional signals that may be used to compare the predicted and measured detected SHG signals (or SHG signals). These additional signals can be used in some cases to differentiate between different geometric changes to the device.

Figure 25:
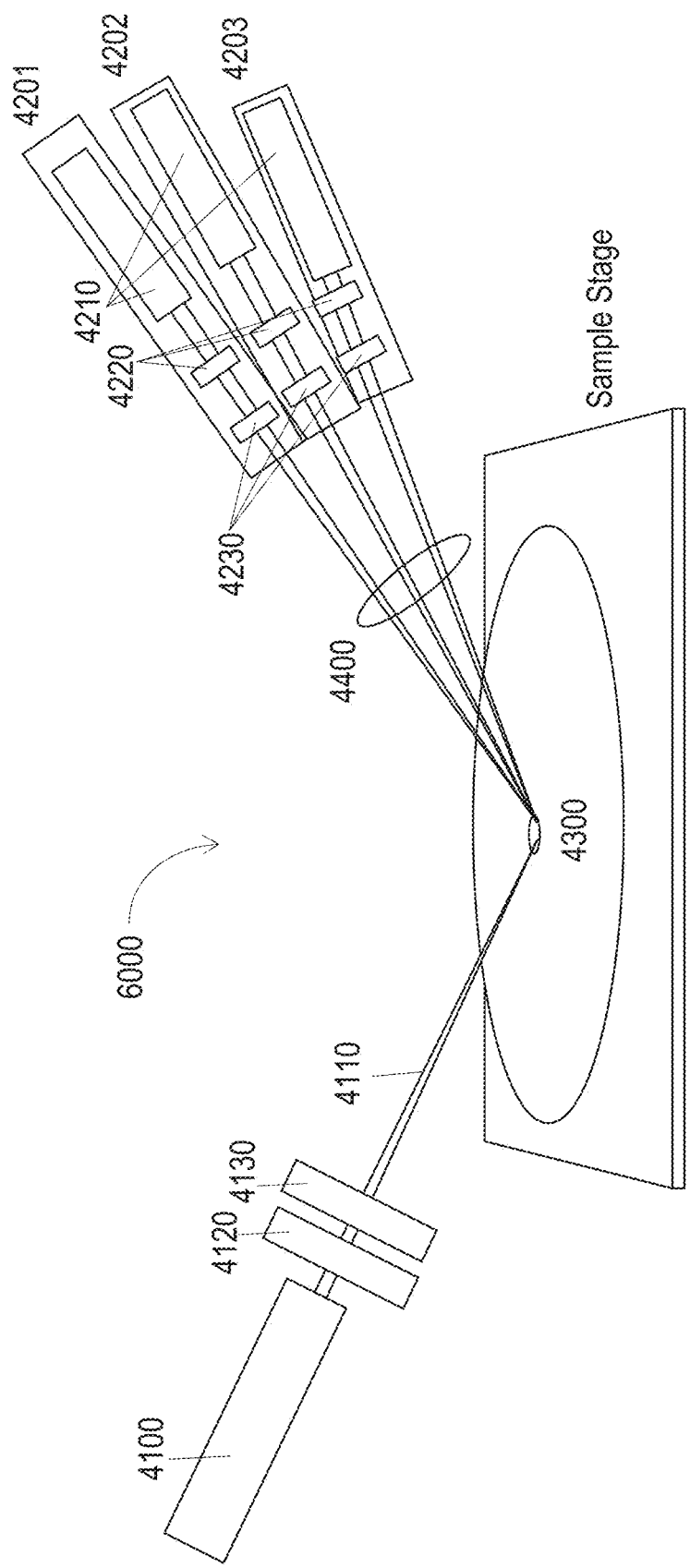
FIG. 25 illustrates an example SHG system that includes a plurality of detectors for measuring SHG signals generated by an illuminated region 4300 on the sample and a several angles (of inclination). Additional SHG information collected via different angles may be usable for determining a particular critical dimension, e.g., width, or height, or spacing, etc. In some cases, the additional SHG intensities collected along different angles may be used to improve the accuracy of the estimated value of a geometrical parameter of the devices.

There are a variety of ways to introduce additional detectors into the system. In one example, additional detectors are added as shown in FIG. 25. In FIG. 25, the detector 4201 is supplemented by additional detectors 4202 and 4203 that can be used to measure the SHG at additional angles (e.g., different angles of inclination) and/or different polarizations of SHG signal. The detectors may also be located at different azimuthal angles with respect to the sample and sample holder/sample stage. In some cases, an additional detector may include a polarizer 4220 having different polarization selection properties compared to one or more detectors in the SHG-OC system. In some cases, an additional detector may include a filter 4230 having different polarization selection properties compared to one or more detectors in the SHG-OC system.

Figure 26:
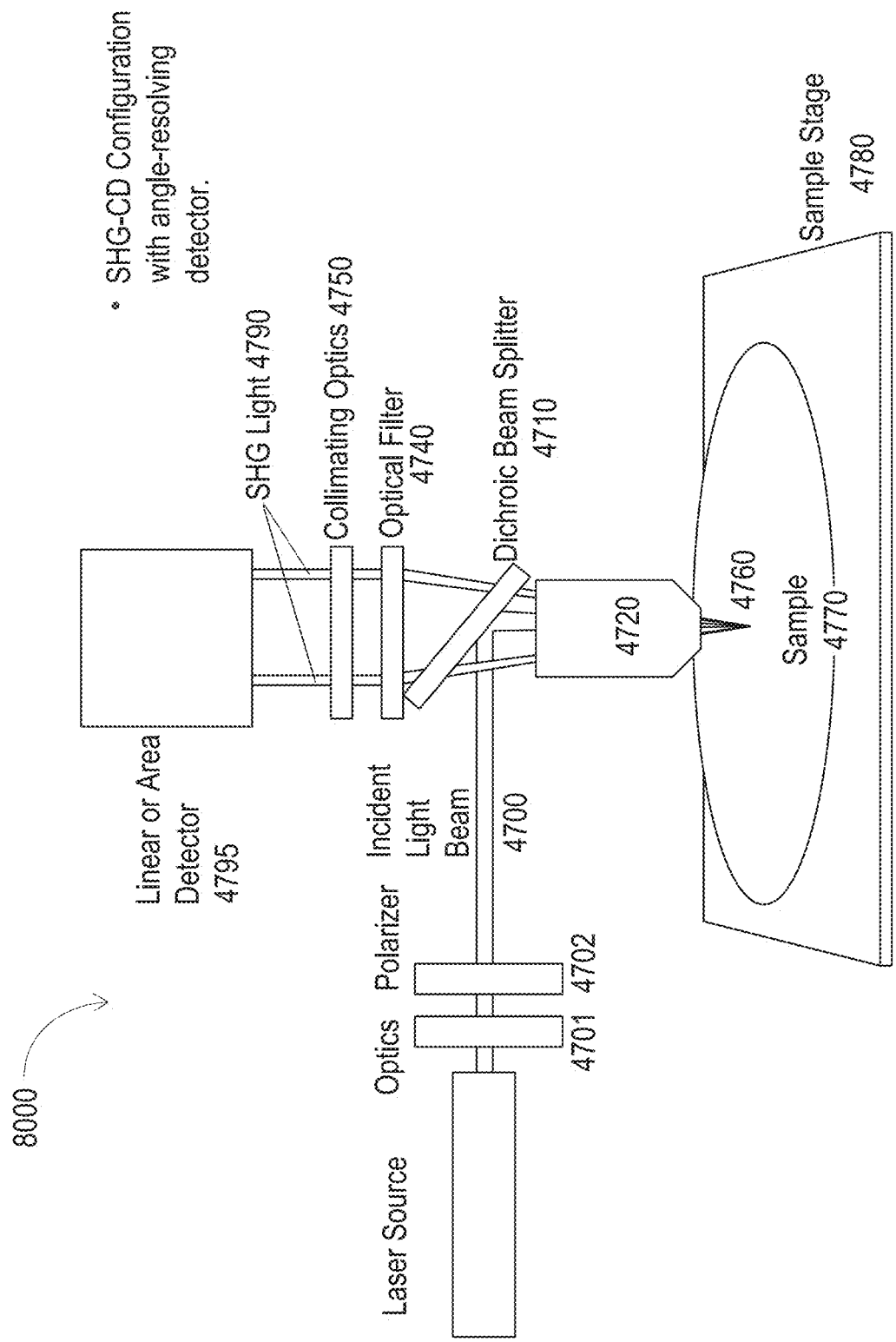
FIG. 26 illustrates an example SHG based sample characterization configuration system 8000 for determining critical dimension (SHG-CD) that uses a lens 4720 to perform angle-resolved measurements of the SHG signal generated by a sample under test. Different angles of inclination are mapped to different positions on a linear (1D) or area (2D) detector array. Accordingly, different SHG signal intensities measured at different pixels of the detector array may correspond to different angles of inclination of the measured SHG signal.

In some examples, the SHG signal may be detected with a detector array such as a linear or area detector which may allow capture of many angles of light simultaneously. FIG. 26 illustrates a SHG-CD system that includes at least one linear or area detector array 4795 for detecting SHG light emitted by the sample 4770 along different directions. In the example shown in FIG. 26, through-the-lens detection is used. In this configuration, the pulsed beam 4700 passes through optics 4701 and a polarizer 4702 and is then directed by a dichroic beam splitter 4710, through an objective lens 4720 placed above the sample 730 to illuminate a spot 4760 on the sample 4770, which sits on a stage 4780. The emitted SHG light 4790 is collected by the objective lens 4720 and passes through the dichroic beam splitter, an optical filter (e.g., spectral filter) 4740 and collimating optics 4750 onto the linear or area detector array 4795 (e.g., a 1D or 2D detector array). In some cases, light incident on the objective lens at different angles will be mapped onto different pixels of the detector array 4795. In some cases, SHG light collected from different angles of inclination can be simultaneously measured.

Figure 27:
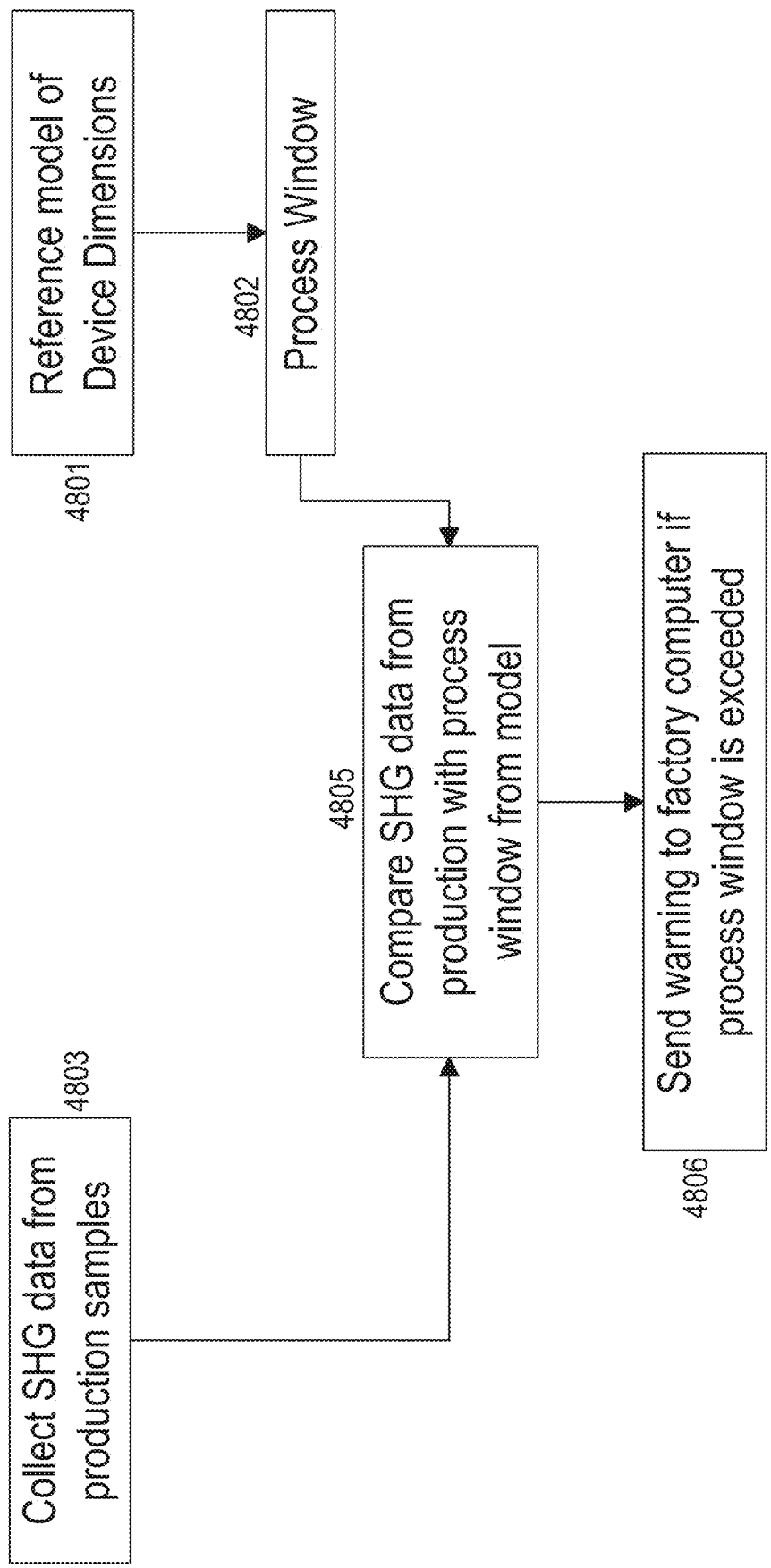
FIG. 27 illustrates an example Model-Based Metrology process. The data collected from the SHG measurement is compared to estimated results from a previously generated model to calculate the structure of a device or structural changes to a device. In some cases, the model may be generated from data of samples with known values of the corresponding parameters, computer models of SHG signal generated by structures with known designs (e.g., geometrical parameters), or models derived from machine learning methods. The metrology process may be used to flag issues with the semiconductor device or chip fabrication process that are resulting in deviations in the device parameters such as physical parameters (e.g., width, height, spacing, shape, etc.) that are outside certain tolerances.

In some implementations, SHG light may additionally or alternatively be used for production monitoring, e.g., by monitoring dimensional (e.g., height, width, etc.) or geometrical changes (e.g., shape) in devices produced during manufacturing. FIG. 27 illustrates an example process for using the SHG-CD system (e.g., the SHG-CD systems described above) in a production context. In various implementations, the SHG-CD system may be used for real-time monitoring of the samples as they are produced in a production line. In some such cases, the SHG-CD system may illuminate a sample after a selected production stage and determine one or more characteristics of the sample (e.g., geometrical and/or material characteristics) by measuring the corresponding SHG signal. In the example shown, the SHG signals may be monitored for changes that indicate a change in a dimension of a feature of the device being fabricated (e.g., compared to reference dimensions). In FIG. 27, the model 4801 may be used to create a process window 4802, against which the SHG signals 4803 collected from a sample are compared. In some examples, the signals may be monitored for changes that exceed the process window by software 4805. In some cases, the process window may comprise an upper bound and/or a lower bound for a geometric feature or a critical dimension. In some cases the upper bound and the lower bound may be may be stored in a memory of the system. When the signals exceed the process window, a warning may be sent to the factory computer or production line operator 4806 or otherwise directed. As discussed above, these SHG signals may correspond to separate SHG signals measured for different angles of inclination, azimuthal angles, polarizations, or any combination thereof.

In some implementations, the SHG-CD system may comprise a non-transitory memory configured to store data and machine executable instructions and a processor (e.g., a hardware processor, processing electronics, a microprocessor, and the like) configured to execute the machine-readable instructions to perform one or more processes associated with monitoring a sample that includes one or more device, using second harmonic generation methods described above. In some examples, the reference SHG model for a device included in the sample and a modeling software (e.g., an electromagnetic simulation software capable of modeling second harmonic generation) may be stored in the non-transitory memory as reference information and instructions respectively. The processor may execute the instructions using at least the reference information as input to calculate one or more expected second harmonic emission patterns associated with the device. In some cases, the processor may use one or more parameters of an incident beam of light used by the SHG-CD system for generation of SHG light, to calculate the expected emission pattern. In some examples, the parameters of the incident beam of light may be stored in the memory of the SHG-CD system (e.g., as a portion of reference information). In some examples, the processor may receive the parameters of the incident beam of light from a control system of the SHG-CD system that controls the incident beams that illuminate the sample. In various examples, reference information may comprise, values of one or more parameters used for determining a reference model, generating a look-up table, reference values associated with a process window, values of parameters associated with a detector, and the like.

In addition or in the alternative to calculating the reference SHG models using a non-linear electromagnetic modeling software 4630 or other theoretical modeling approaches, the characteristics of the second harmonic light (SHG signal) generated and emitted from a device may be determined experimentally and may be used to build a reference SHG model.

In some examples, the reference SHG model may be generated empirically by measuring the SHG signals from reference samples having known dimensions and/or material properties and creating a plot similar to the graph 4670 or another reference database (e.g., look-up tables or LUTs) that can subsequently be used by to determine characteristics (e.g., dimensions and/or material properties) of a new sample (e.g., a device in the sample) with unknown characteristics, using the measured second harmonic light generated by the new sample (e.g., by the device in the new sample).

In some cases, the geometrical features of a sample may be determined using a SHG signal generated by the sample (e.g., an integrated circuit) and based at least in part on a mapping of the SHG signal with geometrical features of the sample or one or more parts of the sample (e.g., a look-up table of SHG signal values and geometric features). In various, implementations the sample can be either completed or yet to be completed. In some cases, the mapping may be generated using empirical data, simulated data, or a combination thereof. In some cases, the mapping may be generated using a machine learning algorithms. In some cases, the mapping of the SHG signal with geometrical features of the sample, may comprise a mapping of the detected SHG signal with geometrical features the sample or one or more parts of the sample (e.g., a look-up table of the detected SHG signal values and geometric features). In some cases, the mapping may comprise a mapping of the detected SHG signals with geometric features of one or more structures on the sample at a stage in a fabrication process (e.g., the one or more structures may be completed or yet to be completed).

In some cases, the geometrical features of a sample may be determined using a change of a SHG signal generated by the sample (e.g., an integrated circuit) as a result of a change of a parameter (e.g., polarization, angle of incidence, intensity, and/or wavelength) of an incident light beam that generates the SHG signal. In these cases, the geometrical feature may be determined based on a mapping of the change of the SHG signal with geometrical features the sample or one or more parts of the sample (e.g., a look-up table of change of the SHG signal values and geometric features). In various, implementations the sample can be either completed or yet to be completed. In some cases, the mapping may be generated using empirical data, simulated data, or a combination thereof. In some cases, the mapping may be generated using a machine learning algorithms. In some cases, the mapping of the changes of the SHG signal with geometrical features of the sample, may comprise a mapping of the changes of the detected SHG signal with geometrical features of the sample or one or more parts of the sample (e.g., a look-up table of the changes of the detected SHG signal values and geometric features).

In some examples, a reference SHG model can be generated using machine learning algorithms, including supervised learning algorithms, unsupervised learning algorithms, semi-supervised learning algorithms, or reinforcement learning. In these examples, the machine learning techniques may use physical measurements and/or computer modeling, or a combination thereof, to generate the reference SHG model. In some cases, the reference SHG model may include a mapping of SHG signals and/or detected SHG signals with characteristics of the sample (e.g., geometrical features, material structure, critical dimensions, and the like). In various implementations, a machine learning algorithm used to generate the mapping may include: linear regression, logistic regression, decision tree, SVM (Support Vector Machine) algorithm, Naive Bayes algorithm, KNN (K-Nearest Neighbors) algorithm, K-means algorithm, Random Forest algorithm, dimensionality reduction algorithm, gradient boosting algorithm, or AdaBoosting algorithm.

In some examples, a processor of the SHG-CD system or a separate computing system may be used to generate the reference SHG model using machine learning techniques and a series of specified measurements performed on a plurality of reference devices with known characteristic. In some cases, a processor of the SHG-CD system or a separate computing system may be used to generate the reference SHG model using unsupervised machine learning techniques as the system is used for in-line monitoring samples produced in a production line.

In some examples, the angular distribution of the SHG emission from the sample may be used to refine the dimensional measurements. For example, separate SHG signals collected from at least two angles (angles of inclination and/or azimuthal angles) may be used.

In some examples, the polarization of the source or a polarizer used in a detector or in an optical path between the sample and the detector may be varied to generate incident beams with different polarizations or selectively detect SHG light having a specific polarization. In some cases, separate SHG signals collected for at least two polarizations may be used to refine the dimensional measurements.

In some examples, separate SHG signals can be collected for at least two different incident light beams having different wavelengths. For example, at least two separate light sources, e.g., laser, having separate central wavelengths may be directed onto the sample resulting in different SHG signals having different wavelengths that are collected by different detectors (e.g., detectors having different filters or different filters in a an optical path from the sample to the detectors). In some cases, the separate SHG signals may be used in the analysis of the device under test (e.g., to refine the dimensional measurements). Other configurations are possible. For example, a broadband light source may be used to generate a broadband incident light and several detectors, a detector array, or a spectrometer may be used to detect and analyze the resulting SHG light. In some cases, a light source may comprise a tunable wavelength laser source. In some cases, a single light source may be used to generate two light beams having two different wavelengths at the same time, or a light beam having different wavelengths at different times.

In some examples, a SHG-CD system may use at least two detected SHG signals that differ in at least one parameter to determine a geometric feature of the sample or a variation in a geometric feature of the sample. The at least one parameter can be associated with generation and/or detection of the corresponding SHG signals that respectively generates one of the detected SHG signals upon detection. In some cases, the at least one parameter may comprise a parameter associated with the incident light beams that generate the SHG signals. For example, the incident light beams may have different wavelengths, azimuthal angle, polarizations (e.g., linear or circular polarizations), intensities, angles of incidence (e.g., with respect to the sample), and the like. In some cases, the incident light beams may have different polarization parameters. In some cases, the at least one parameter may comprise a parameter associated with the SHG signals that are detected. For example, the SHG signals may propagate along different directions (e.g., with respect to the sample), have different polarization, or different wavelengths, and the like. Accordingly, in some cases, the at least one parameter may comprise a parameter associated with the light beam from the sample to the detectors. In various implementations, polarizers, filters, or other optical components may be included in the optical path between the sample and the detector(s), for example, to select a polarization, wavelength, angle, etc. In some cases, the at least one parameter may comprise a parameter associated with the detectors used to detect the SHG signals and generate the detected SHG signals. For example, the detectors may have different angles of inclination (e.g., with respect to the sample), different polarizers, different filters, different azimuthal angles, different angles out of plane with respect to the sample, different angles in-plane, and the like. In some cases, an angle in plane may comprise an angle in a plane formed by the incident light beam and an axis perpendicular to the sample. In some cases, an angle out of the plane may comprise an angle in a plane different from (e.g., not parallel to) the plane formed by the incident light beam and an axis perpendicular to the sample. In some implementations, the SHG-CD system can change the parameter (e.g., polarization, wavelength, angle, etc.) of a beam of the incident beams and/or SHG signal and/or the detectors over time to obtain different SHG signals and/or detected SHG signals for different parameters.

In some implementations, a SHG-CD system may use at least one optical source and one detector to generate at least two detected SHG signals that differ in at least one parameter to determine a geometric feature of the sample or a variation in a geometric feature of the sample. The at least one parameter can be associated with generation and/or detection of the corresponding SHG signals that respectively results in one of the detected SHG signals upon detection. In some cases, the at least two detected SHG signals may be produced at different times. In some such cases, the at least one parameter may have a first value at a first time and a second value at a second time after the first time resulting in generation of two different detected SHG signals. In some cases, the at least one parameter may comprise a parameter associated with one incident light beam that generate the SHG signals. For example, the parameter may comprise the wavelength, azimuthal angle, polarizations (e.g., linear or circular polarizations), intensities, angles of incidence (e.g., with respect to the sample), and the like. In some cases, the parameter may comprise a polarization parameters of polarized light (e.g., linearly or circularly polarized light). In some cases, the at least one parameter may comprise a parameter associated with the SHG signals that are detected. For example, the parameter may comprise the direction of propagation of SHG signals directions (e.g., with respect to the sample), polarization, wavelength, and the like. In some cases, the at least one parameter may comprise a parameter associated with the detector used to detect the SHG signals and generate the detected SHG signals. For example, the parameter may comprise the position of the detector, angle of inclination (e.g., with respect to the sample), detection wavelength of a detector, pass band of a filter, azimuthal angle, angles out of plane with respect to the sample, different angles in-plane with respect to the sample, and the like. In some cases, an angle in plane with the sample may comprise an angle in a plane formed by the incident light beam and an axis perpendicular to the sample. In some cases, an angle out of the plane with the sample may comprise an angle in a plane different from (e.g., not parallel to) the plane formed by the incident light beam and an axis perpendicular to the sample.

In some examples, the results of the SHG dimensional metrology measurement are used for process monitoring. For example, the SHG-CD system (or the monitoring method described above) may be used to estimate a characteristic of samples produced by a process at a production stage. In some such examples, the SHG-CD system may be used for in-line and real time process monitoring (e.g., the SHG-CD system may be included in the in-line in a fabrication system, e.g., semiconductor fabrication system, as an in-line metrology tool). In some examples, the SHG-CD system (or the monitoring method described above) may be used for off-line monitoring of selected (e.g., randomly selected) samples. Accordingly, in various implementations, the SHG-CD dimensional metrology systems comprises a production or process monitor for dimensional or geometric changes in devices during manufacturing.

Figure 28:
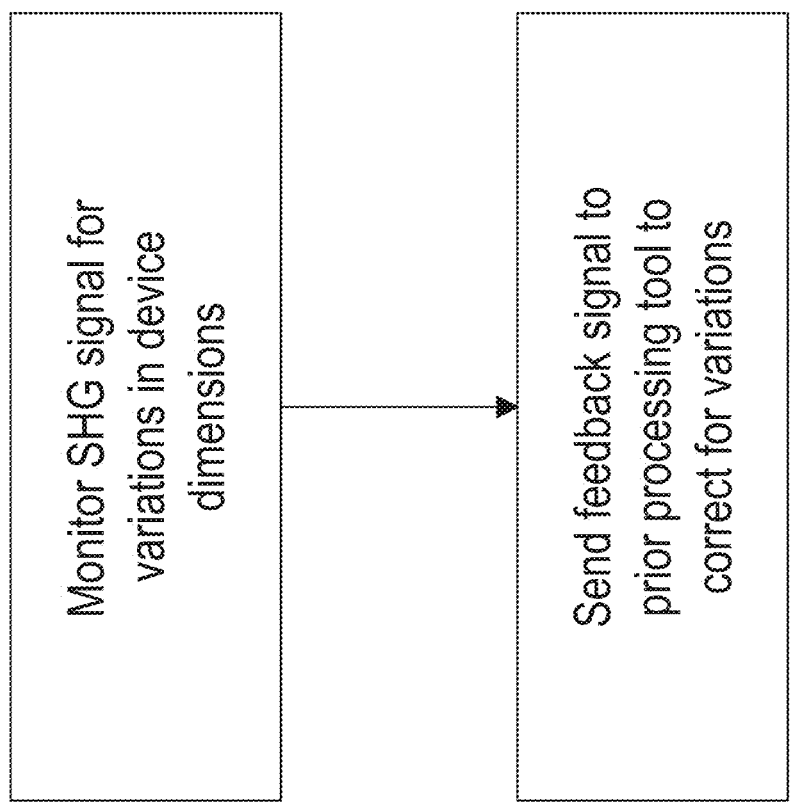
FIG. 28 illustrates an example feedback process used to adjust at least a portion of a semiconductor device or chip fabrication process. In this example, the SHG signal may be used to provide feedback signals to a prior processing tool upstream in the fabrication line to make corrections for observed or detected variations in device measurements (e.g., measurements associated with a geometrical device parameter).
Figure 29:
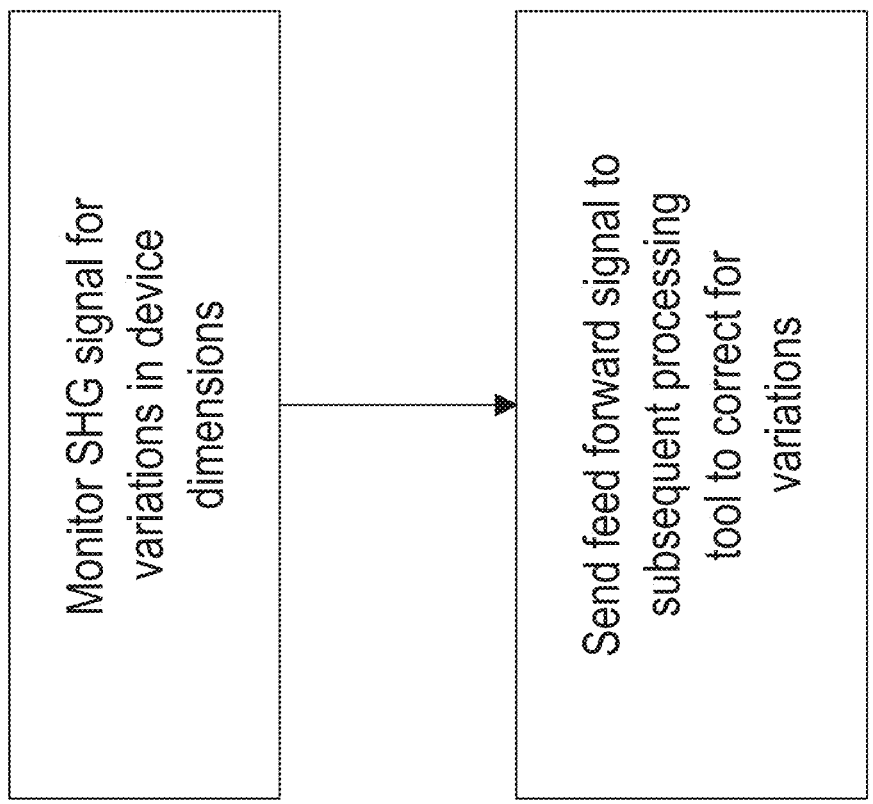
FIG. 29 illustrates an example feed forward process used to adjust at least a portion of a semiconductor device or chip fabrication process. In this example, the SHG signal may be used to provide feed forward signals to a downstream or subsequent processing tool to correct for observed or detected variations in device measurements (e.g., measurements associated with a geometrical device parameter).

In another example, the results of the SHG dimensional measurement may be used as process feedback or feedforward to make corrections to the process as needed, as shown in FIGS. 28 and 29, respectively. In some example processes such as shown in FIG. 28, the SHG-CD system (or the sample monitoring methods described herein), may be used to determine a change in a characteristic (e.g., a dimensional feature) of samples after a process is performed in a selected stage of a production line and may generate one or more feedback signals based at least in part on the determined characteristic to adjust one or more parameters of the process. In some cases, the one or more feedback signals may be usable to improve the process such that the characteristic of a sample produced by the selected stage after applying the feedback signal is closer to a reference characteristic (e.g., characteristic of a reference device), compared to the sample produced before applying the feedback signal.

In some example processes such as shown in FIG. 29, the SHG-CD system or the monitoring method described herein, may be used to determine a change in a characteristic of samples before a process performed in a selected stage of a production line and generate one or more feedforward signals based at least in part on the determined characteristic to adjust one or more parameters of the process. In some cases, the one or more feedforward signals may be usable to improve the process such that a determined characteristic of sample produced by the selected stage after applying the feedforward signal is closer to a reference characteristic (e.g., characteristic of a reference device), compared to the sample produced before applying the feedforward signal. In some cases, a feedforward signal may be used to adjust the process to correct for the determined change in the characteristic.

In some examples, the SHG-CD system may determine an unplanned variation in a geometric feature of a sample by measuring the sample (using SHG signals) and generate a feedback signal (or a feedforward signal) configured to adjust a processing tool in a production line to reduce or eliminate the unplanned variation in subsequently produced samples (or correct the unplanned variation detected in the measured sample). In some cases, SHG-CD system may generate a signal or data indicative if the unplanned variation is identified and transmit the signal or data to a user interface of the SHG-CD where a user can observe and evaluate the detected unplanned variation or a computing system in communication with the SHG-CD.

In some example implementations, the results of the SHG dimensional measurement(s) may be used in combination with results obtained from one or more other systems such as other testing and/or metrology systems (e.g., an optical critical dimension system also referred to as OCD system) to determine a geometric feature or variation in geometric feature. The results from the SHG-CD system as well as the results of the OCD system may, for example, be received by the one or more processor, which determines a geometric feature or change thereof based on input from the SHG system and OCD system. One or more other systems in alternative to or in addition to the OCD system can also be used.

In some implementations, one or more processors and/or processing electronics are used such as described herein to determine geometric features or changes in geometric features of one or more device or part of one or more devices that are completed or partially completed based on one or more SHG signals.

In various implementations, an optical metrology system such as a SHG-CD system (e.g., the SHG-CD system 4000, 6000, or 8000) may be controlled by a control system. In some cases, the control system may be configured to control a parameter of a beam of light (e.g., an angle of incidence, polarization, wavelength, intensity, divergence and the like) incident on the sample. In some cases, the control system may be configured to control a parameter of a detector module of the SHG-CD system (e.g., photodetector gain, polarization and/or wavelength of light received by the photodetector, and the like.). In some cases, the control may be part of the SHG-CD system. In some such cases, the control system may comprise a non-transitory memory and at least a processor or processing electronics. In some cases, the SHG-CD system may comprise a computing system configured to perform calculations and simulations to generate a characteristic of a device monitored by the SHG-CD system using at least one SHG signal generated by a detector. In some cases, the computing system may be in communication with the control system, the detector, and/or the light source. In some cases, the computing system may comprise a non-transitory memory configured to store data and machine executable instructions and a processor configured to execute the machine-readable instructions to perform one or more processes associated with sample monitoring, using the at least one SHG signal.

In some cases, the control system may comprise a programmable controller (e.g., a field programmable gate array). In some cases, the computing system and/or the control system can be separate from the SHG-CD system but communicate with an interface of the SHG-CD system via a wired or wireless link. In some cases, a computing system may comprise the controlling system. For example, instructions stored in a memory of the computing system may comprise instructions for controlling the SHG-CD system and instructions associated with an electromagnetic simulation software.

In some cases, the control system may control one or more parameters associated with a detected SHG signal. For example, the control system may vary a parameter of the optical source that generates an incident light beam, a parameter of the light beam after being emitted by the light source and before it becomes incident on a sample, a parameter of a SHG signal generated by the sample, or a parameter of a detector that detects the SHG signal and generates the detected SHG signal.

In some implementations, an SHG-CD may be used to monitor a fabrication process without determining a feature (e.g., geometric feature, a material property, or a critical dimension) of a sample (or a partly or completely formed device included in the sample) fabricated by the fabrication process. For example, a SHG-CD system may compare one or more detected SHG signals received from a first sample produced by a fabrication step in the fabrication process and one or more SHG signals received from a second sample produced by the same fabrication step after processing the first sample, to detect a change in the fabrication step. In this example, a difference between a SHG signal (and therefore the detected SHG signal) received from the first sample and the second samples may indicate a change in the fabrication step after the fabrication step is preformed on the first sample. In some cases, a difference between the modified or processed detected SHG signals received from the first sample and the second sample may indicate a change in the fabrication step after the fabrication step is preformed on the first sample. Similarly, the SHG signal of a sample may be compared to one or more references, e.g., a reference database, one or more reference values, or one or more reference signals without determining a feature (e.g., geometric feature, a material property, or a critical dimension) of a sample (or a partly or completely formed device included in the sample) fabricated by the fabrication process. Accordingly, in some cases, a modified or processed detected SHG signal may be generated by a processing system of the SHG-CD without determining, e.g., quantifying from the detected SHG signal the geometric characteristics (e.g., size, shape etc.) of the feature(s) of the sample controlling the intensity of said SHG signal. In some cases, the first and the second samples may be measured using multiple incident beams and based on multiple SHG signals generated by the incident beams. In these cases, changes in different detected SHG signals or a relative change between two detected SHG signals may indicate a change in the fabrication step. In some implementations, a comparison with detected SHG signals (modified or not) from the first sample can be made with detected SHG signals (modified or not) from the second signal. In some implementations, detected SHG signals (modified or not) from one or more samples can be compared to one or more references, e.g., a reference database, one or more reference values, or one or more reference signals.

Accordingly, in some cases, SHG-CD system may use a change in one or more detected SHG signals (or modified SHG signals) received from a fabricated sample, to detect a change in the corresponding fabrication process without determining a feature (e.g., geometric feature, a material property, or a critical dimension) of the sample. In some such cases, the SHG-CD may generate a feedback signal to modify a previous fabrication step in the fabrication process performed on the sample before detecting the change, or a feedforward signal to modify next a fabrication step that will be performed on the sample after detecting the change.

Likewise, in some implementations, a SHG-CD system may compare one or more detected SHG signals received from a sample produced by a fabrication process, with a reference (e.g., a value or range of values from a look up table) to detect a change in a fabrication step of the fabrication process without determining a feature (e.g., geometric feature, a material property, or a critical dimension) of the sample.

ADDITIONAL EXAMPLES

Disclosed herein are additional examples and implementations of the systems and methods disclosed herein.

In some cases, the SHG-CD (or the sample monitoring methods described herein), may be used to monitor dimensional features of an integrated circuit, a portion of an integrated circuit, or a type of device fabricated on the integrated circuit.

In various implementations, dimensional/geometrical features may include dimensional/geometrical features of a finFET, aGAA, aTri-gate, and the other electronic or photonic devices.

In some cases, the dimensional/geometrical features may include dimensional/geometrical features for a building block of device of a digital circuit (e.g., a NAND gate).

In some implementations, a SHG-CD may comprise a through-the-lens imaging system, an optical system based on using a solid-immersion lens (SIL), or an angle-resolved imaging system. In some cases, a SHG-CD system may use a solid immersion lens (SIL) may provide higher magnification, higher spatial resolution, and/or higher numerical aperture than a conventional lens by filling object space between the sample and the objective lens. In some cases, and SIL, may be positioned below the front lens of a microscope objective. In some cases, a SIL may comprise a hemisphere with flat bottom, a supersphere (Weierstrass) with flat bottom, a hemisphere with conical tip, a supersphere with conical tip, a hemispherical SIL with a conical dielectric probe, or a diffraction-based SIL. In some examples, a SHG-CD system may use a through-the-lens imaging system to measure the intensity of light beams received from the sample (e.g., SHG signals) through the same lens used to image the sample. In some examples, a SHG-CD system may use an angle-resolved imaging system to capture an image of the sample where using a photodetector array (e.g., 1D or 2D) comprising a plurality of pixels where each pixel in the captured image corresponds to a unique emission direction from the sample. In some cases, the image may be transformed into a polar coordinate system for displaying the angular distribution of light emitted or reflected by the sample.

In various implementations, the SHG-CD system may be configured to collect SHG light emitted by a sample at different scattering angles, in-plane (e.g., a plane formed by the incident beam and a reflection of the incident beam off of the sample surface), and out-of-plane detection angles.

In some cases, the SHG-CD system may vary the incident angle of the incident beam, e.g., to measure the dimensional/geometrical features of a device. In some cases, the SHG-CD system may rotate the sample being monitored, e.g., to measure the dimensional/geometrical features of one or more devices on the sample.

In some cases, the light beam incident on the sample may be varied. For example, multiple wavelengths may be provide in series, e.g., different wavelengths at different times. Multiple wavelengths may also be provide to together, e.g., at the same time, in some implementations. In some designs, the light source comprises a broad-band light source. In various of these configurations, the wavelength of light is varied to produce different SHG signals for different wavelengths incident on the sample.

In some cases, a sample may be charged before measuring the SHG signal (pre-charging). Such charging may be provide for example by a corona gun. Light may also be used to induce charging. In some configurations, such as described above, a pump and probe arrangement wherein pump and probe sources are used to provide charging together with an SHG beam to interrogate the sample.

In various implementations, the SHG system analyzes the SHG signal, e.g., data obtained from the SHG signal and provides feedback (or feedforward) based on this analysis. As discussed herein, the SHG signal or data obtained therefrom can be compared with look-up tables. The SHG systems and methods describe herein may comprises model-based metrology. For example, the SHG signal (modified or not) may be compared with reference data provided by a model, e.g., a model may be used with simulation software to produce reference data to which the detected SHG signal (modified or otherwise) is compared. Also, as discussed herein, artificial intelligence may be used to in connection with analyzing data obtained from the SHG signal.

In some cases, the SHG-CD system may use SHG light to detect electrical defects in a sample. In some cases, the SHG-CD system may use the SHG light to detect a change of strain in the sample. In some implementations, the SHG system may combine detected dimensional changes with detected strain changes or electrical defects, for example, to evaluate a process used in the production of the sample.

In certain implementations, the SHG-CD system is used in combination with other metrology instruments such as other optical metrology instruments such as optical scatterometry also known as OCD. In some example implementations, the results of the SHG dimensional measurement(s) are used in combination with results of one or more other systems such as other testing and/or metrology systems such as for example OCD to determine a geometric feature or variation in geometric feature. The results from the SHG system and well as the results of an OCD system may, for example, be received by the one or more processor, which determines a geometric feature or change thereof based on input from the SHG system and OCD system. One or more other systems in alternative to or in addition to the OCD system can also be used. In some configurations, an optical scatterometry system can be included with a SHG-CD system in a single tool that can perform both measurements. In some implementations, a reference model that incorporates both OCD and SHG-CD measurements can be used. For example, as discussed above, signals from these instruments (e.g., OCD and SHG-CD) can be compared with references from a reference model to determine geometric features such as dimensions or shapes or changes in geometric features.

In some cases, the SHG-CD system or a separate system may control an amount of charge on the surface of the sample being monitored (e.g., using a corona gun, or capacitive coupling). In some cases, the amount of charge on the surface of the sample being monitored may be controlled to enhance or change an SHG signal. In these cases, the SHG-CD system (e.g., a controller or a processor of the SHG-CD system) may vary the amount of electric charge disposed on the sample using an electric sensor and by controlling a corona discharge applied on the sample (e.g., using a corona gun), and determine a characteristic of one or more SHG signals for the different amounts of electrical charge. In various implementations, the amount of charges deposited on the sample can be determined, by measuring the current induced by the charges deposited on the surface of the sample using an electrical meter (e.g., an electrometer or an ammeter) disposed between the sample and an electrical.

In some cases, a sample (e.g., the monitored surface of the sample) may be charged before measuring the SHG signal (pre-charging).

In some cases, the SHG-CD system may illuminate the area of the sample illuminated by first and second (e.g. beams of) light or sources of light. In some cases, the first (e.g., beam of) light may be used to generate SHG light and the second (e.g., beam of) light may control or probe the generation of SHG light.

Various methods and configurations that may be used to characterize a sample by controlling charge density on a sample, or using additional light (pump-probe technique), are described above. In these configurations, the SHG-CD may include at least one optical source for generating a probing radiation and at least one optical source for generating pumping radiation.

In some cases, the SHG-CD system may use SHG light to detect electrical defects in a sample. In some cases, the SHG-CD system may use the SHG light to detect a change of strain in the sample. In some implementations, the SHG system may combine detected dimensional changes with detected strain changes or electrical defects to evaluate a process used in the production of the sample, generate a feedback signal for adjusting one or more parameters of the process, and/or generating a feedforward signal to adjust a parameter of a subsequent process.

In various implementations, the SHG-CD systems (e.g., SHG-CD system 4000, 6000, or 8000), may comprise use one or methods, configurations, or tools described above with respect to FIG. 1 to FIG. 19.

In some implementations, a SHG-CD system (e.g., SHG-CD system 4000, 6000, or 8000), may comprise multiple light sources generating respective light beams having respective different wavelengths. The system may illuminate a device by multiple light beams and the device may generate one or more SHG signals. The generated light beams may be received by one or more detectors that generate detected signals usable for determining a critical dimension of the device. In some cases, different filters may be used along the optical paths to different detectors such that respective detectors generate detected signals associated with respective wavelengths transmitted through the corresponding filter. Alternatively, the one or more generated light beams may be directed to a spectrometer that measures the intensity of generated SHG signals (SHG light) having different frequencies. In some cases, the SHG spectral measurement results or signals generated by the optical spectrometer may be used to determine a critical dimension of the device.

In some implementations, in addition or alternative to detectors a SHG-CD system (e.g., SHG-CD system 4000, 6000, or 8000), may comprise at least one spectrometer configured to receive SHG signals having different frequencies from a sample and measure the intensities or ratios between intensities of different SHG signals. In some cases, the spectral properties of the SHG signals may be used to determine characteristics (e.g., geometrical features, material structure, critical dimensions) of the sample.

In some implementations, the SHG-CD may be in communication (e.g., wired or wireless communication) with an optical scatterometry system (e.g., OCD system). In some cases, a processor of a computing system (e.g., a computing system of the SHG-CD or the OCD system, or a separate computing system), may receive measurement data or evaluation data (e.g., detected dimensions, materials, defects, process evaluation data and the like) from the SHG-CD and the OCD systems. In some such cases, the computing system may combine the measurement or evaluation data received from the SHG-CD and OCD systems to generate an evaluation report, or to generate feedback and/or feedforward signals for controlling a process in the corresponding production line. In some cases, the SHG-CD system and the OCD system may be combined as a single tool. In some such cases, the SHG-CD system and the OCD system may be integrated in the same enclosure and may potentially share one or more optical or electronic components used for monitoring a sample. In some cases, a single control system may control both the SHG-CD system and the OCD system. In some cases, a reference SHG model (e.g., an empirical reference model) used by the SHG-CD system may be created using measurement results obtained from both OCD and SHG-CD systems, or may incorporate both OCD and SHG-CD measurements.

Figure 30B:
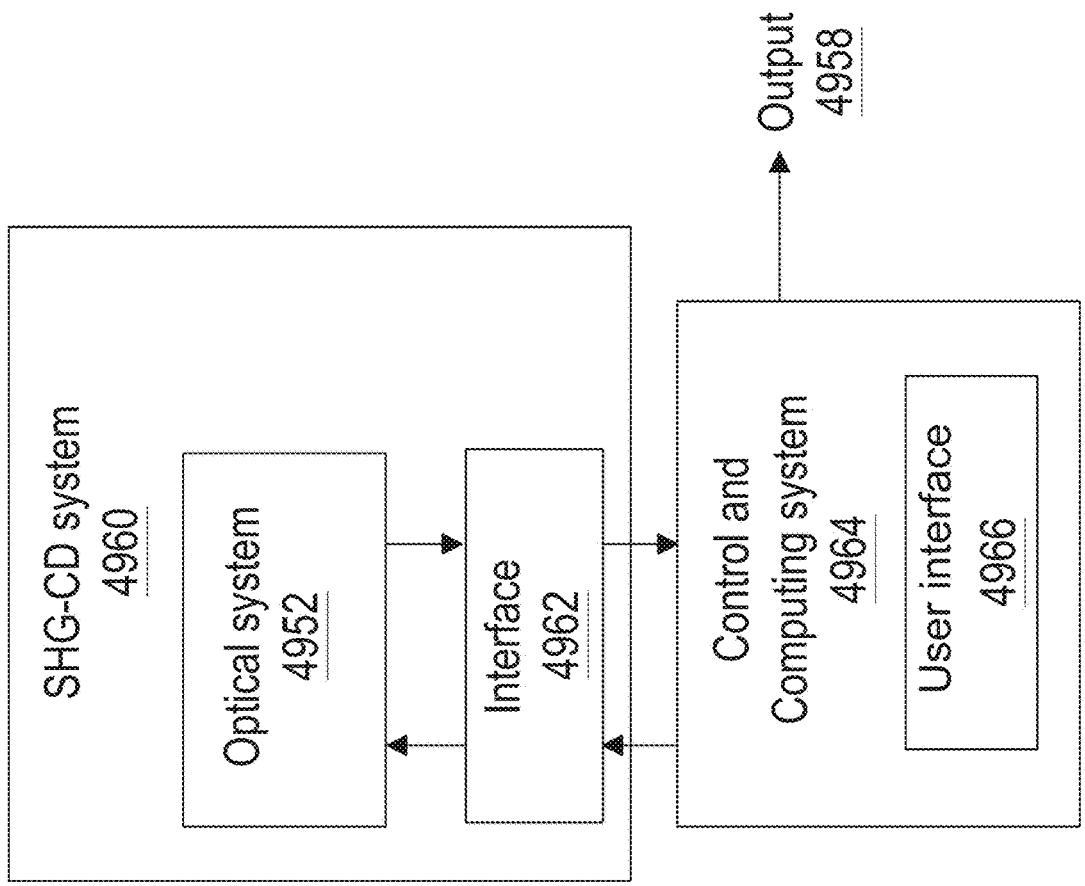
FIG. 30B is a block diagram illustrating another example SHG-CD system 4960 that includes an optical system 4952 and an interface 4962 that is in communication with the optical system 4952.
Figure 30A:
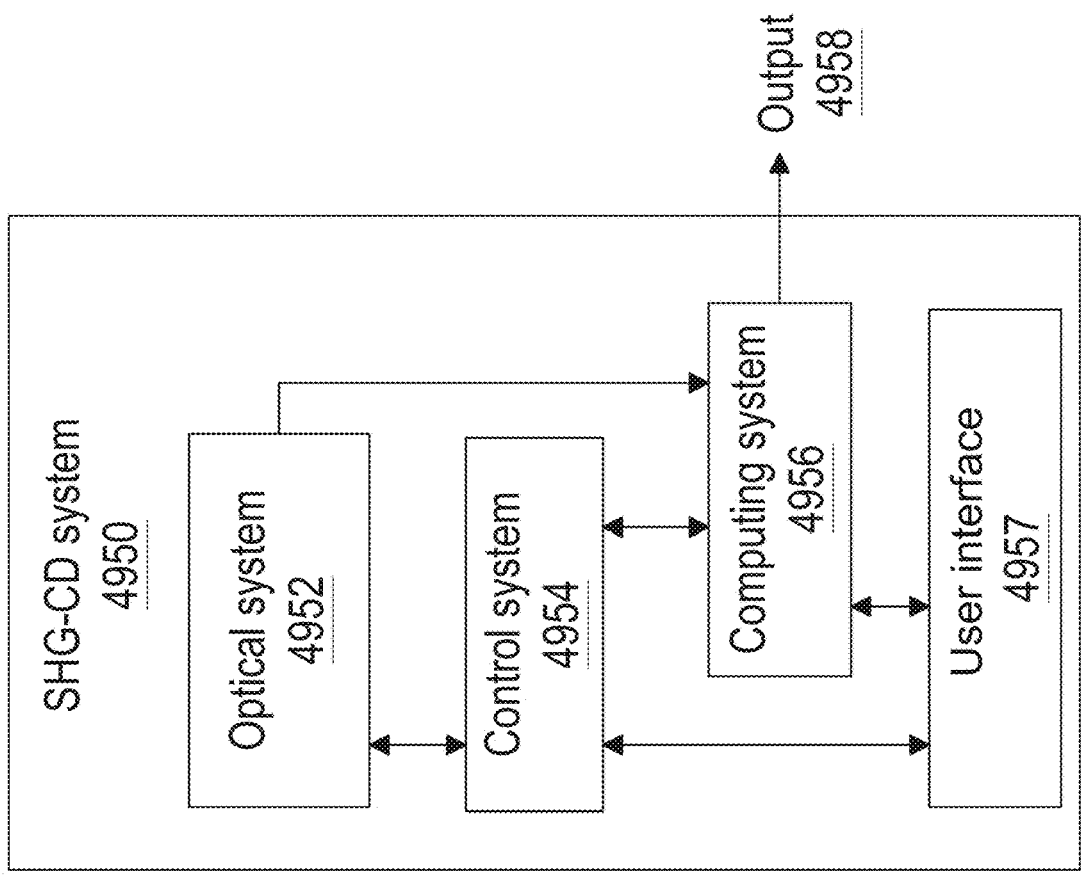
FIG. 30A is a block diagram illustrating an example SHG-CD system 4950 that includes an optical system 4952, a control system 4954, and a computing system 4956.

FIG. 30A is a block diagram illustrating an example SHG-CD system 4950 that includes an optical system 4952, a control system 4954, and a computing system 4956. In some examples, the optical system 4952 may comprise one or more optical sources configured to generates one or more primary optical beams incident on the sample, one or more detectors configured to receive one or more secondary optical beams reflected, scattered, or generated by the sample, and one or more optical, mechanical, and optomechanical components configured to manipulate (e.g., control the polarization, filter, redirect, control the divergence, and the like), the primary and the secondary optical beams. In some examples, the optical system 4952 may include at least one mechanical stage configured to control the position and orientation of the sample with respect to the optical sources and detectors. In some cases, the control system 4954 may be configured to control the optical system 4952 according to instructions and/or data stored in a memory of the control system 4952, instructions and/or data received from the computing system 4956, or the user interface 4957. In some cases, the computing system 4956 may be configured to simulate second harmonic generation by the sample using one or more models (e.g., reference models, device models, and the like) and data received from the control system 4954 (e.g., data associated with the incident optical beams). In some examples, the computing system 4956 may be configured to determine a change in SHG signal, a characteristic of the sample (e.g., a geometrical parameter and/or material properties) or a change in a characteristic of the sample using the simulated data (e.g., data associated with simulated SHG light emission) and data received from the optical system 4952 (e.g., measurement data associated with SHG light received from the sample). In some examples, the models may be stored in a memory of the computing system 4956 or received from the user interface 4957. In some cases, the user interface may comprise an input interface (e.g., a keyboard, mouse, touchscreen, touchpad etc.) for receiving data and instructions from a user, and an output interface (e.g., a display) to present measurement data, evaluation outcomes, images, graphs, data/instructions stored in the computing system 4956 and/or the control system 4954 to the user.

FIG. 30B is a block diagram illustrate another example SHG-CD system 4960 that includes an optical system 4952 and an interface 4962 that is in communication with the optical system 4952. In some cases, the interface 4962 may be configured to receive instructions and data from a control and computing system 4964 separate from the SHG-CD system 4960, and generate one or more control signals based on the received data and instructions. The interface 4962 may be further configured to transmit data received from the optical system 4952 (e.g., measurement data and/or data associated with a configuration of the optical system 4952), to the control and computing system 4964. The control and computing system 4964 may include a user interface 4966. In some cases, the user interface 4966 may comprise an input interface (e.g., a keyboard, mouse, touchscreen, touchpad etc.) for receiving data and instructions from a user, and an output interface (e.g., a display) to present measurement data, evaluation outcomes, images, graphs, data/instructions stored in or received by the control and computing system 4964 to the user. In some cases, the control and computing system 4964 may comprise a desktop computer, a laptop, or other electronic devices.

In some cases, the computing system 4954 and the control and computing system 4964 may include at least one hardware processor and at least one non-transitory memory in communication with the hardware processor. In some implementations the hardware processor may execute computer-executable instructions stored in the non-transitory memory to: calculate an expected SHG signal, expected SHG light emission pattern, or expected signal generated by a detector of the optical system 4952, generate control signals (e.g., for controlling the optical sources, detectors, and/or optical beams of the optical system 4952), to compared an expected SHG emission with a measured SHG emission, to determine geometrical and material properties of a sample (or a device in a sample), generate graphical data associated with measured or expected SHG emission or any combination of these, or preform other tasks.

In some cases, the optical metrological system may comprise a corona discharge source (e.g., a corona gun) that can provide different amounts of electric charge to the sample and an electrical sensor configured to measure an amount of electric charge provided to the sample. The optical metrological system may use the electrical sensor and the discharge source to measure and possibly control the amount of electric charge disposed on the sample (e.g., using a hardware processor or a control system) In some such cases, the system may use the electrical sensor and the discharge source to provide variable amount of electric charge to the sample and determine a variation in detected SHG signal, a geometric feature of the sample or the variation in the geometric feature of the sample based on the determined characteristic of the detected SHG signal for different amounts of electric charge.

It should be understood the optical metrological systems (e.g., systems for measuring, monitoring, and charactering critical dimensions of a sample) that monitor a sample (e.g., in a production line) based on SHG effects are not limited to those described above (e.g., they may include less components, different configurations, additional features and/or components, alternative features and/or components).

EXAMPLES

Group 1

Some additional nonlimiting examples of embodiments discussed above are provided below. These should not be read as limiting the breadth of the disclosure in any way.

Example 1: A system for characterizing a sample using second harmonic generation, the system comprising:
a sample holder configured to support a sample;
at least one optical source configured to direct a light beam onto said sample to produce second harmonic generation (SHG) signals;
an optical detection system comprising at least one optical detector configured to receive the SHG signals emitted from said sample and generate detected SHG signals;
one or more hardware processors in communication with the optical detection system, the one or more hardware processors configured to:
receive at least one detected SHG signal; and
determine a geometric feature of the sample or a variation in a geometric feature of the sample based on the at least one detected SHG signal.

Example 2: The system of Example 1, wherein the geometric feature of the sample is determined at least in part based on a mapping of the detected SHG signals with geometric features of one or more structures on the sample that are either completed or yet to be completed.

Example 3: The system of Example 1, wherein the one or more hardware processors receives the at least one detected SHG signal after a first fabrication step performed on the sample.

Example 4: The system of Example 3, wherein the system is included in-line in a fabrication system.

Example 5: The system of Example 4, wherein the first fabrication step is a step in a fabrication process performed by the fabrication system.

Example 6: The system of any of the examples above, wherein the one or more hardware processors are configured to:
identify an unplanned variation in a geometric feature of the sample; and
output an indication of the unplanned variation.

Example 7: The system of Example 6, wherein the one or more hardware processors are configured to output an indication of the unplanned variation to a sample processing tool in the fabrication system to adjust the unplanned variation in the sample.

Example 8: The system of Example 7, wherein the one or more hardware processors are configured to output the indication of the unplanned variation to a sample processing tool used for performing a second fabrication step on the sample after the first fabrication step, to adjust the unplanned variation in the sample.

Example 9: The system of Example 6, wherein the one or more hardware processors are configured to output an indication of the unplanned variation to a user via a user interface of the system.

Example 10: The system of any of the examples above, wherein said geometric feature comprises a dimension for one or more devices or one or more parts of devices that are either completed or yet to be completed.

Example 11: The system of any of the examples above, wherein said geometric feature comprises a critical dimension for one or more devices or part of one or more devices that are either completed or yet to be completed.

Example 12: The system of any of the examples above, wherein said geometric feature comprises a shape of one or more devices or part of one or more devices that are either completed or yet to be completed.

Example 13: The system of any of the examples above, wherein said geometric feature comprises a lateral dimension comprising a width or length for one or more devices or part of one or more devices that are either completed or yet to be completed.

Example 14: The system of any of the examples above, wherein said geometric feature comprises a height for one or more devices or part of one or more devices that are either completed or yet to be completed.

Example 15: The system of any of the examples above, wherein said geometric feature comprises a lateral spacing between a plurality of devices or a plurality of parts of devices that are either completed or yet to be completed.

Example 16: The system of any of the examples above, wherein said geometric feature comprises a tilt or slope of one or more devices or part of one or more devices that are either completed or yet to be completed.

Example 17: The system of any of the examples above, wherein said geometric feature comprises a sidewall tilt or slope of for one or more devices or part of one or more devices that are either completed or yet to be completed.

Example 18: The system of any of the examples above, wherein said at least one detected SHG signal comprises first and second detected SHG signals measured with at least one measurement parameter being different for the first and second detected SHG signals, and said one or more hardware processors are configured to:
receive said first and second detected SHG signals; and
determine the geometric feature of the sample or a variation in a geometric feature of the sample based on the first detected SHG signal and the second detected SHG signal.

Example 19: The system of Example 18, wherein said at least one measurement parameter comprises at least one of measurement position, measurement angle, polarization, or wavelength.

Example 20: The system of any of Examples 18-19, wherein the at least one measurement parameter comprises an angle of inclination of the SHG signal measured with respect to the sample.

Example 21: The system of any of Examples 18-20, wherein the at least one measurement parameter comprises an angle of inclination of the at least one detector with respect to the sample.

Example 22: The system of any of Examples 18-21, wherein the at least one measurement parameter comprises an azimuthal angle of the SHG signal measured with respect to an axis perpendicular to surface of the sample.

Example 23: The system of any of Examples 18-22, wherein the at least one measurement parameter comprises Example 24: The system of any of Examples 18-23, wherein the at least one measurement parameter comprises a polarization of the SHG signals received by the at least one optical detector.

Example 25: The system of any of Examples 18-24, wherein the at least one measurement parameter comprises a polarization of a polarizer of the at least one detector.

Example 26: The system of any of Examples 18-25, wherein the at least one measurement parameter comprises a polarization of the light beam incident on the sample.

Example 27: The system of any of Examples 18-26, wherein the at least one measurement parameter comprises an angle of inclination of the at least one light beam directed on the sample with respect to the sample.

Example 28: The system of any of Examples 18-27, wherein the at least one measurement parameter comprises an azimuthal angle of the at least one light beam directed on the sample with respect to an axis perpendicular to surface of the sample.

Example 29: The system of any of Examples 18-28, wherein the at least one measurement parameter comprises a wavelength of the at least one light beam directed onto the sample.

Example 30: The system of any of Examples 18-29, wherein the at least one measurement parameter comprises an output wavelength the at least one light source.

Example 31: The system of any of Examples 18-30, wherein the at least one measurement parameter comprises a detection wavelength of the at least one detector.

Example 32: The system of any of Examples 18-31, wherein the at least one measurement parameter comprises a wavelength of the SHG signal received by the at least one optical detector.

Example 33: The system of any of Examples 18-32, wherein the sample is configured to rotate with respect to the light beam and/or the at least one detector.

Example 34: The system of any of Examples 18-33, wherein the at least one measurement parameter comprises an angle of the at least one detector receiving a SHG signal propagating in a plane formed by the light beam and an axis perpendicular to the sample.

Example 35: The system of any of Examples 18-34, wherein the at least one parameter comprises an angle of the at least one detector receiving a SHG signal propagating out of a plane formed by the light beam and an axis perpendicular to the sample.

Example 36: The system of any of Examples 18-35, wherein the at least one parameter comprises a polarization parameter of linearly or circularly polarized light beam of the at least one optical source.

Example 37: The system of any of Examples 18-36, wherein the at least one optical source comprises a broadband optical source.

Example 38: The system of any of Examples 18-37, wherein the at least one optical source comprises at least two different wavelength light sources.

Example 39: The system of any of Examples 18-38, wherein the system is configured to vary said at least one measurement parameter.

Example 40: The system of any of Examples 39, wherein to vary the at least one measurement parameter, the one or more hardware processors are configured to cause the at least one optical source to emit multiple wavelengths at the same time.

Example 41: The system of any of Examples 39, wherein to vary the at least one measurement parameter, the one or more hardware processors are configured to cause the at least one optical source to emit different wavelengths at different times.

Example 42: The system of any of Examples 18-43, wherein the at least one parameter comprises an angle of the at least one detected SHG signal and a polarization of the detected SHG signal.

Example 43: The system of any of the Examples above, wherein the geometric feature comprises a geometric feature of integrated circuit devices or one or more parts of integrated circuit devices that are either completed or yet to be completed Example 44: The system of any of the Examples above, wherein the system is included in-line in a semiconductor device fabrication system.

Example 45: The system of any of the Examples above, wherein the geometric feature comprises a geometric feature of one or more integrated circuit devices or one or more partially completed integrated circuit devices or one or more part thereof.

Example 46: The system of any of the examples above, wherein the geometric feature comprises a geometrical feature of one or more finFET, GAA, Tri-gate or NAND structures.

Example 47: The system of any of the examples above, wherein the geometric feature comprises a geometric feature of one or more three-dimensional structures of the sample.

Example 48: The system of any of the examples above, wherein the at least one optical source comprises a first optical source configured to emit probing radiation and a second optical source configured to emit pumping radiation.

Example 49: The system of any of the examples above, further comprising a corona gun configured to deposit different amounts of electrical charge to the top side of the sample.

Example 50: The system of Example 49, where the one or more hardware processors are configured to determine a characteristic the at least one detected SHG signal, the first detected SHG signal, or the second detected SHG signal for the different amounts of electrical charge.

Example 51: The system of any of the examples above, wherein the sample comprises semiconductor.

Example 52: The system of any of the examples above, wherein the at least one optical source comprises a first optical source configured to emit a first light beam at a first wavelength and a second optical source configured to emit a second light beam at a second wavelength.

Example 53: The system of any of the examples above, wherein the at least one detector comprises a first detector configured to receive an SHG signal at a first angle and a second detector configured to receive an SHG signal at a second angle.

Example 54: The system of any of the examples above, wherein the at least one detector comprises a first detector configured to receive an SHG signal at a first polarization and a second detector configured to receive an SHG signal at a second polarization.

Example 55: The system of any of the examples above, wherein the at least one detector comprises a detector array comprising a plurality of pixels.

Example 56: The system of any of the examples above, wherein the at least one detector comprises a 1D detector array.

Example 57: The system of any of the examples above, wherein the at least one detector comprises a 2D detector array.

Example 58: The system of any of Examples 55-57, further comprising at least one lens configured to direct the SHG signals emitted from the sample at different angles to different locations on said detector array.

Example 59: The system of any of Examples above, wherein the mapping is generated based on empirical data.

Example 60: The system of any of Examples above, wherein the mapping is generated via a machine learning algorithm.

Example 61: The system of any of Examples above, wherein the mapping comprises a look-up table of SHG signal values and geometric features.

Example 62: The system of any of the Examples above, wherein the variation in the geometric feature comprises a difference between the geometric feature of the sample and a saved geometric feature stored in a memory of the system.

Example 63: The system of Example 62, wherein the saved geometric feature comprises a reference geometric feature provided by a user.

Example 64: The system of Example 62, wherein the saved geometric feature comprises a previously determined geometric feature by the system.

Example 65: The system of Example 64, wherein the previously determined geometric feature is a feature of a second sample after the first fabrication step is performed on the second sample.

Example 66: The system of Example 5, wherein the one or more hardware processors are configured to output an indication of the unplanned variation to a sample processing tool downstream in the fabrication process performed by the fabrication system.

Example 67: The system of Example 6, wherein the one or more hardware processors are configured to output the indication of the unplanned variation to a sample processing tool used for performing the first fabrication step.

Example 68: A method for determining a dimension of a sample using second harmonic generation, the method comprising:
  receiving a first SHG signal;
  varying at least one parameter of a light beam of an at least one optical source or an optical detection system;
  receiving a second SHG signal after the variation of the at least one parameter;
  determining a geometry of a feature of the sample based on the first SHG signal, and the second SHG signal.

Example 69: The method of Example 59, wherein the geometry comprises a dimension or shape.

Example 70: A system for characterizing a sample using second harmonic generation, the system comprising:
  a sample holder configured to support a sample;
  an at least one optical source configured to direct a light beam onto said sample to produce second harmonic generation (SHG) signals;
  an optical detection system comprising at least one detector configured to receive SHG signals emitted from said sample and generate detected SHG signals;
  one or more hardware processors in communication with the optical detection system, the one or more hardware processors configured to:
    receive a first detected SHG signal from said optical detection system, said first detected SHG signal collected by the at least one detector at a first angle with respect to a feature of the sample;
    receive a second detected SHG signal from said optical detection system, said second detected SHG signal collected by the at least one detector at a second angle with respect to the feature of the sample, the second angle different from the first angle; and
    determine a dimension of the feature of the sample based on the first detected SHG signal, the second detected SHG signal.

Example 71: A system for characterizing a sample using second harmonic generation, the system comprising:
  a sample holder configured to support a sample;
  at least one optical source configured to direct a light beam onto said sample to produce second harmonic generation (SHG) signals;
  an optical detection system comprising at least one detector configured to receive SHG signals emitted from said sample and generate detected SHG signals;
  one or more hardware processors in communication with the optical detection system, the one or more hardware processors configured to:
    receive at least a first detected SHG signal;
    determine a change in the first detected SHG signal or a feature of said sample; and
    output an indication of the change.

Example 72: The system of Example 71, wherein the change is associated with a variation in a geometric feature of the sample.

Example 73: The system of Example 71, wherein the change is associated with a variation in a dimension or shape of the sample.

Example 74: The system of Example 72, wherein the variation in the geometric feature of the sample comprises a difference between the geometric feature of the sample and a saved geometric feature stored in a memory of the system.

Example 75: The system of Example 74, wherein the saved geometric feature comprises a reference geometrical feature provided by a user.

Example 76: The system of Example 74, wherein the saved geometric feature is determined by the system before determining the change.

Example 77: The system of any of Examples 74-76, wherein the saved geometric feature comprises a dimension or shape of a device.

Example 78: The system of any of Examples above, wherein the one or more hardware processors receive the at least one detected SHG signal after a first fabrication step performed on the sample.

Example 79: The system of Example 78, wherein the saved geometrical feature is a geometrical feature of a second sample after the first fabrication step is performed on the second sample.

Example 80: The system of any of the Examples above, wherein the system is included in-line in a fabrication system.

Example 81: The system of Example 80, wherein the first fabrication step is a step in a fabrication process performed by the fabrication system.

Example 82: The system of any of Examples 71-81, wherein the one or more hardware processors are configured to output an indication of the change to a sample processing tool configured to adjust for an error in the sample associated with the change.

Example 83: The system of Example 78, wherein the one or more hardware processors are configured to output the indication of the unplanned variation to a sample processing tool used for performing a second fabrication step on the sample after the first fabrication step, to adjust the unplanned variation in the sample.

Example 84: The system of any of Examples 71-81, wherein the one or more hardware processors are configured to output an indication of the change to a sample processing tool configured to adjust for an error in the sample associated with the change in subsequently manufactured samples.

Example 85: The system of any of Examples 71-81, wherein one or more hardware processors are configured to output an indication of the change to a sample processing tool downstream in the fabrication process.

Example 86: The system of any of Examples 71-81, wherein the one or more hardware processors are configured to output an indication of the change to a sample processing tool to thereby cause an adjustment to adjust said sample processing tool.

Example 87: The system of Example 78, wherein the one or more hardware processors are configured to output the indication of the unplanned variation to a sample processing tool used for performing the first fabrication step.

Example 88: The system of any of Examples 71-86, further comprising a second detected SHG signal, said first and second detected SHG signals measured with at least one measurement parameter being different for the first and second detected SHG signals, and said one or more hardware processors are configured to:
receive said first and second detected SHG signals; and
determine a variation in a feature of the sample based on the first detected SHG signal and the second detected SHG signal.

Example 89: The system of Example 88, wherein said at least one parameter comprise at least one of measurement position, measurement angle, polarization, or wavelength.

Example 90: The system of any of Examples 88-89, wherein the at least one parameter comprises an angle of inclination of the SHG signals measured with respect to the sample.

Example 91: The system of any of Examples 88-90, wherein the at least one parameter comprises an angle of inclination of the at least one detector with respect to the sample.

Example 92: The system of any of Examples 88-91, wherein the at least one measurement parameter comprises an azimuthal angle of the SHG signals measured with respect to an axis perpendicular to surface of the sample.

Example 93: The system of any of Examples 88-92, wherein the at least one measurement parameter comprises an azimuthal angle of the at least one detector with respect to an axis perpendicular to surface of the sample.

Example 94: The system of any of Examples 88-93, wherein the at least one measurement parameter comprises a polarization of the SHG signals received by the at least one optical detector.

Example 95: The system of any of Examples 88-94, wherein the at least one measurement parameter comprises a polarization of a polarizer of the at least one detector.

Example 96: The system of any of Examples 88-95, wherein the at least one measurement parameter comprises a polarization of the light beam incident on the sample.

Example 97: The system of any of Examples 88-96, wherein the at least one measurement parameter comprises an angle of inclination of the at least one light beam directed on the sample with respect to the sample.

Example 98: The system of any of Examples 88-97, wherein the at least one measurement parameter comprises an azimuthal angle of the at least one light beam directed on the sample with respect to an axis perpendicular to surface of the sample.

Example 99: The system of any of Examples 88-98, wherein the at least one measurement parameter comprises a wavelength of the at least one light beam directed onto the sample.

Example 100: The system of any of Examples 88-99, wherein the at least one measurement parameter comprises an output wavelength the at least one light source.

Example 101: The system of any of Examples 88-100, wherein the at least one measurement parameter comprises a detection wavelength of the at least one detector.

Example 102: The system of any of Examples 88-101, wherein the at least one measurement parameter comprises a wavelength of the SHG signals received by the at least one optical detector.

Example 103: The system of any of Examples 88-102, wherein the sample is configured to rotate with respect to the incident light beam and/or the at least one detector.

Example 104: The system of any of Examples 88-103, wherein the at least one measurement parameter comprises an angle of the at least one detector receiving a SHG signal propagating in a plane formed by the light beam and an axis perpendicular to the sample.

Example 105: The system of any of Examples 88-104, wherein the at least one parameter comprises an angle of the at least one detector receiving a SHG signal propagating out of a plane formed by the light beam and an axis perpendicular to the sample.

Example 106: The system of any of Examples 88-105, wherein the at least one parameter comprises a linear or circular polarization of the light beam of the at least one optical source.

Example 107: The system of any of Examples 88-106, wherein the at least one optical source comprises a broadband optical source.

Example 108: The system of any of Examples 88-107, wherein the at least one optical source comprises at least two different wavelength light sources.

Example 109: The system of any of Examples 88-108, wherein the system is configured to vary said at least one measurement parameter.

Example 110: The system of any of Examples 109, wherein to vary the at least one measurement parameter, the one or more hardware processors are configured to cause the at least one optical source to emit multiple wavelengths at the same time.

Example 111: The system of any of Examples 109, wherein to vary the at least one measurement parameter, the one or more hardware processors are configured to cause the at least one optical source to emit different wavelengths at different times.

Example 112: The system of any of Examples 88-111, wherein the at least one parameter comprises an angle of the at least one detected SHG signal and a polarization of the detected SHG signal.

Example 113: The system of any of the examples above, wherein the system is included in-line in a semiconductor device fabrication system.

Example 114: The system of any of the examples above, wherein the feature comprises a feature of one or more integrated circuit devices or one or more partially completed integrated circuit devices or parts thereof.

Example 115: The system of any of the examples above, wherein the feature comprises a geometrical feature of one or more finFET, GAA, Tri-gate or NAND structures.

Example 116: The system of any of the examples above, wherein the feature comprises a geometric feature of one or more three-dimensional structures of the sample.

Example 117: The system of any of the examples above, wherein the at least one optical source comprises a first optical source configured to emit probing radiation and a second optical source configured to emit pumping radiation.

Example 118: The system of any of the examples above, further comprising a corona gun configured to deposit different amounts of electrical charge to the top side of the sample.

Example 119: The system of Example 100, where the one or more hardware processors are configured to determine a characteristic of the at least one detected SHG signal, the first detected SHG signal, or the second detected SHG signal for the different amounts of electrical charge.

Example 120: The system of any of the claims above, wherein the sample comprises semiconductor.

Example 121: The system of any of the examples above, wherein the at least one optical source comprises a first optical source configured to emit a first light beam at a first wavelength and a second optical source configured to emit a second light beam at a second wavelength.

Example 122: The system of any of the examples above, wherein the at least one detector comprises a first detector configured to receive an SHG signal at a first angle and a second detector configured to receive an SHG signal at a second angle.

Example 123: The system of any of the examples above, wherein the at least one detector comprises a first detector configured to receive an SHG signal at a first polarization and a second detector configured to receive an SHG signal at a second polarization.

Example 124: The system of any of the examples above, wherein the at least one detector comprises a detector array comprising a plurality of pixels.

Example 125: The system of any of the examples above, wherein the at least one detector comprises a 1D detector array.

Example 126: The system of any of the examples above, wherein the at least one detector comprises a 2D detector array.

Example 127: The system of any of Examples 124-126, further comprising at least one lens configured to direct the SHG signals emitted from the sample at different angles to different locations on said detector array.

Example 128: A system for characterizing a sample using second harmonic generation, the system comprising:
  a sample holder configured to support a sample;
  at least one optical source configured to direct a light beam onto said sample to produce second harmonic generation (SHG) signals;
  an optical detection system comprising at least one detector configured to receive SHG signals from said sample and generate detected SHG signals;
  one or more hardware processors in communication with the optical detection system, the one or more hardware processors configured to:
    receive a first detected SHG signal;
    determine a change in the detected first SHG signal; and
    output an indication of the change.

Example 129: The system of Example 128, wherein the change is associated with a variation in a geometric feature of the sample.

Example 130: The system of Example 128, wherein the change is associated with a variation in a dimension or shape of the sample.

Example 131: The system of any of Examples 128-130, wherein the one or more hardware processors are configured to output an indication of the change to a sample processing tool configured to adjust for an error in the sample associated with the change.

Example 132: The system of any of Examples 128-131, wherein the one or more hardware processors are configured to output an indication of the change to a sample processing tool configured to adjust for an error in the sample associated with the change in subsequently manufactured samples.

Example 133: The system of any of Examples 128-132, wherein one or more hardware processors are configured to output an indication of the change to a sample processing tool downstream in the fabrication process.

Example 134: The system of any of Examples 128-133, wherein the one or more hardware processors are configured to output an indication of the change to a sample processing tool to thereby cause an adjustment to adjust said sample processing tool.

Example 135: The system of any of Examples 1-67 and 70-134, wherein the system further comprises another metrology system.

Example 136: The system of any of Examples 1-67 and 70-134, wherein the system further comprises another optical metrology system.

Example 137: The system of any of Examples 1-67 and 70-134, wherein the system further comprises another metrology system configured to determine a geometric feature or a variation of a geometric feature of the sample.

Example 138: The system of any of Examples 1-67 and 70-134, wherein the system further comprises another optical metrology system configured to determine a geometric feature or a variation of a geometric feature of the sample using light from the sample.

Example 139: The system of any of Examples 1-67 and 70-134, wherein the system further comprises optical scatterometry system configured to determine a geometric feature or a variation of a geometric feature of the sample using light scattered from the sample, the scattered light having a wavelength identical to that of a source light beam.

Example 140: The system of Example 138 or 139, wherein the source light beam is generated by the at least one optical source.

Example 141: The system of Example 138 or 139, wherein the source light beam is generated by a second optical source.

Example 142: The system of any of Examples 139-141, wherein the at least one optical detector is further configured to receive the light scattered from the sample.

Example 143: The system of any of Examples 1-67 and 70-142, wherein the at least one optical detector is further configured to detect light having a primary wavelength, wherein the primary wavelength is the wavelength of the light beam or the source light beam.

Example 144: The system of any of Examples 139-141, wherein the light scattered from the sample is detected by a second detector.

Example 145: The system of any of Examples 18-65, wherein the one or more hardware processors are further configured to differentiate between a variation in different geometric features of one or more devices on the sample.

Example 146: The system of any of Examples 18-65, wherein said first detected SHG signals depends on first and second geometric features such that variation in said first feature causes variation in said first detected SHG signal and variation in said second feature causes variation in said first detected SHG signal.

Example 147: The system of any of Example 146, wherein the one or more hardware processors are further configured to differentiate between variation in said first and second features using said first and second detected SHG signals.

Example 148: The system of any of Examples 145-147, wherein different geometric features comprise a height and a width of one or more devices.

Example 149: The system of any of Examples above, wherein the geometric feature comprises a geometric feature in a region of the sample illuminated by the light beam.

Example 150: The system of Example 149, wherein the illuminated region of the sample comprises a portion of a periodic structure larger than a single period.

Example 151: The system of Example 150, wherein the geometric feature comprises a geometric feature in a period.

Example 152: The system of Example 151, wherein the periodic structure comprises an array of transistors and the geometric feature comprises a width or a height of a transistor in the array of the transistors.

Example 153: The system of any of Examples 1-67, wherein said one or more hardware processors are configured to determine a geometric feature of the sample based on the at least one detected SHG signal.

Example 154: The system of any of Examples 1-67, wherein said one or more hardware processors are configured to determine a variation in a geometric feature of the sample based on the at least one detected SHG signal.

Example 155: The system of any of Examples 18-67, wherein said one or more hardware processors are configured to determine the geometric feature of the sample based on the first detected SHG signal and the second detected SHG signal.

Example 156: The system of any of Examples 18-67, wherein said one or more hardware processors are configured to determine a variation in a geometric feature of the sample based on the first detected SHG signal and the second detected SHG signal.

Example 157: The system of any of Examples 71-127, wherein the one or more hardware processors are configured to:
 receive at least a first detected SHG signal;
 determine a change in the first detected SHG signal; and
 output an indication of the change.

Example 158: The system of any of Examples 71-127, wherein the one or more hardware processors are configured to:
 receive at least a first detected SHG signal;
 determine a change in a feature of said sample; and
 output an indication of the change.

Group 2

Example 1: A system for characterizing a sample using second harmonic generation, the system comprising:
 at least one optical source configured to direct a light beam onto said sample to produce second harmonic generation (SHG) signals;
 an optical detection system comprising at least one optical detector configured to receive the SHG signals emitted from said sample and generate detected SHG signals;
 one or more hardware processors in communication with the optical detection system, the one or more hardware processors configured to:
  receive at least one detected SHG signal; and
  determine a geometric feature of the sample or a variation in a geometric feature of the sample based on the at least one detected SHG signal.

Example 2: The system of Example 1, wherein the geometric feature of the sample is determined at least in part based on a mapping of the detected SHG signals with geometric features of one or more structures on the sample that are either completed or yet to be completed.

Example 3: The system of Example 1, wherein the one or more hardware processors receive the at least one detected SHG signal after a first fabrication step performed on the sample.

Example 4: The system of Example 3, wherein the system is included in-line in a fabrication system.

Example 5: The system of Example 4, wherein the first fabrication step is a step in a fabrication process performed by the fabrication system.

Example 6: The system of any of the examples above, wherein the one or more hardware processors are configured to:
 identify an unplanned variation in a geometric feature of the sample; and
 output an indication of the unplanned variation.

Example 7: The system of Example 6, wherein the one or more hardware processors are configured to output an indication of the unplanned variation to a sample processing tool in the fabrication system to adjust the unplanned variation in the sample.

Example 8: The system of Example 7, wherein the one or more hardware processors are configured to output the indication of the unplanned variation to a sample processing tool used for performing a second fabrication step on the sample after the first fabrication step, to adjust the unplanned variation in the sample.

Example 9: The system of Example 6, wherein the one or more hardware processors are configured to output an indication of the unplanned variation to a user via a user interface of the system.

Example 10: The system of any of the examples above, wherein said geometric feature comprises a dimension for one or more devices or one or more parts of devices that are either completed or yet to be completed.

Example 11: The system of any of the examples above, wherein said geometric feature comprises a critical dimension for one or more devices or part of one or more devices that are either completed or yet to be completed.

Example 12: The system of any of the examples above, wherein said geometric feature comprises a shape of one or more devices or part of one or more devices that are either completed or yet to be completed.

Example 13: The system of any of the examples above, wherein said geometric feature comprises a lateral dimension comprising a width or length for one or more devices or part of one or more devices that are either completed or yet to be completed.

Example 14: The system of any of the examples above, wherein said geometric feature comprises a height for one or more devices or part of one or more devices that are either completed or yet to be completed.

Example 15: The system of any of the examples above, wherein said geometric feature comprises a lateral spacing between a plurality of devices or a plurality of parts of devices that are either completed or yet to be completed.

Example 16: The system of any of the examples above, wherein said geometric feature comprises a tilt or slope of one or more devices or part of one or more devices that are either completed or yet to be completed.

Example 17: The system of any of the examples above, wherein said geometric feature comprises a sidewall tilt or slope of for one or more devices or part of one or more devices that are either completed or yet to be completed.

Example 18: The system of any of the examples above, wherein said at least one detected SHG signal comprises first and second detected SHG signals measured with at least one measurement parameter being different for the first and second detected SHG signals, and said one or more hardware processors are configured to:
  receive said first and second detected SHG signals; and
  determine the geometric feature of the sample or a variation in a geometric feature of the sample based on the first detected SHG signal and the second detected SHG signal.

Example 19: The system of Example 18, wherein said at least one measurement parameter comprises at least one of measurement position, measurement angle, polarization, or wavelength.

Example 20: The system of any of Examples 18-19, wherein the at least one measurement parameter comprises an angle of inclination of the SHG signal measured with respect to the sample.

Example 21: The system of any of Examples 18-20, wherein the at least one measurement parameter comprises an angle of inclination of the at least one detector with respect to the sample.

Example 22: The system of any of Examples 18-21, wherein the at least one measurement parameter comprises an azimuthal angle of the SHG signal measured with respect to an axis perpendicular to surface of the sample.

Example 23: The system of any of Examples 18-22, wherein the at least one measurement parameter comprises an azimuthal angle of the at least one detector with respect to an axis perpendicular to surface of the sample.

Example 24: The system of any of Examples 18-23, wherein the at least one measurement parameter comprises a polarization of the SHG signals received by the at least one optical detector.

Example 25: The system of any of Examples 18-24, wherein the at least one measurement parameter comprises a polarization of a polarizer of the at least one detector.

Example 26: The system of any of Examples 18-25, wherein the at least one measurement parameter comprises a polarization of the light beam incident on the sample.

Example 27: The system of any of Examples 18-26, wherein the at least one measurement parameter comprises an angle of inclination of the at least one light beam directed on the sample with respect to the sample.

Example 28: The system of any of Examples 18-27, wherein the at least one measurement parameter comprises an azimuthal angle of the at least one light beam directed on the sample with respect to an axis perpendicular to surface of the sample.

Example 29: The system of any of Examples 18-28, wherein the at least one measurement parameter comprises a wavelength of the at least one light beam directed onto the sample.

Example 30: The system of any of Examples 18-29, wherein the at least one measurement parameter comprises an output wavelength the at least one light source.

Example 31: The system of any of Examples 18-30, wherein the at least one measurement parameter comprises a detection wavelength of the at least one detector.

Example 32: The system of any of Examples 18-31, wherein the at least one measurement parameter comprises a wavelength of the SHG signal received by the at least one optical detector.

Example 33: The system of any of Examples 18-32, wherein the sample is configured to rotate with respect to the light beam and/or the at least one detector.

Example 34: The system of any of Examples 18-33, wherein the at least one measurement parameter comprises an angle of the at least one detector receiving a SHG signal propagating in a plane formed by the light beam and an axis perpendicular to the sample.

Example 35: The system of any of Examples 18-34, wherein the at least one parameter comprises an angle of the at least one detector receiving a SHG signal propagating out of a plane formed by the light beam and an axis perpendicular to the sample.

Example 36: The system of any of Examples 18-35, wherein the at least one parameter comprises a parameter of linearly or circularly polarized light beam of the at least one optical source.

Example 37: The system of any of Examples 18-36, wherein the at least one optical source comprises a broadband optical source.

Example 38: The system of any of Examples 18-37, wherein the at least one optical source comprises at least two different wavelength light sources.

Example 39: The system of any of Examples 18-38, wherein the system is configured to vary said at least one measurement parameter.

Example 40: The system of any of Examples 39, wherein to vary the at least one measurement parameter, the one or more hardware processors are configured to cause the at least one optical source to emit multiple wavelengths at the same time.

Example 41: The system of any of Examples 39, wherein to vary the at least one measurement parameter, the one or more hardware processors are configured to cause the at least one optical source to emit different wavelengths at different times.

Example 42: The system of any of Examples 18-43, wherein the at least one parameter comprises an angle of the at least one detected SHG signal and a polarization of the detected SHG signal.

Example 43: The system of any of the Examples above, wherein the geometric feature comprises a geometrical feature of integrated circuit devices or one or more parts of integrated circuit devices that are either completed or yet to be completed Example 44: The system of any of the Examples above, wherein the system is included in-line in a semiconductor device fabrication system.

Example 45: The system of any of the Examples above, wherein the geometrical feature comprises a geometric feature of one or more integrated circuit devices or one or more partially completed integrated circuit devices or one or more part thereof.

Example 46: The system of any of the examples above, wherein the geometrical feature comprises a geometrical feature of one or more finFET, GAA, Tri-gate or NAND structures.

Example 47: The system of any of the examples above, wherein the geometrical feature comprises a geometric feature of one or more three-dimensional structures of the sample.

Example 48: The system of any of the examples above, wherein the at least one optical source comprises a first optical source configured to emit probing radiation and a second optical source configured to emit pumping radiation.

Example 49: The system of any of the examples above, further comprising a corona gun configured to deposit different amounts of electrical charge to the top side of the sample.

Example 50: The system of Example 49, where the one or more hardware processors are configured to determine a characteristic the at least one detected SHG signal, the first detected SHG signal, or the second detected SHG signal for the different amounts of electrical charge.

Example 51: The system of any of the examples above, wherein the sample comprises semiconductor.

Example 52: The system of any of the examples above, wherein the at least one optical source comprises a first optical source configured to emit a first light beam at a first wavelength and a second optical source configured to emit a second light beam at a second wavelength.

Example 53: The system of any of the examples above, wherein the at least one detector comprises a first detector configured to receive an SHG signal at a first angle and a second detector configured to receive an SHG signal at a second angle.

Example 54: The system of any of the examples above, wherein the at least one detector comprises a first detector configured to receive an SHG signal at a first polarization and a second detector configured to receive an SHG signal at a second polarization.

Example 55: The system of any of the examples above, wherein the at least one detector comprises a detector array comprising a plurality of pixels.

Example 56: The system of any of the examples above, wherein the at least one detector comprises a 1D detector array.

Example 57: The system of any of the examples above, wherein the at least one detector comprises a 2D detector array.

Example 58: The system of any of Examples 55-57, further comprising at least one lens configured to direct the SHG signals emitted from the sample at different angles to different locations on said detector array.

Example 59: The system of any of the examples above, wherein the mapping is generated based on empirical data.

Example 60: The system of any of the examples above, wherein the mapping is generated via a machine learning algorithm.

Example 61: The system of any of Examples above, wherein the mapping comprises a look-up table of SHG signal values and geometric features.

Example 62: The system of any of the Examples above, wherein the variation in the geometric feature comprises a difference between the geometric feature of the sample and a saved geometric feature stored in a memory of the system.

Example 63: The system of Example 62, wherein the saved geometric feature comprises a reference geometrical feature provided by a user.

Example 64: The system of Example 62, wherein the saved geometric feature comprises a previously determined geometrical feature by the system.

Example 65: The system of Example 64, wherein the previously determined geometrical feature is a feature of a second sample after the first fabrication step is performed on the second sample.

Example 66: The system of Example 5, wherein the one or more hardware processors are configured to output an indication of the unplanned variation to a sample processing tool downstream in the fabrication process performed by the fabrication system.

Example 67: The system of Example 6, wherein the one or more hardware processors are configured to output the indication of the unplanned variation to a sample processing tool used for performing the first fabrication step.

Example 68: A method for determining a dimension of a sample using second harmonic generation, the method comprising:
  receiving a first SHG signal;
  varying at least one parameter of a light beam of an at least one optical source or an optical detection system;
  receiving a second SHG signal after the variation of the at least one parameter;
  determining a geometry of a feature of the sample based on the first SHG signal and the second SHG signal.

Example 69: The method of Example 59, wherein the geometry comprises a dimension or shape.

Example 70: A system for characterizing a sample using second harmonic generation, the system comprising:
  an at least one optical source configured to direct a light beam onto said sample to produce second harmonic generation (SHG) signals;
  an optical detection system comprising at least one detector configured to receive SHG signals emitted from said sample and generate detected SHG signals;
  one or more hardware processors in communication with the optical detection system, the one or more hardware processors configured to:
    receive a first detected SHG signal from said optical detection system, said first detected SHG signal collected by the at least one detector at a first angle with respect to a feature of the sample;
    receive a second detected SHG signal from said optical detection system, said second detected SHG signal collected by the at least one detector at a second angle with respect to the feature of the sample, the second angle different from the first angle; and
    determine a dimension of the feature of the sample based on the first detected SHG signal and the second detected SHG signal.

Example 71: A system for characterizing a sample using second harmonic generation, the system comprising:
  at least one optical source configured to direct a light beam onto said sample to produce second harmonic generation (SHG) signals;
  an optical detection system comprising at least one detector configured to receive SHG signals emitted from said sample and generate detected SHG signals;
  one or more hardware processors in communication with the optical detection system, the one or more hardware processors configured to:
  receive at least a first detected SHG signal;
    determine a change in the first detected SHG signal or a feature of said sample; and
    output an indication of the change.

Example 72: The system of Example 71, wherein the change is associated with a variation in a geometric feature of the sample.

Example 73: The system of Example 71, wherein the change is associated with a variation in a dimension or shape of the sample.

Example 74: The system of Example 72, wherein the variation in the geometric feature of the sample comprises a difference between the geometric feature of the sample and a saved geometric feature stored in a memory of the system.

Example 75: The system of Example 74, wherein the saved geometric feature comprises a reference geometrical feature provided by a user.

Example 76: The system of Example 74, wherein the saved geometric feature is determined by the system before determining the change.

Example 77: The system of any of Example 74-76, wherein the saved geometric feature comprises a dimension or shape of a device.

Example 78: The system of any of Examples above, wherein the one or more hardware processors receive the at least one detected SHG signal after a first fabrication step performed on the sample.

Example 79: The system of Example 78, wherein the saved geometrical feature is a second geometrical feature of a second sample after the first fabrication step is performed on the second sample.

Example 80: The system of any of the Examples above, wherein the system is included in-line in a fabrication system.

Example 81: The system of Example 80, wherein the first fabrication step is a step in a fabrication process performed by the fabrication system.

Example 82: The system of any of Examples 71-81, wherein the one or more hardware processors are configured to output an indication of the change to a sample processing tool configured to adjust for an error in the sample associated with the change.

Example 83: The system of Example 78, wherein the one or more hardware processors are configured to output the indication of the unplanned variation to a sample processing tool used for performing a second fabrication step on the sample after the first fabrication step, to adjust the unplanned variation in the sample.

Example 84: The system of any of Examples 71-81, wherein the one or more hardware processors are configured to output an indication of the change to a sample processing tool configured to adjust for an error in the sample associated with the change in subsequently manufactured samples.

Example 85: The system of any of Examples 71-81, wherein one or more hardware processors are configured to output an indication of the change to a sample processing tool downstream in the fabrication process.

Example 86: The system of any of Examples 71-81, wherein the one or more hardware processors are configured to output an indication of the change to a sample processing tool to thereby cause an adjustment to adjust said sample processing tool.

Example 87: The system of Example 78, wherein the one or more hardware processors are configured to output the indication of the unplanned variation to a sample processing tool used for performing the first fabrication step.

Example 88: The system of any of Examples 71-86, further comprising a second detected SHG signal, said first and second detected SHG signals measured with at least one measurement parameter being different for the first and second detected SHG signals, and said one or more hardware processors are configured to:
receive said first and second detected SHG signals; and
determine a variation in a feature of the sample based on the first detected SHG signal and the second detected SHG signal.

Example 89: The system of Example 88, wherein said at least one parameter comprise at least one of measurement position, measurement angle, polarization, or wavelength.

Example 90: The system of any of Examples 88-89, wherein the at least one parameter comprises an angle of inclination of the SHG signals measured with respect to the sample.

Example 91: The system of any of Examples 88-90, wherein the at least one parameter comprises an angle of inclination of the at least one detector with respect to the sample.

Example 92: The system of any of Examples 88-91, wherein the at least one measurement parameter comprises an azimuthal angle of the SHG signals measured with respect to an axis perpendicular to surface of the sample.

Example 93: The system of any of Examples 88-92, wherein the at least one measurement parameter comprises an azimuthal angle of the at least one detector with respect to an axis perpendicular to surface of the sample.

Example 94: The system of any of Examples 88-93, wherein the at least one measurement parameter comprises a polarization of the SHG signals received by the at least one optical detector.

Example 95: The system of any of Examples 88-94, wherein the at least one measurement parameter comprises a polarization of a polarizer of the at least one detector.

Example 96: The system of any of Examples 88-95, wherein the at least one measurement parameter comprises a polarization of the light beam incident on the sample.

Example 97: The system of any of Examples 88-96, wherein the at least one measurement parameter comprises an angle of inclination of the at least one light beam directed on the sample with respect to the sample.

Example 98: The system of any of Examples 88-97, wherein the at least one measurement parameter comprises an azimuthal angle of the at least one light beam directed on the sample with respect to an axis perpendicular to surface of the sample.

Example 99: The system of any of Examples 88-98, wherein the at least one measurement parameter comprises a wavelength of the at least one light beam directed onto the sample.

Example 100: The system of any of Examples 88-99, wherein the at least one measurement parameter comprises an output wavelength the at least one light source.

Example 101: The system of any of Examples 88-100, wherein the at least one measurement parameter comprises a detection wavelength of the at least one detector.

Example 102: The system of any of Examples 88-101, wherein the at least one measurement parameter comprises a wavelength of the SHG signals received by the at least one optical detector.

Example 103: The system of any of Examples 88-102, wherein the sample is configured to rotate with respect to the incident light beam and/or the at least one detector.

Example 104: The system of any of Examples 88-103, wherein the at least one measurement parameter comprises an angle of the at least one detector receiving a SHG signal propagating in a plane formed by the light beam and an axis perpendicular to the sample.

Example 105: The system of any of Examples 88-104, wherein the at least one parameter comprises an angle of the at least one detector receiving a SHG signal propagating out of a plane formed by the light beam and an axis perpendicular to the sample.

Example 106: The system of any of Examples 88-105, wherein the at least one parameter comprises a linear or circular polarization of the light beam of the at least one optical source.

Example 107: The system of any of Examples 88-106, wherein the at least one optical source comprises a broadband optical source.

Example 108: The system of any of Examples 88-107, wherein the at least one optical source comprises at least two different wavelength light sources.

Example 109: The system of any of Examples 88-108, wherein the system is configured to vary said at least one measurement parameter.

Example 110: The system of any of Examples 109, wherein to vary the at least one measurement parameter, the one or more hardware processors are configured to cause the at least one optical source to emit multiple wavelengths at the same time.

Example 111: The system of any of Examples 109, wherein to vary the at least one measurement parameter, the one or more hardware processors are configured to cause the at least one optical source to emit different wavelengths at different times.

Example 112: The system of any of Examples 88-111, wherein the at least one parameter comprises an angle of the at least one detected SHG signal and a polarization of the detected SHG signal.

Example 113: The system of any of the examples above, wherein the system is included in-line in a semiconductor device fabrication system.

Example 114: The system of any of the examples above, wherein the feature comprises a feature of one or more integrated circuit devices or one or more partially completed integrated circuit devices or parts thereof.

Example 115: The system of any of the examples above, wherein the feature comprises a geometrical feature of one or more finFET, GAA, Tri-gate or NAND structures.

Example 116: The system of any of the examples above, wherein the feature comprises a geometric feature of one or more three-dimensional structures of the sample.

Example 117: The system of any of the examples above, wherein the at least one optical source comprises a first optical source configured to emit probing radiation and a second optical source configured to emit pumping radiation.

Example 118: The system of any of the examples above, further comprising a corona gun configured to deposit different amounts of electrical charge to the top side of the sample.

Example 119: The system of Example 100, where the one or more hardware processors are configured to determine a characteristic of the at least one detected SHG signal, the first detected SHG signal, or the second detected SHG signal for the different amounts of electrical charge.

Example 120: The system of any of the claims above, wherein the sample comprises semiconductor.

Example 121: The system of any of the examples above, wherein the at least one optical source comprises a first optical source configured to emit a first light beam at a first wavelength and a second optical source configured to emit a second light beam at a second wavelength.

Example 122: The system of any of the examples above, wherein the at least one detector comprises a first detector configured to receive an SHG signal at a first angle and a second detector configured to receive an SHG signal at a second angle.

Example 123: The system of any of the examples above, wherein the at least one detector comprises a first detector configured to receive an SHG signal at a first polarization and a second detector configured to receive an SHG signal at a second polarization.

Example 124: The system of any of the examples above, wherein the at least one detector comprises a detector array comprising a plurality of pixels.

Example 125: The system of any of the examples above, wherein the at least one detector comprises a 1D detector array.

Example 126: The system of any of the examples above, wherein the at least one detector comprises a 2D detector array.

Example 127: The system of any of Examples 124-126, further comprising at least one lens configured to direct the SHG signals emitted from the sample at different angles to different locations on said detector array.

Example 128: A system for characterizing a sample using second harmonic generation, the system comprising:
- at least one optical source configured to direct a light beam onto said sample to produce second harmonic generation (SHG) signals;
- an optical detection system comprising at least one detector configured to receive SHG signals from said sample and generate detected SHG signals;
- one or more hardware processors in communication with the optical detection system, the one or more hardware processors configured to:
  - receive a first detected SHG signal;
  - determine a change in the detected first SHG signal; and
  - output an indication of the change.

Example 129: The system of Example 128, wherein the change is associated with a variation in a geometric feature of the sample.

Example 130: The system of Example 128, wherein the change is associated with a variation in a dimension or shape of the sample.

Example 131: The system of any of Examples 128-130, wherein the one or more hardware processors are configured to output an indication of the change to a sample processing tool configured to adjust for an error in the sample associated with the change.

Example 132: The system of any of Examples 128-131, wherein the one or more hardware processors are configured to output an indication of the change to a sample processing tool configured to adjust for an error in the sample associated with the change in subsequently manufactured samples.

Example 133: The system of any of Examples 128-132, wherein one or more hardware processors are configured to output an indication of the change to a sample processing tool downstream in the fabrication process.

Example 134: The system of any of Examples 128-133, wherein the one or more hardware processors are configured to output an indication of the change to a sample processing tool to thereby cause an adjustment to adjust said sample processing tool.

Example 135: The system of any of Examples 1-67, and 70-134, wherein the system further comprises sample holder configured to support the sample.

Example 136: The system of any of Examples 1-67 and 70-135, wherein the system further comprises another metrology system.

Example 137: The system of any of Examples 1-67 and 70-135, wherein the system further comprises another optical metrology system.

Example 138: The system of any of Examples 1-67 and 70-135, wherein the system further comprises another metrology system configured to determine a geometric feature or a variation of a geometric feature of the sample.

Example 139: The system of any of Examples 1-67 and 70-135, wherein the system further comprises another optical metrology system configured to determine a geometric feature or a variation of a geometric feature of the sample using light from the sample.

Example 140: The system of any of Examples 1-67 and 70-135, wherein the system further comprises optical scatterometry system configured to determine a geometric feature or a variation of a geometric feature of the sample using light scattered from the sample, the scattered light having a wavelength identical to that of a source light beam.

Example 141: The system of Example 139 or 140, wherein the source light beam is generated by the at least one optical source.

Example 142: The system of Example 139 or 140, wherein the source light beam is generated by a second optical source.

Example 143: The system of any of Examples 140-142, wherein the at least one optical detector is further configured to receive the light scattered from the sample.

Example 144: The system of any of Examples 1-67 and 70-143, wherein the at least one optical detector is further configured to detect light having a primary wavelength, wherein the primary wavelength is the wavelength of the light beam or the source light beam.

Example 145: The system of any of Examples 139-144, wherein the light scattered from the sample is detected by a second detector.

Example 146: The system of any of Examples 18-65, wherein the one or more hardware processors are further configured to differentiate between a variation in different geometric features of one or more devices on the sample.

Example 147: The system of any of Examples 18-65, wherein said first detected SHG signals depends on first and second geometric features such that variation in said first feature causes variation in said first detected SHG signal and variation in said second feature causes variation in said first detected SHG signal.

Example 148: The system of any of Example 147, wherein the one or more hardware processors are further configured to differentiate between variation in said first and second features using said first and second detected SHG signals.

Example 149: The system of Example 146-148, wherein different geometric features comprise a height and a width of one or more devices.

Example 150: The system of any of Examples above, wherein the geometric feature comprises a geometric feature in a region of the sample illuminated by the light beam.

Example 151: The system of Example 150, wherein the illuminated region of the sample comprises a portion of a periodic structure larger than a single period.

Example 152: The system of Example 151, wherein the geometric feature comprises a geometric feature in a period.

Example 153: The system of Example 152, wherein the periodic structure comprises an array of transistors and the geometric feature comprises a width or a height of a transistor in the array of the transistors.

Example 154: The system of any of Examples 1-67, wherein said one or more hardware processors are configured to determine a geometric feature of the sample based on the at least one detected SHG signal.

Example 155: The system of any of Examples 1-67, wherein said one or more hardware processors are configured to determine a variation in a geometric feature of the sample based on the at least one detected SHG signal.

Example 156: The system of any of Examples 18-67, wherein said one or more hardware processors are configured to determine the geometric feature of the sample based on the first detected SHG signal and the second detected SHG signal.

Example 157: The system of any of Examples 18-67, wherein said one or more hardware processors are configured to determine a variation in a geometric feature of the sample based on the first detected SHG signal and the second detected SHG signal.

Example 158: The system of any of Examples 71-127, wherein the one or more hardware processors are configured to:
  receive at least a first detected SHG signal;
  determine a change in the first detected SHG signal; and
  output an indication of the change.

Example 159: The system of any of Examples 71-127, wherein the one or more hardware processors are configured to:
  receive at least a first detected SHG signal;
  determine a change in a feature of said sample; and
  output an indication of the change.

Group 3

Example 1: A system for optically interrogating a surface, comprising
  a pump optical source configured to emit pumping radiation, the pumping radiation having an average optical pump power;
  a probe optical source configured to emit probing radiation, the probing radiation having an average optical probe power less than the average optical pump power;
  at least one optical detector configured to detect second harmonic generated light generated by at least one of the pumping radiation or the probing radiation, the second harmonic generated light being generated by a semiconductor wafer whose surface is to be interrogated;
  at least one of a shutter, a modulator or a variable optical path that is configured to introduce a variable time offset between the pumping and the probing radiation; and
  a processor configured to determine a characteristic of the detected second harmonic generated light,
  wherein the system is configured to obtain a time dependence of the detected second harmonic generated light in less than 10 seconds after applying at least one of the pumping radiation and the probing radiation.

Example 2: The system of Example 1, wherein the pump optical source comprises a UV flash lamp.

Example 3: The system of Example 1, wherein the pump optical source comprises a laser.

Example 4: The system of Example 3, wherein the pump optical source comprises a pulsed laser.

Example 5: The system of Example 4, wherein the pulsed laser is selected from a group consisting of nanosecond, picosecond and femtosecond lasers.

Example 6: The system of Example 4, wherein the pulsed laser comprises a wavelength tunable laser.

Example 7: The system of Example 1, wherein the probe optical source comprises a pulsed laser.

Example 8: The system of Example 1, wherein the optical detector is selected from a photomultiplier tube, a CCD camera, an avalanche detector, a photodiode detector, a streak camera and a silicon detector.

Example 9: The system of Example 8, wherein the system is configured to obtain the second harmonic generated light in less than 1 second after applying at least one of the pumping radiation and the probing radiation.

Example 10: The system of Example 1, wherein the system comprises the variable optical path that is configured to introduce a variable time offset between the pumping and the probing radiation.

Example 11: The system of Example 10, wherein the variable optical path is a programmable optical delay.

Example 12: The system of Example 1, wherein the shutter is an optical shutter selected from a Kerr cell and a Pockels cell.

Example 13: The system of Example 1, wherein the shutter is a mechanical shutter.

Example 14: The system of Example 1, wherein the shutter is configured to introduce a time offset between about 1 millisecond and about 60 seconds.

Example 15: The system of Example 1, wherein the processor is configured to obtain a time dependence of the detected second harmonic generated light in less than 10 seconds after applying at least one of the pumping radiation and the probing radiation.

Example 16: The system of Example 1, wherein the processor is configured to determine a characteristic of the detected second harmonic generated light including a reduction in intensity of the detected second harmonic generated light in the presence of pumping energy.

Example 17: The system of Example 1, wherein the processor is configured to determine a characteristic of the detected second harmonic generated light including an increase in intensity of the detected second harmonic generated light in the presence of pumping energy.

Example 18: The system of Example 1, wherein the variable optical path comprises an optical delay line.

Example 19: The system of Example 18, wherein the optical delay line comprises at least one of a fiber-based device, a mirror-based device, a plurality of set-time delay lines, or a variable delay line.

Example 20: The system of Example 1, wherein the processor is further configured to determine a characteristic of the surface based on the detected second harmonic generated light and the variable time offset.

Example 21: The system of Example 1, wherein the average optical pump power is less than 10 W.

Example 22: The system of Example 1, wherein the average optical probe power is less than 150 mW.

Example 23: The system of Example 1, wherein the pumping radiation comprises a plurality of optical pulses having a peak optical pump power, and wherein the probing radiation comprises a plurality of optical pulses having a peak optical probe power greater than the peak optical pump power.

Example 24: A system for optically interrogating a surface, comprising:
  a pump optical source configured to emit pumping radiation, the pumping radiation having an average optical pump power;
  a probe optical source configured to emit probing radiation, the probing radiation having an average optical probe power less than the average optical pump power;
  at least one optical detector configured to detect second harmonic generated light generated by at least one of the pumping radiation or the probing radiation, the second harmonic generated light being generated by a semiconductor wafer whose surface is to be interrogated; and
  a controller configured to obtain information regarding time dependence of the detected second harmonic generated light produced in less than 10 seconds after applying at least one of the pumping radiation and the probing radiation.

Example 25: The system of Example 24, wherein the average optical pump power is less than 10 W.

Example 26: The system of Example 24, wherein the average optical probe power is less than 150 mW.

Example 27: The system of Example 24, wherein the pumping radiation comprises a plurality of optical pulses having a peak optical pump power, and wherein the probing radiation comprises a plurality of optical pulses having a peak optical probe power greater than the peak optical pump power.

Example 28: A system for optically interrogating a surface, comprising:
  a pump optical source configured to emit pumping radiation with variable energy, the pumping radiation having an average optical pump power;
  a probe optical source configured to emit probing radiation, the probing radiation having an average optical probe power less than the average optical pump power;
  an optical detector configured to detect second harmonic generated light generated by at least one of the pumping radiation or the probing radiation, the second harmonic generated light being generated by a semiconductor wafer whose surface is to be interrogated; and
  processing electronics configured to:
  obtain information regarding time dependence of the detected second harmonic generated light less than 10 seconds after applying at least one of the pumping radiation and the probing radiation; and
  detect a region of discontinuity in the second harmonic generated light to determine threshold injection carrier energy as the energy of the pumping radiation is varied.

Example 29: The system of Example 28, wherein the intensity of the second harmonic generated light increases as the energy of the pumping radiation increases after the region of discontinuity.

Example 30: The system of Example 28, wherein the average optical pump power is less than 10 W.

Example 31: The system of Example 28, wherein the average optical probe power is less than 150 mW.

Example 32: The system of Example 28, wherein the pumping radiation comprises a plurality of optical pulses having a peak optical pump power, and wherein the probing radiation comprises a plurality of optical pulses having a peak optical probe power greater than the peak optical pump power.

Any one or more of the examples in Group 3 can be combined with any of the one or more of the examples in Groups 1, 2 or 4. For example, any of the systems in Group 3 may be further configured to receive at least one detected SHG signal and determine a geometric feature of the sample based on the at least one detected SHG signal. Additionally, any of the systems in Group 3 may be further configured to receive at least one detected SHG signal and determine a variation in a geometric feature of the sample based on the at least one detected SHG signal. Additionally any of the systems in Group 3 may be further configured to receive at least a first detected SHG signal, determine a change in the first detected SHG signal, and output an indication of the change. Additionally any of the systems in Group 3 may be further configured to receive at least a first detected SHG signal, determine a change in a feature of said sample, and output an indication of the change. Additionally, any of the systems in Group 3 may be further configured to identify an unplanned variation in a geometric feature of the sample and output an indication of the unplanned variation.

Additional examples in Group 1, 2, and 4 may be combined with any one or more of the examples listed in Group 3.

Group 4

Example 1: A system for characterizing a sample using second harmonic generation, the system comprising:
- a sample holder configured to support a sample;
- at least one optical source configured to direct a light beam onto said sample to produce second harmonic generation (SHG);
- an optical detection system comprising at least one optical detector configured to receive second harmonic generated light from said sample;
- one or more hardware processors in communication with the optical detection system, the one or more hardware processors configured to:
  - receive at least one SHG signal; and
  - determine a geometric feature of the sample or a variation in a geometric feature of the sample based on the at least one SHG signal.

Example 2: The system of any of the examples above, wherein the geometric feature of the sample is determined at least in part based on a mapping of SHG signals with geometric features integrated circuits devices or one or more parts of integrated circuit devices that are either completed or yet to be completed.

Example 3: The system of Example 2, wherein the mapping is generated based on empirical data.

Example 4: The system of Example 2, wherein the mapping is generated via a machine learning algorithm.

Example 5: The system of Example 2, wherein the mapping comprises a look-up table of SHG signal values and geometric features.

Example 6: The system of any of the examples above, wherein the one or more hardware processors are configured to:
- identify an unplanned variation in a geometric feature of the sample; and
- output an indication of the unplanned variation.

Example 7: The system of Example 6, wherein the one or more hardware processors are configured to output an indication of the unplanned variation to a sample processing tool configured to adjust the unplanned variation in the sample.

Example 8: The system of Example 6 or 7, wherein the one or more hardware processors are configured to output an indication of the unplanned variation to a sample processing tool downstream in the fabrication process.

Example 9: The system of Example 6, wherein the one or more hardware processors are configured to output an indication of the unplanned variation to a user.

Example 10: The system of any of the examples above, wherein said geometric feature comprises a dimension for one or more devices or one or more parts of devices that are either completed or yet to be completed.

Example 11: The system of any of the examples above, wherein said geometric feature comprises a critical dimension for one or more devices or part of one or more devices that are either completed or yet to be completed.

Example 12: The system of any of the examples above, wherein said geometric feature comprises a shape of one or more devices or part of one or more devices that are either completed or yet to be completed.

Example 13: The system of any of the examples above, wherein said geometric feature comprises a lateral dimension comprising a width or length for one or more devices or part of one or more devices that are either completed or yet to be completed.

Example 14: The system of any of the examples above, wherein said geometric feature comprises a height for one or more devices or part of one or more devices that are either completed or yet to be completed.

Example 15: The system of any of the examples above, wherein said geometric feature comprises a lateral spacing between a plurality of devices or a plurality of parts of devices that are either completed or yet to be completed.

Example 16: The system of any of the examples above, wherein said geometric feature comprises a tilt or slope of one or more devices or part of one or more devices that are either completed or yet to be completed.

Example 17: The system of any of the examples above, wherein said geometric feature comprises a sidewall tilt or slope of for one or more devices or part of one or more devices that are either completed or yet to be completed.

Example 18: The system of any of the examples above, wherein said at least one SHG signal comprises first and second signals measured with at least one measurement parameter being different for the first and second SHG signals, and said one or more hardware processors are configured to:
- receive said first and second SHG signals; and
- determine a geometric feature of the sample or a variation in a geometric feature of the sample based on the first SHG signal and the second SHG signal.

Example 19: The system of Example 18, wherein said at least one parameter comprise at least one of measurement position, measurement angle, polarization, or wavelength.

Example 20: The system of any of Examples 18-19, wherein the at least one parameter comprises an angle of inclination of the SHG light measured with respect to the sample.

Example 21: The system of any of Examples 18-20, wherein the at least one parameter comprises an angle of inclination of the at least one detector with respect to the sample.

Example 22: The system of any of Examples 18-21, wherein the at least one measurement parameter comprises an azimuthal angle of the SHG light measured with respect to the sample.

Example 23: The system of any of Examples 18-22, wherein the at least one measurement parameter comprises an azimuthal angle of the at least one detector with respect to the sample.

Example 24: The system of any of Examples 18-23, wherein the at least one measurement parameter comprises a polarization of the SHG light measured.

Example 25: The system of any of Examples 18-24, wherein the at least one measurement parameter comprises a polarization of the at least one detector.

Example 26: The system of any of Examples 18-25, wherein the at least one measurement parameter comprises a polarization of the light beam incident on the sample.

Example 27: The system of any of Examples 18-26, wherein the at least one measurement parameter comprises an angle of inclination of the at least one light beam directed on the sample with respect to the sample.

Example 28: The system of any of Examples 18-27, wherein the at least one measurement parameter comprises an azimuthal angle of the at least one light beam directed on the sample with respect to the sample.

Example 29: The system of any of Examples 18-28, wherein the at least one measurement parameter comprises a wavelength of the at least one light beam directed onto the sample.

Example 30: The system of any of Examples 18-29, wherein the at least one measurement parameter comprises an output wavelength the at least one light source.

Example 31: The system of any of Examples 18-30, wherein the at least one measurement parameter comprises a detection wavelength of the at least one detector.

Example 32: The system of any of Examples 18-31, wherein the at least one measurement parameter comprises a wavelength of the SHG light measured.

Example 33: The system of any of Examples 18-32, wherein the sample is configured to rotate with respect to the incident light beam and/or the at least one detector.

Example 34: The system of any of Examples 18-33, wherein the at least one measurement parameter comprises an angle of the at least one detector in plane with the sample.

Example 35: The system of any of Examples 18-34, wherein the at least one parameter comprises an angle of the at least one detector out of plane with the sample.

Example 36: The system of any of Examples 18-35, wherein the at least one parameter comprises a linear or circular polarization of the light beam of the at least one optical source.

Example 37: The system of any of Examples 18-36, wherein the at least one optical source comprises a broadband optical source.

Example 38: The system of any of Examples 18-37, wherein the at least one optical source comprises at least two different wavelength light sources.

Example 39: The system of any of Examples 18-38, wherein system is configured to vary said at least one measurement parameter.

Example 40: The system of any of Examples 39, wherein to vary the at least one measurement parameter, the one or more hardware processors are configured to cause the at least one optical source to emit multiple wavelengths at the same time.

Example 41: The system of any of Examples 39, wherein to vary the at least one measurement parameter, the one or more hardware processors are configured to cause the at least one optical source to emit different wavelengths at different times.

Example 42: The system of any of Examples 18-43, wherein the at least one parameter comprises an angle of the at least one detected SHG signal and a polarization of the detected SHG signal.

Example 43: The system of any of the examples above, wherein the system is included in-line in a fabrication system.

Example 44: The system of any of the examples above, wherein the system is included in-line in a semiconductor device fabrication system.

Example 45: The system of any of the examples above, wherein the geometrical feature comprises a geometric feature of one or more integrated circuit devices or one or more partially completed integrated circuit devices or one or more part thereof.

Example 46: The system of any of the examples above, wherein the geometrical feature comprises a geometrical feature of one or more finFET, GAA, Tri-gate or NAND structures.

Example 47: The system of any of the examples above, wherein the geometrical feature comprises a geometric feature of one or more three-dimensional structures of the sample.

Example 48: The system of any of the examples above, wherein the at least one optical source comprises a first optical source configured to emit probing radiation and a second optical source configured to emit pumping radiation.

Example 49: The system of any of the examples above, further comprising a corona gun configured to deposit different amounts of electrical charge to the top side of the sample.

Example 50: The system of Example 49, where the one or more hardware processors are configured to determine a characteristic of first or second SHG signal for the different amounts of electrical charge.

Example 51: The system of any of the examples above, wherein the sample comprises semiconductor.

Example 52: The system of any of the examples above, wherein the at least one optical source comprises a first optical source configured to emit a first light beam at a first wavelength and a second optical source configured to emit a second light beam at a second wavelength.

Example 53: The system of any of the examples above, wherein the at least one detector comprises a first detector configured to receive an SHG signal at a first angle and a second detector configured to receive an SHG signal at a second angle.

Example 54: The system of any of the examples above, wherein the at least one detector comprises a first detector configured to receive an SHG signal at a first polarization and a second detector configured to receive an SHG signal at a second polarization.

Example 55: The system of any of the examples above, wherein the at least one detector comprises a detector array comprising a plurality of pixels.

Example 56: The system of any of the examples above, wherein the at least one detector comprises a 1D detector array.

Example 57: The system of any of the examples above, wherein the at least one detector comprises a 2D detector array.

Example 58: The system of any of Examples 55-57, further comprising at least one lens configured to direct SHG signals emitted from the sample at different angles to different locations on said detector array.

Example 59: A method for determining a dimension of a sample using second harmonic generation, the method comprising:
  receiving a first SHG signal;
  varying at least one parameter of a light beam of an at least one optical source or an optical detection system;
  receiving a second SHG signal after the variation of the at least one parameter;
  determining a geometry of a feature of the sample based on the first SHG signal, the second SHG signal, and a mapping of an SHG signal to the geometry of the feature of the sample.

Example 60: The method of Example 59, wherein the geometry comprises a dimension or shape.

Example 61: A system for characterizing a sample using second harmonic generation, the system comprising:
  a sample holder configured to support a sample;
  an at least one optical source configured to direct a light beam onto said sample to produce second harmonic generation (SHG);

an optical detection system comprising at least one detector configured to receive second harmonic generated light from said sample;
one or more hardware processors in communication with the optical detection system, the one or more hardware processors configured to:
receive a first SHG signal from said optical detection system, said first SHG signal collected by the at least one detector at a first angle with respect to a feature of the sample;
receive a second SHG signal from said optical detection system, said second SHG signal collected by the at least one detector at a second angle with respect to the feature of the sample, the second angle different from the first angle; and
determine a dimension of the feature of the sample based on the first SHG signal, the second SHG signal, and a mapping of an SHG signal to dimensions of the feature of the sample.

Example 62: A system for characterizing a sample using second harmonic generation, the system comprising:
a sample holder configured to support a sample;
at least one optical source configured to direct a light beam onto said sample to produce second harmonic generation (SHG);
an optical detection system comprising at least one detector configured to receive second harmonic generated light from said sample;
one or more hardware processors in communication with the optical detection system, the one or more hardware processors configured to:
receive at least a first SHG signal;
determine a change in the first SHG signal or a feature of said sample; and
output an indication of the change.

Example 63: The system of Example 62, wherein the change is associated with a variation in a geometric feature of the sample.

Example 64: The system of Example 62, wherein the change is associated with a variation in a dimension or shape of the sample.

Example 65: The system of any of Examples 62-64, wherein the one or more hardware processors are configured to output an indication of the change to a sample processing tool configured to adjust for an error in the sample associated with the change.

Example 66: The system of any of Examples 62-65, wherein the one or more hardware processors are configured to output an indication of the change to a sample processing tool configured to adjust for an error in the sample associated with the change in subsequently manufactured samples.

Example 67: The system of any of Examples 62-66, wherein one or more hardware processors are configured to output an indication of the change to a sample processing tool downstream in the fabrication process.

Example 68: The system of any of Examples 62-67, wherein the one or more hardware processors are configured to output an indication of the change to a sample processing tool to thereby cause an adjustment to adjust said sample processing tool.

Example 69: The system of any of Examples 62-68, wherein further comprising a second SHG signal, said first and second signals measured with at least one measurement parameter being different for the first and second SHG signals, and said one or more hardware processors are configured to:
receive said first and second SHG signals; and
determine a variation in a feature of the sample based on the first SHG signal and the second SHG signal.

Example 70: The system of Example 69, wherein said at least one parameter comprise at least one of measurement position, measurement angle, polarization, or wavelength.

Example 71: The system of any of Examples 69-70, wherein the at least one parameter comprises an angle of inclination of the SHG light measured with respect to the sample.

Example 72: The system of any of Examples 69-71, wherein the at least one parameter comprises an angle of inclination of the at least one detector with respect to the sample.

Example 73: The system of any of Examples 69-72, wherein the at least one measurement parameter comprises an azimuthal angle of the SHG light measured with respect to the sample.

Example 74: The system of any of Examples 69-73, wherein the at least one measurement parameter comprises an azimuthal angle of the at least one detector with respect to the sample.

Example 75: The system of any of Examples 69-74, wherein the at least one measurement parameter comprises a polarization of the SHG light measured.

Example 76: The system of any of Examples 69-75, wherein the at least one measurement parameter comprises a polarization of the at least one detector.

Example 77: The system of any of Examples 69-76, wherein the at least one measurement parameter comprises a polarization of the light beam incident on the sample.

Example 78: The system of any of Example 69-77, wherein the at least one measurement parameter comprises an angle of inclination of the at least one light beam directed on the sample with respect to the sample.

Example 79: The system of any of Examples 69-78, wherein the at least one measurement parameter comprises an azimuthal angle of the at least one light beam directed on the sample with respect to the sample.

Example 80: The system of any of Examples 69-79, wherein the at least one measurement parameter comprises a wavelength of the at least one light beam directed onto the sample.

Example 81: The system of any of Examples 69-80, wherein the at least one measurement parameter comprises an output wavelength the at least one light source.

Example 82: The system of any of Examples 69-81, wherein the at least one measurement parameter comprises a detection wavelength of the at least one detector.

Example 83: The system of any of Examples 69-82, wherein the at least one measurement parameter comprises a wavelength of the SHG light measured.

Example 84: The system of any of Examples 69-83, wherein the sample is configured to rotate with respect to the incident light beam and/or the at least one detector.

Example 85: The system of any of Examples 69-84, wherein the at least one measurement parameter comprises an angle of the at least one detector in plane with the sample.

Example 86: The system of any of Examples 69-85, wherein the at least one parameter comprises an angle of the at least one detector out of plane with the sample.

Example 87: The system of any of Examples 69-86, wherein the at least one parameter comprises a linear or circular polarization of the light beam of the at least one optical source.

Example 88: The system of any of Examples 69-87, wherein the at least one optical source comprises a broadband optical source.

Example 89: The system of any of Examples 69-88, wherein the at least one optical source comprises at least two different wavelength light sources.

Example 90: The system of any of Examples 69-89, wherein system is configured to vary said at least one measurement parameter.

Example 91: The system of any of Examples 90, wherein to vary the at least one measurement parameter, the one or more hardware processors are configured to cause the at least one optical source to emit multiple wavelengths at the same time.

Example 92: The system of any of Examples 90, wherein to vary the at least one measurement parameter, the one or more hardware processors are configured to cause the at least one optical source to emit different wavelengths at different times.

Example 93: The system of any of Examples 69-92, wherein the at least one parameter comprises an angle of the at least one detected SHG signal and a polarization of the detected SHG signal.

Example 94: The system of any of the examples above, wherein the system is included in-line in a fabrication system.

Example 95: The system of any of the examples above, wherein the system is included in-line in a semiconductor device fabrication system.

Example 96: The system of any of the examples above, wherein the feature comprises a feature of one or more integrated circuit devices or one or more partially completed integrated circuit devices or parts thereof.

Example 97: The system of any of the examples above, wherein the feature comprises a geometrical feature of one or more finFET, GAA, Tri-gate or NAND structures.

Example 98: The system of any of the examples above, wherein the feature comprises a geometric feature of one or more three-dimensional structures of the sample.

Example 99: The system of any of the examples above, wherein the at least one optical source comprises a first optical source configured to emit probing radiation and a second optical source configured to emit pumping radiation.

Example 100: The system of any of the examples above, further comprising a corona gun configured to deposit different amounts of electrical charge to the top side of the sample.

Example 101: The system of Example 100, where the one or more hardware processors are configured to determine a characteristic of first or second SHG signals for the different amounts of electrical charge.

Example 102: The system of any of the Examples above, wherein the sample comprises semiconductor.

Example 103: The system of any of the examples above, wherein the at least one optical source comprises a first optical source configured to emit a first light beam at a first wavelength and a second optical source configured to emit a second light beam at a second wavelength.

Example 104: The system of any of the examples above, wherein the at least one detector comprises a first detector configured to receive an SHG signal at a first angle and a second detector configured to receive an SHG signal at a second angle.

Example 105: The system of any of the examples above, wherein the at least one detector comprises a first detector configured to receive an SHG signal at a first polarization and a second detector configured to receive an SHG signal at a second polarization.

Example 106: The system of any of the examples above, wherein the at least one detector comprises a detector array comprising a plurality of pixels.

Example 107: The system of any of the examples above, wherein the at least one detector comprises a 1D detector array.

Example 108: The system of any of the examples above, wherein the at least one detector comprises a 2D detector array.

Example 109: The system of any of Examples 106-108, further comprising at least one lens configured to direct SHG signals emitted from the sample at different angles to different locations on said detector array.

Example 110: A system for characterizing a sample using second harmonic generation, the system comprising:
- a sample holder configured to support a sample;
- at least one optical source configured to direct a light beam onto said sample to produce second harmonic generation (SHG);
- an optical detection system comprising at least one detector configured to receive second harmonic generated light from said sample;
- one or more hardware processors in communication with the optical detection system, the one or more hardware processors configured to:
  receive a first SHG signal;
  determine a change in the first SHG signal; and
  output an indication of the change.

Example 111: The system of Example 110, wherein the change is associated with a variation in a geometric feature of the sample.

Example 112: The system of Example 110, wherein the change is associated with a variation in a dimension or shape of the sample.

Example 113: The system of any of Examples 110-112, wherein the one or more hardware processors are configured to output an indication of the change to a sample processing tool configured to adjust for an error in the sample associated with the change.

Example 114: The system of any of Examples 110-113, wherein the one or more hardware processors are configured to output an indication of the change to a sample processing tool configured to adjust for an error in the sample associated with the change in subsequently manufactured samples.

Example 115: The system of any of Examples 110-114, wherein one or more hardware processors are configured to output an indication of the change to a sample processing tool downstream in the fabrication process.

Example 116: The system of any of Examples 110-115, wherein the one or more hardware processors are configured to output an indication of the change to a sample processing tool to thereby cause an adjustment to adjust said sample processing tool.

TERMINOLOGY

Example invention embodiments, together with details regarding a selection of features have been set forth above. As for other details, these may be appreciated in connection with the above-referenced patents and publications as well as is generally known or appreciated by those with skill in the art. The same may hold true with respect to method-based aspects of the invention in terms of additional acts as commonly or logically employed. Regarding such methods, including methods of manufacture and use, these may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Though the invention embodiments have been described in reference to several examples, optionally incorporating various features, they are not to be limited to that which is described or indicated as contemplated with respect to each such variation. Changes may be made to any such invention embodiment described and equivalents (whether recited herein or not included for the sake of some brevity) may be substituted without departing from the true spirit and scope hereof. Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The various illustrative processes described may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, DisplayPort, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example embodiments, the functions described may be implemented in hardware, software, firmware, or any combination thereof. If implemented in software, the functions may be stored on, transmitted over or resulting analysis/calculation data output as one or more instructions, code or other information on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors hereof intend that only those claims which use the words "means for" are to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

It is also noted that all features, elements, components, functions, acts and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and acts or steps from different embodiments, or that substitute features, elements, components, functions, and acts or steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In some instances entities are described herein as being coupled to other entities. It should be understood that the terms "interfit", "coupled" or "connected" (or any of these forms) may be used interchangeably herein and are generic to the direct coupling of two entities (without any non-negligible, e.g., parasitic, intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

Reference to a singular item includes the possibility that there are a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below.

It is further noted that the claims may be drafted to exclude any optional element (e.g., elements designated as such by description herein a "typical," that "can" or "may" be used, etc.). Accordingly, this statement is intended to serve as antecedent basis for use of such exclusive terminology as "solely," "only" and the like in connection with the recitation of claim elements, or other use of a "negative" claim limitation language. Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Yet, it is contemplated that any such "comprising" term in the claims may be amended to exclusive-type "consisting" language. Also, except as specifically defined herein, all technical and scientific terms used herein are to be given as broad a commonly understood meaning to those skilled in the art as possible while maintaining claim validity.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, acts, steps, or elements of the embodiments may be recited in or added to the claims, as well as negative limitations (as referenced above, or otherwise) that define the inventive scope of the claims by features, functions, steps, or elements that are not within that scope. Thus, the breadth of the inventive variations or invention embodiments are not to be limited to the examples provided, but only by the scope of the following claim language.

What is claimed is:

1. A system for characterizing a sample using second harmonic generation, the system comprising:
    a sample holder configured to support a sample;
    at least one optical source configured to direct a light beam onto the sample to produce second harmonic generation (SHG) signals;
    an optical detection system comprising at least one optical detector configured to receive the SHG signals emitted from the sample and generate detected SHG signals;
    one or more hardware processors in communication with the optical detection system, the one or more hardware processors configured to:
        receive at least one detected SHG signal; and
        determine a geometric feature of the sample or a variation in the geometric feature of the sample based on the at least one detected SHG signal;
        identify an unplanned variation in the geometric feature of the sample; and
        output an indication of the unplanned variation,
        wherein the geometric feature comprises a lateral dimension comprising a width or length for one or more semiconductor devices or part of one or more semiconductor devices that are either completed or yet to be completed.

2. The system of claim 1, wherein the geometric feature of the sample is determined at least in part based on a mapping of the detected SHG signals with geometric features of one or more structures on the sample that are either completed or yet to be completed.

3. The system of claim 1, wherein the one or more hardware processors receives the at least one detected SHG signal after a first fabrication step performed on the sample.

4. The system of claim 3, wherein the system is included in-line in a fabrication system.

5. The system of claim 4, wherein the first fabrication step is a step in a fabrication process performed by the fabrication system.

6. The system of claim 4, wherein the one or more hardware processors are configured to output an indication of the unplanned variation to a sample processing tool in the fabrication system to adjust the unplanned variation in the sample.

7. The system of claim 6, wherein the one or more hardware processors are configured to output the indication of the unplanned variation to the sample processing tool used for performing a second fabrication step on the sample after the first fabrication step, to adjust the unplanned variation in the sample.

8. The system of claim 1, wherein the one or more hardware processors are configured to output an indication of the unplanned variation to a user via a user interface of the system.

9. The system of claim 1, wherein the geometric feature comprises a critical dimension for one or more semiconductor devices or part of one or more semiconductor devices that are either completed or yet to be completed.

10. The system of claim 1, wherein the one or more hardware processors are configured to determine the geometric feature of the sample based on the at least one detected SHG signal.

11. The system of claim 1, wherein the one or more hardware processors are configured to determine a variation in the geometric feature of the sample based on the at least one detected SHG signal.

* * * * *